(12) United States Patent
Zhu et al.

(10) Patent No.: US 12,425,914 B2
(45) Date of Patent: Sep. 23, 2025

(54) TECHNOLOGIES FOR CONTROL AND MANAGEMENT OF MULTIPLE TRAFFIC STEERING SERVICES

(71) Applicant: Intel Corporation, Santa Clara, CA (US)

(72) Inventors: Jing Zhu, Portland, OR (US); Ching-Yu Liao, Portland, OR (US); Zongrui Ding, Portland, OR (US); Dario Sabella, Munich (DE); Miltiadis Filippou, Munich (DE)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 17/437,711

(22) PCT Filed: May 15, 2020

(86) PCT No.: PCT/US2020/033261
§ 371 (c)(1),
(2) Date: Sep. 9, 2021

(87) PCT Pub. No.: WO2020/232404
PCT Pub. Date: Nov. 19, 2020

(65) Prior Publication Data
US 2024/0259857 A1     Aug. 1, 2024

Related U.S. Application Data

(60) Provisional application No. 62/883,540, filed on Aug. 6, 2019, provisional application No. 62/882,906, filed
(Continued)

(51) Int. Cl.
*H04W 28/02* (2009.01)
*H04W 28/084* (2023.01)
*H04W 76/11* (2018.01)

(52) U.S. Cl.
CPC ..... *H04W 28/0252* (2013.01); *H04W 28/084* (2023.05); *H04W 76/11* (2018.02)

(58) Field of Classification Search
CPC ............. H04W 28/0252; H04W 76/11; H04W 28/084; H04W 28/0263; H04W 76/16; H04W 88/18; H04L 45/24
See application file for complete search history.

(56) References Cited

U.S. PATENT DOCUMENTS 6,957,212 B2    10/2005    Peng
8,949,501 B1     2/2015    Akhter et al.
(Continued)

FOREIGN PATENT DOCUMENTS

EP              3414932 A1    12/2018
WO    WO 2015-152787 A1    10/2015
(Continued)

OTHER PUBLICATIONS

3GPP; TSG SA "Study on access traffic steering, switch and splitting support in the 5G system architecture (Release 16)", 3GPP TR 23.793 V16.0.0, Dec. 19, 2018, 115 pages. (Year: 2018).*
(Continued)

*Primary Examiner* — Thinh D Tran
(74) *Attorney, Agent, or Firm* — Schwabe, Williamson & Wyatt, P.C.

(57) ABSTRACT

Disclosed embodiments are related to techniques for implementing Multiple Access Management Services (MAMS), Multi-access Edge Computing (MEC), and 3GPP Fifth Generation (5G) technologies. Embodiments include enhanced application programming interfaces (APIs) that allow applications to influence multi-access (MA) traffic steering decisions, and also get informed of various MA traffic steering modes. Disclosed embodiments also include techniques to enable coexistence between MEC-based
(Continued)

MAMS systems and 5G MA traffic steering mechanisms. Other embodiments may be described and/or claimed.

25 Claims, 20 Drawing Sheets

Related U.S. Application Data on Aug. 5, 2019, provisional application No. 62/849,076, filed on May 16, 2019.

(56) References Cited

U.S. PATENT DOCUMENTS

| | | | |
|---|---|---|---|
| 9,398,121 | B1 | 7/2016 | Brandwine |
| 2002/0039892 | A1* | 4/2002 | Lindell ............... H04W 48/18 455/151.4 |
| 2003/0091054 | A1 | 5/2003 | Futenma |
| 2006/0168336 | A1 | 7/2006 | Koyanagi |
| 2010/0202323 | A1 | 8/2010 | Nishida |
| 2011/0096749 | A1* | 4/2011 | Rune ................... H04W 76/12 370/328 |
| 2013/0246672 | A1 | 9/2013 | Saputra |
| 2014/0307593 | A1 | 10/2014 | Zhao et al. |
| 2015/0029879 | A1 | 1/2015 | Chou et al. |
| 2015/0078359 | A1 | 3/2015 | Scahill et al. |
| 2015/0215835 | A1 | 7/2015 | Sirotkin |
| 2016/0112896 | A1 | 4/2016 | Karampatsis |
| 2016/0270145 | A1 | 9/2016 | Srinivasa Gopalan et al. |
| 2016/0381491 | A1 | 12/2016 | Watfa et al. |
| 2017/0019830 | A1 | 1/2017 | Lindoff et al. |
| 2017/0093541 | A1 | 3/2017 | Pan et al. |
| 2018/0018385 | A1 | 1/2018 | Katayama et al. |
| 2018/0027508 | A1 | 1/2018 | Tanaka |
| 2018/0077022 | A1 | 3/2018 | Van Oost et al. |
| 2018/0092085 | A1 | 3/2018 | Shaheen et al. |
| 2018/0270742 | A1 | 9/2018 | Bergstrom et al. |
| 2019/0036841 | A1 | 1/2019 | Nolan |
| 2019/0306749 | A1 | 10/2019 | Bergstrom et al. |
| 2019/0306752 | A1 | 10/2019 | Lai |
| 2019/0394833 | A1 | 12/2019 | Talebi Fard et al. |
| 2020/0045612 | A1 | 2/2020 | Stauffer et al. |
| 2020/0053018 | A1 | 2/2020 | White et al. |
| 2020/0178196 | A1 | 6/2020 | Wang et al. |
| 2021/0051104 | A1 | 2/2021 | He |
| 2021/0058936 | A1 | 2/2021 | Gordaychik |
| 2021/0100047 | A1* | 4/2021 | Chiba ................. H04W 76/15 |
| 2021/0144590 | A1 | 5/2021 | Li |
| 2021/0211914 | A1* | 7/2021 | de la Oliva ............ H04L 67/10 |
| 2021/0306900 | A1 | 9/2021 | Mehta |
| 2021/0385865 | A1 | 12/2021 | Mueck |
| 2021/0400537 | A1 | 12/2021 | Zhang et al. |
| 2021/0409335 | A1 | 12/2021 | Zhu et al. |
| 2022/0191733 | A1 | 6/2022 | Ali et al. |
| 2023/0056442 | A1 | 2/2023 | Ly et al. |
| 2023/0189368 | A1 | 6/2023 | Zhou |
| 2023/0276483 | A1 | 8/2023 | Xu et al. |

FOREIGN PATENT DOCUMENTS

| | | |
|---|---|---|
| WO | WO2017/139699 A1 | 8/2017 |
| WO | WO 2017-189176 A2 | 11/2017 |
| WO | WO 2019-076440 A1 | 4/2019 |
| WO | WO 2019-192528 A1 | 10/2019 |
| WO | WO 2020/232404 A1 | 11/2020 |
| WO | WO2021/257974 A1 | 12/2021 |
| WO | WO2022005917 A1 | 1/2022 |
| WO | WO2022005918 A1 | 1/2022 |

OTHER PUBLICATIONS

S2-182017 ("Network-controlled Traffic Steering for Multi-access PDU Session", InterDigital Inc., SA WG2 Meeting #126 available on Feb. 26-Mar. 2, 2018 (Year: 2018).*

Nokia, Nokia Shanghai, "Addition of MaxFill steering mode", S2-1812528, SA WG2 Meeting #129bis, Nov. 26-30, 2018 (Year: 2018).*

Boyd et al., "Convex Optimization", Cambridge University Press, Cambridge, UK, ISBN: 978-0-521-83378-3, 730 pages (Mar. 2004).

"Mobile Edge Computing (MEC); Radio Network Information API", ETSI GS MEC 012 V1.1.1, 57 pages (Jul. 2017).

"Multi-access Edge Computing (MEC); Radio Network Information API", ETSI GS MEC 012 V2.1.1, 66 pages (Dec. 2019).

"Mobile Edge Computing(MEC); Bandwidth Management API", ETSI GS MEC 015 V1.1.1, 20 pages (Oct. 2017).

Ford et al., "TCP Extensions for Multipath Operation with Multiple Addresses", Internet Engineering Task Force (IETF), Internet Draft, draft-ietf-mptcp-multiaddressed-09, 62 pages (Jun. 6, 2012), https://datatracker.ietf.org/doc/html/draft-ietf-mptcp-multiaddressed-09.

"Intel® Network Edge Virtualization (NEV) Software Development Kit", Intel Corp., Intel® Network Edge Virtualization Product Brief, 3 pages (Aug. 16, 2015), https://networkbuilders.intel.com/docs/Intel_Wireless_Product_Brief_for_IDF_v8.pdf.

"Simplify Application Development for the Network Edge", Intel Corp., Service Provider NFV, White Paper, 5 pages (Sep. 26, 2018), https://www.intel.com/content/dam/www/public/US/en/documents/white-papers/nev-sdk-white-paper.pdf.

"O-RAN Architecture Description", O-RAN Alliance, O-RAN-WG1-O-RAN Architecture Description, v01.00.00, 24 pages (Feb. 2020).

"O-RAN Working Group 2, AI/ML workflow description and requirements", O-RAN Alliance, ORAN-WG2.AIML, v01.00, 34 pages (Dec. 2019).

Singh et al., "Optimal Traffic Aggregation in Multi-RAT Heterogeneous Wireless Networks", IEEE ICC2016-Workshops: W09-Workshop on 5G RAN Design, 6 pages (Mar. 7, 2016).

Zhu et al., "Generic Multi-Access (GMA) Convergence Encapsulation Protocols", INTAREA/Network Working Group, Internet Draft, draft-zhu-intarea-gma-04, 10 pages (Sep. 30, 2019), https://datatracker.ietf.org/doc/pdf/draft-zhu-intarea-gma-04.

Zhu et al., "Generic Multi-Access (GMA) Convergence Encapsulation Protocols", INTAREA/Network Working Group, Internet Draft, draft-zhu-intarea-gma-05, 12 pages (Dec. 16, 2019), https://datatracker.ietf.org/doc/pdf/draft-zhu-intarea-gma-05.

International Search Report and Written Opinion mailed Apr. 15, 2021 for International Patent Application PCT/US2020/066969, 13 pages.

Extended European Search Report mailed May 10, 2023 for European Patent Application No. 20806061.6, 11 pages.

S. Kanugovi Nokia e al., "Multiple Access Management Services; Draft-Kanugovi-intarea-mams-fraaework-03", (Feb. 28, 2019), 141 pages.

3GPP, "3rd Generation Partnership Project; Technical Specification Group Services and System Aspects; Study on access traffic steering, switch and splitting support in the 5G system architecture (Release 16)", 3GPP TR 23.793 V16.0.0 (Dec. 2018), 114 pages.

International Preliminary Report on Patentability mailed Oct. 13, 2022 for International Patent Application PCT/US2020/066969, 8 pages.

Sangeetha Bangolae et al., "Performance Study of Fast BSS Transition using IEEE 802.11r", Proceedings of the 2006 Int'l Conference on Wireless Comm. and Mobile Computing (IWCMC '06), pp. 737-742 (Jul. 3, 2006), https://dl.acm.org/doi/pdf/10.1145/1143549.1143696.

"Wi-Fi Roaming Aggressiveness Setting", Intel Corporation, Article ID 000005546, 2 pages (Oct. 28, 2021).

Yordan, "Oppo and vivo announce Dual Wi-Fi for their flagships", GSMArena.com, 3 pages (Jul. 18, 2019), https://www.gsmarena.com/oppo_vivo_dual_wifi-news-38203.php.

Q. De Coninck et al., "Multipath Extensions for QUIC (MP-QUIC)", IETF, draft-deconinck-quic-multipath-07, 36 pages (May 3, 2021), https://datatracker.ietf.org/doc/html/draft-deconinck-quic-multipath-07.

J. Zhu et al., "Generic Multi-Access (GMA) Encapsulation Protocol", IETF, draft-zhu-intarea-gma-14, 17 pages (Nov. 24, 2021), https://datatracker.ietf.org/doc/html/draft-zhu-intarea-gma-14.

(56) References Cited

OTHER PUBLICATIONS

J. Zhu et al., "User-Plane Protocols for Multiple Access Management Service", IETF, draft-zhu-intarea-mams-user-protocol-09, 8 pages (Mar. 4, 2020).
"3rd Generation Partnership Project; Technical Specification Group Core Network and Terminals; 5G System; Access Traffic Steering, Switching and Splitting (ATSSS); Stage 3 (Release 17)", 3GPP TS 24.193 v17.2.0 (Sep. 24, 2021), 71 pages.
"3rd Generation Partnership Project; Technical Specification Group Core Network and Terminals; Access Network Discovery and Selection Function (ANDSF) Management Object (MO) (Release 16)", 3GPP TS 24.312 v16.0.0 (Jul. 9, 2020), 394 pages.
"3rd Generation Partnership Project; Technical Specification Group Radio Access Network; Evolved Universal Terrestrial Radio Access (E-UTRA); LTE/WLAN Radio Level Integration Using IPsec Tunnel (LWIP) encapsulation; Protocol specification (Release 16)", 3GPP TS 36.361 v16.0.0 (Jul. 24, 2020), 10 pages.
Extended European Search Report mailed Apr. 14, 2023 for European Patent Application No. 22203400.1, 13 pages.
Office Action mailed Mar. 6, 2024 for U.S. Appl. No. 17/469,331, 96 pages.
Nádas et al., "Per Packet Value: A Practical Concept for Network Resource Sharing", 2016 IEEE Global Communications Conference (GLOBECOM), pp. 1-7 (Dec. 4, 2016).
Laki et al., "Take your own share of the PIE", Proceedings of the Applied Networking Research Workshop, pp. 27-32 (Jul. 15, 2017).
Nádas et al., "Towards a congestion control-independent core-stateless AQM", Proceedings of the Applied Networking Research Workshop, pp. 84-90 (Jul. 16, 2018).
Laki et al., "Scalable Per Subscriber QoS with Core-Stateless Scheduling", ACM SIGCOMM Industrial Demos, 2 pages (2018).
Nádas et al., "Stateless resource sharing in networks with multilayer virtualization", 2019 IEEE International Conference on Communications (ICC), pp. 1-7 (May 20, 2019).
Nádas et al., "Towards core-stateless fairness on multiple timescales", Proceedings of the Applied Networking Research Workshop, pp. 30-36 (Jul. 22, 2019).
Fejes et al., "Decoupling delay and resource sharing targets with efficient core-stateless AQM", Proceedings of the ACM SIGCOMM 2019 Conference Posters and Demos, pp. 128-130 (Aug. 19, 2019).
Fejes et al., "Who will Save the Internet from the Congestion Control Revolution?", Proceedings of the 2019 Workshop on Buffer Sizing, Stanford University, 6 pages (2019), http://ppv.elte.hu/buffer-sizing/.
Fejes et al., "On the Incompatibility of Scalable Congestion Controls over the Internet", 2020 IFIP Networking Conference (Networking), IEEE, pp. 749-754 (Jun. 22, 2020), http://ppv.elte.hu/scalable-cc-comp/.
Nádas et al., A congestion control independent L4S scheduler. InProceedings of the Applied Networking Research Workshop, pp. 45-51 (Jul. 27, 2020).
Laki et al., "Core-Stateless Forwarding With QoS Revisited: Decoupling Delay and Bandwidth Requirements", IEEE/ACM Transactions on Networking 29, No. 2, pp. 503-516 (Dec. 9, 2020).
Fejes et al., "A Core-Stateless L4S Scheduler for P4-enabled hardware switches with emulated HQoS", IEEE INFOCOM 2021 Demo (Virtual), 2 pages (2021), http://ppv.elte.hu/ic21/.
Bemten et al., "Network Calculus: A Comprehensive Guide", Technical Report No. 201603, 57 pages (Oct. 8, 2016).
Charny et al., "Delay Bounds in a Network with Aggregate Scheduling", International Workshop on Quality of Future Internet Services 2000 (QoFIS'2000), Springer Berlin, Heidelberg, pp. 1-13 (Sep. 25, 2000).
Zhu et al., "Generic Multi-Access (GMA) Encapsulation Protocol", draft-zhu-intarea-gma-07, 13 pages (May 14, 2020).
Feng et al., "The BLUE active queue management algorithms", 19 pages, (Sep. 2002), http://www.researchgate.net/publication/3334841.
Mustafa Maad Hamdi et al., "A review on Queue Management Algorithms in Large Networks", IOP Conference Series: Materials Science and Engineering, vol. 1076, No. 1, p. 012034, 13 pages (Feb. 1, 2021), https://iopscience.iop.org/article/10.1088/1757-899X/1076/1/012034/pdf.
Nichols et al., "Definition of the Differentiated Services Field (DS Field) in the IPV4 and IPV6 Headers", IETF RFC 2474, 20 pages (Dec. 1998).
Ramakrishnan et al., "The Addition of Explicit Congestion Notification (ECN) to IP", IETF RFC 3168, 63 pages (Sep. 2001).
Amante et al., "IPv6 Flow Label Specification", IETF RFC 6437, 15 pages (Nov. 2011).
D. Black, "Relaxing Restrictions on Explicit Congestion Notification (ECN) Experimentation", IETF RFC 8311, 20 pages (Jan. 2018).
G. Fairhurst, "Update to IANA Registration Procedures for Pool 3 Values in the Differentiated Services Field Codepoints (DSCP) Registry", IETF RFC 8436, 7 pages (Aug. 2018).
Zhu et al., "Improving QoE for Skype Video Call in Mobile Broadband Network", 2012 IEEE Global Communications Conference (GLOBECOM), pp. 1938-1943 (Dec. 3, 2012).
Nikc McKeown et al., "Tiny Tera: A Packet Switch Core", IEEE Micro, IEEE Service Center, Los Alamitos, CA, US deel 17, nr.1, (Jan. 1, 1997), 8 pages.
S. Kanugovi et al., "Multi-Access Management Services (MAMS)", rtc8743.txt, Multi-Access Management Services (MAMS); RFC8743. TXT, Internet Engineering Task Force, IETF; Standard, Internei Society (ISOC) 4, Rue Des Falaises CH-1205 Geneva, Switzerland, (Mar. 25, 2020), 73 pages.
International Search Report and Written Opinion mailed Aug. 31, 2020 for International Patent Application No. PCT/US2020/033261, 14 pages.
International Preliminary Report on Patentability mailed Nov. 25, 2021 for International Patent Application No. PCT/US2020/033261, 10 pages.
3GPP; TSG SA "Study on access traffic steering, switch and splitting support in the 5G system architecture (Release 16)", 3GPP TR 23.793 V16.0.0, Dec. 19, 2018, 115 pages.
S. Kanugovi et al., Multiple Access Management Services, draft-kanugovi-intarea-mams-framework-03, Feb. 28, 2019, 156 pages.
S. Kanugovi et al., "Multiple Access Management Services, draft-kanugovi-intarea-mams-framework-04", May 31, 2019, 122 pages.
J. Zhu et al., "User-Plane Protocols for Multiple Access Management Service, draft-zhu-intarea-mams-user-protocol-07", Apr. 3, 2019, 14 pages.
3GPP, "3rd Generation Partnership Project; Technical Specification Group Services and System Aspects; System Architecture for the 5G System; Stage 2 (Release 16)", 3GPP TS 23.501 V16.1.0, Jun. 2019, 368 pages.
3GPP, "3rd Generation Partnership Project; Technical Specification Group Core Network and Terminals; 5G System; Access and Mobility Management Services; Stage 3 (Release 16)", 3GPP TS 29.518 V16.0.0, Jun. 2019, 199 pages.
ETSI, "Multi-access Edge Computing (MEC); Framework and Reference Architecture Disclaimer", Jan. 2019, 21 pages, ETSI GS MEC 003 V2.1.1.
ETSI, "Multi-access Edge Computing (MEC); Phase 2: Use Cases and Requirements", Oct. 2018, 66 pages, ETSI GS MEC 002 V2.1.1.
ETSI, "Mobile Edge Computing(MEC); Bandwidth Management API", Oct. 2017, 20 pages, ETSI GS MEC 015 V1.1.1.
3GPP, "3rd Generation Partnership Project; Technical Specification Group Core Network and Terminals; 5G System; Network Exposure Function Northbound APIs; Stage 3 (Release 16)", 3GPP TS 29.522 V16.0.0, Jun. 2019, 43 pages.
ETSI, "Multi-access Edge Computing (MEC); General principles for MEC Service APIs Disclaimer", Jan. 2019, 64 pages, ETSI GS MEC 009 V2.1.1.
3GPP, "3rd Generation Partnership Project; Technical Specification Group Services and System Aspects; System Architecture for the 5G System; Stage 2 (Release 16)" 3GPP TS 23.501 V16.0.2, Apr. 2019, 317 pages.
3GPP, "3rd Generation Partnership Project; Technical Specification Group Core Network and Terminals; 5G System; Access and

(56) References Cited

OTHER PUBLICATIONS

Mobility Management Services; Stage 3 (Release 15)", 3GPP TS 29.518 V15.3.0 , Mar. 2019, 195 pages.
ETSI, "Mobile Edge Computing (MEC); Radio Network Information API Disclaimer", Jul. 2017, 57 pages, ETSI GS MEC 012 V1.1.1.
International Preliminary Report on Patentability mailed Dec. 29, 2022 for International Patent Application PCT/US2021/038063, 10 pages.
Kanugovi et al., "Control Plane Protocols and Procedures for Multiple Access Management Services", IETF, draft-zhu-intarea-mams-control-protocol-02 (Jul. 3, 2017), 31 pages.
Li et al., "Multipath Transmission for Internet: A Survey", 39 pages, IEEE Communications Surveys & Tutorials, vol. 18, No. 4, Fourth Quarter 2016, pp. 2887-2925 (Jun. 29, 2016).
"TCP Keep-Alives" in Braden, "Requirements for Internet Hosts—Communication Layers", IETF RFC 1122, section 4.2.3.6, pp. 101-102 (Oct. 1, 1989), 2 pages.
G. Dommety, "Key and Sequence Number Extensions to GRE", Internet Engineering Task Force (IETF) RFC 2890, 7 pages (Sep. 2000).
A. Huttunen et al., "UDP Encapsulation of IPsec ESP Packets", Internet Engineering Task Force (IETF) RFC 3984, 15 pages (Jan. 2005).
A. Ford et al., "TCP Extensions for Multipath Operation with Multiple Addresses", Internet Engineering Task Force (IETF) RFC 6824, 64 pages (Jan. 2013).
N. Leymann et al., "Huawei's GRE Tunnel Bonding Protocol", Internet Engineering Task Force (IETF) RFC 81557, 44 pages (May 2017).
S. Kanugovi et al., "Multi-Access Management Services (MAMS)", Internet Engineering Task Force (IETF) RFC 8743, 143 pages (Mar. 2020).
J. Zhu et al., "Generic Multi-Access (GMA) Encapsulation Protocol", Internet Engineering Task Force (IETF) RFC 9188, 15 pages (Feb. 2022).
J. Zhu et al., "Generic Multi-Access (GMA) Encapsulation Protocol", draft-zhu-intarea-gma-07, IETF, 13 pages (May 14, 2020).
S. Kanugovi et al., "RFC 8743: Multi-Access Management Services (MAMS)", IETF RFC 8743, 143 pages (Mar. 2020).
International Search Report and Written Opinion mailed Oct. 6, 2021 for International Patent Application No. PCT/US2021/038063, 14 pages.
"3GPP; TSG SA; Study on enhanced support of Industrial Internet of Things (IIoT) in 5G System (Release 17)", 3GPP TR 23.700-20 V0.3.0 (Jan. 28, 2020).
Han-Chuan Hsieh et al., "5G Virtualized Multi-access Edge Computing Platform for IoT Applications", Journal of Network and Computer Applications, vol. 115, pp. 94-102, (May 10, 2018).
Extended European Search Report issued Jun. 14, 2024 for EP Application No. 21825017.3, 4 pages.
Deutsche Bahn AG, "Exemplary Mapping of 3GPP Building Blocks to FRMCS Logical Architecture Draft," ETSI Draft RT(19)075028r3, ETSI, Dec. 12, 2019, 13 pages.
Notice of Allowance mailed Aug. 20, 2024 for U.S. Appl. No. 17/469,331, 21 pages.
Notice of Allowance mailed Aug. 2, 2024 for U.S. Appl. No. 17/923,170, 71 pages.
International Search Report and Written Opinion mailed Oct. 8, 2021 for International Patent Application No. PCT/US2021/039253, 12 pages.
"3rd Generation Partnership Project; Technical Specification Group Services and System Aspects; Study on access traffic steering, switch and splitting support in the 5G system architecture (Release 16)", 3GPP TR 23.793 V16.0.0 (Dec. 19, 2018), 114 pages.
"3rd Generation Partnership Project; Technical Specification Group Services and System Aspects; Study on Access Traffic Steering, Switch and Splitting support in the 5G system architecture Phase 2 (Release 17)", 3GPP TR 23.700-93 V0.1.1 (Jun. 23, 2020), 43 pages.
International Preliminary Report on Patentability mailed Jan. 12, 2023 for International Patent Application No. PCT/US2021/039253, 7 pages.
International Search Report and Written Opinion mailed Nov. 19, 2021 for International Patent Application No. PCT/US2021/039252, 13 pages.
International Preliminary Report on Patentability mailed Jan. 12, 2023 for International Patent Application No. PCT/US2021/039252, 8 pages.
U.S. Appl. No. 63/025,086 "Dynamic Traffic Management in Next Generation Multi-Access Management Service Frameworks", filed May 14, 2020, 78 pages.
U.S. Appl. No. 17/922,947 "RAN-Aware Traffic Distribution Rules and Ran Measurements for Enhanced Access Traffic Steering Switching and Splitting ", filed Nov. 2, 2022, 92 pages.
U.S. Appl. No. 17/925,430 "Wireless Local Area Network Enhancements for Access Traffic Steering Switching Splitting", filed Nov. 15, 2022, 64 pages.
"3rd Generation Partnership Project; Technical Specification Group Services and System Aspects; System architecture for the 5G System (5GS); Stage 2 (Release 15)", 3GPP TS 23.501 V15.9.0 (Mar. 27, 2020), 248 pages.
A. Ford et al., "RFC 8684 TCP Extensions for Multipath Operation with Multiple Addresses": http://tools.ietf.org/html/draft-ietf-mptcp-multiaddressed-09, 6 pages (Mar. 2020).
"3rd Generation Partnership Project; Technical Specification Group Services and System Aspects; Management and orchestration; 5G performance measurements (Release 16)", 3GPP TS 28.552 V16.5.0 (Mar. 27, 2020), 173 pages.
"3rd Generation Partnership Project; Technical Specification Group Radio Access Network; Evolved Universal Terrestrial Radio Access (E-UTRA); Layer 2—Measurements (Release 15)", 3GPP TS 36.314 V15.2.0 (Jan. 1, 2019), 28 pages.
IEEE Standard for Information technology—Telecommunications and information exchange between systems Local and metropolitan area networks—Specific requirements—Part 11: Wireless LAN Medium Access Control (MAC) and Physical Layer (PHY) Specifications, IEEE Std 802.11-2016, 3534 pages (Dec. 14, 2016).
Wi-Fi Alliance, "Wi-Fi Agile Multiband Technical Specification", Version 1.5, 32 pages (2020).
Wi-Fi Alliance, "Optimized Connectivity Specification", Version 1.1.6, 26 pages (2020).
Office Action mailed Sep. 18, 2024 for U.S. Appl. No. 17/797,661, 72 pages.

* cited by examiner

TECHNOLOGIES FOR CONTROL AND MANAGEMENT OF MULTIPLE TRAFFIC STEERING SERVICES

RELATED APPLICATIONS

The present application claims priority to U.S. Provisional App. No. 62/849,076 filed on May 16, 2019, U.S. Provisional App. No. 62/882,906 filed on Aug. 5, 2019, and U.S. Provisional App. No. 62/883,540 filed on Aug. 6, 2019, the contents of each of which are hereby incorporated by reference in their entireties.

TECHNICAL FIELD

Embodiments described herein generally relate to edge computing, network communication, and communication system implementations, and in particular, to techniques for implementing Multi-access Edge Computing (MEC) systems, Multiple Access Management Services (MAMS), and Fifth Generation (5G) Access Traffic Switching, Steering, and Splitting (ATSSS).

BACKGROUND

Internet of Things (IoT) devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated. The deployment of IoT devices and edge computing services, such as Multi-access Edge Computing (MEC), have introduced a number of advanced use cases and scenarios occurring at or otherwise involving the edge of the network. However, these advanced use cases have also introduced a number of corresponding technical challenges related to security, processing/computing resources, network resources, service availability and efficiency, among many other issues.

Multiple Access Management Services (MAMS) is a programmable framework that provides mechanisms for flexible selection of network paths in a multi-connection (access) communication environment based on application needs or requirements. The MAMS framework can be supported by an edge computing system/network, such as ETSI MEC. Additionally, the Third Generation Partnership Project (3GPP) Fifth Generation (5G) system architecture has been extended to support functionality similar to MAMS, which is referred to as Access Traffic Switching, Steering, and Splitting (ATSSS). However, no existing solutions address the coexistence among MEC-based MAMS and 5G ATSSS deployments. Additionally, no existing solutions allow third party applications to influence multi-access traffic steering decisions, or get informed of various multi-access traffic steering capabilities in MEC or 5G systems.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following embodiments generally relate to data processing, service management, resource allocation, compute management, network communication, application partitioning, and communication system implementations, and in particular, to techniques and configurations for adapting various edge computing devices and entities to dynamically support multiple entities (e.g., multiple tenants, users, stakeholders, service instances, applications, etc.) in a distributed edge computing environment. In particular, disclosed embodiments are related to techniques for implementing Multiple Access Management Services (MAMS), Multi-access Edge Computing (MEC), and 3GPP Fifth Generation (5G) technologies. Embodiments include enhanced application programming interfaces (APIs) that allow applications to influence multi-access (MA) traffic steering decisions, and also get informed of various MA traffic steering modes. Disclosed embodiments also include techniques to enable coexistence between MEC-based MAMS systems and 5G MA traffic steering mechanisms. Other embodiments may be described and/or claimed.

I. Multiple Access Management Services (MAMS) and Access Traffic Steering, Switching, Splitting (ATSSS) Aspects Today, a device (e.g., mobile stations, user equipment (UEs), etc.) can be simultaneously connected to multiple communication networks based on different technology implementations (including different Radio Access Technologies (RATs)) and network architectures, for example, WiFi, LTE, and DSL. In such multi-connectivity scenarios, it may be desirable to combine multiple access networks or select the best one to improve quality of experience (QoE) for a user and improve overall network utilization and efficiency. The overall QoE perceived by the end users as well as utilization of the resources can be optimized with smart selection and combination of the paths used for the user plane. In an advanced solution, the network paths can be dynamically selected based on knowledge of current conditions in the relevant access networks. The Multiple Access Management Services (MAMS) framework enables the smart selection and flexible combination of access and core network paths based on defined policies. By use of up-to-date information from available access networks, the best possible network efficiency and end user QoE perception based on application needs can be guaranteed. The MAMS framework can be used to flexibly select the combination of uplink (UL) and downlink (DL) access and core network paths having an optimal performance, and user plane (UP) treatment for improving network utilization and efficiency and enhanced QoE for user applications (apps). With the MAMS framework, the optimal network paths can selected on user plane level without any impact on the control plane signalling of the underlying access networks. An example multi-access network implementing the MAMS framework is shown by FIG. 1.

Figure 1:
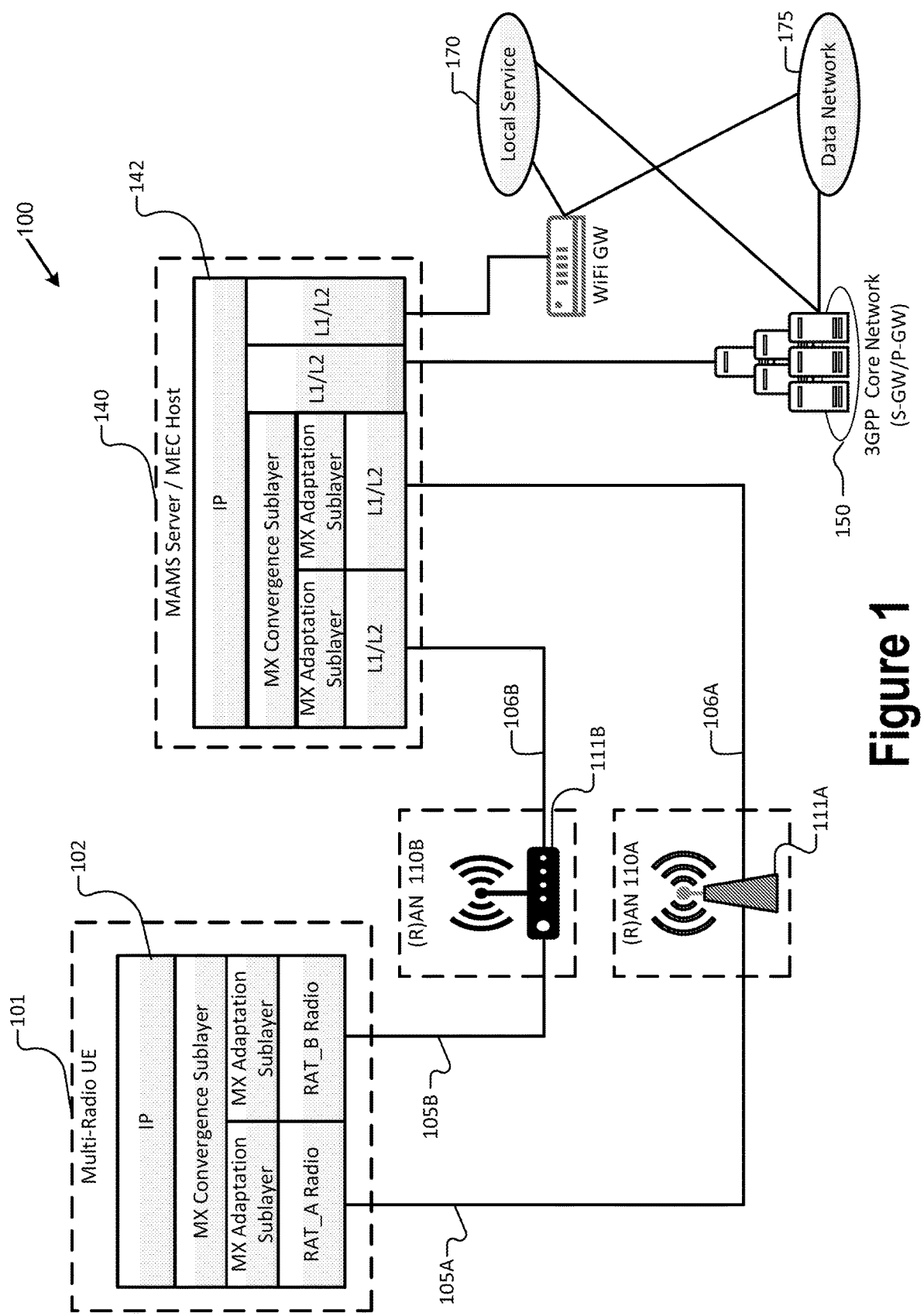
FIG. 1 depicts an example multi-access network utilizing Multiple Access Management Services (MAMS) technology, according to various embodiments.

FIG. 1 depicts an example multi-access ("MX" or "MA") network 100 utilizing MAMS technology. In particular, FIG. 1 shows a MAMS end-to-end (e2e) user plane (UP) protocol stack in the MX network 100, which includes both WiFi and 3GPP-based access. In this example, a Multiconnectivity Client 101 includes a UP protocol stack 102 and a server 140 includes a UP protocol stack 142. The client 101 is an end-user device that supports connections with multiple access nodes, possibly over different access technologies, and is also referred to as a user station, user device, user equipment (UE), or multi-radio UE 101. The server 140 may be implemented as a MAMS server and/or a MEC server. A MEC host (or MEC server) is an entity that contains a MEC platform and a virtualization infrastructure to provide compute, storage and network resources to MEC applications (apps). A MEC platform is a collection of functionality (including hardware and software elements) that is required to run MEC apps on a specific MEC host's virtualization infrastructure and to enable them to provide and consume MEC services, and that can provide itself a number of MEC services. MEC apps are applications that can be instantiated on a MEC host 140 within the MEC system 100 and can potentially provide or consume MEC services, and MEC services are services provided via a MEC platform either by the MEC platform itself or by a MEC app. Various aspects of MEC hosts and MAMS servers are discussed in more detail infra. Throughout the present disclosure, the server 140 may be referred to as a MAMS server 140, a MEC host 140, MAMS-MEC system 140, or similar.

The multi-radio UE 101 accesses or otherwise communicates with a local service 170 or a data network 175 via one or more (radio) access networks ((R)ANs) 110 and the server 140. Each access network 110 is a segment in a network that delivers user data packets to the client 101 via an access link 105 such as a Wi-Fi airlink, 5G/NR airlink, an LTE airlink, DSL, or the like. Each of the (R)ANs 110 implement a radio access technology (RAT) such as 3GPP Long Term Evolution (LTE), 3GPP Fifth Generation (5G)/ New Radio (NR), MulteFire, WiFi, Worldwide Interoperability for Microwave Access (WiMAX), and/or the like. (R)ANs 110 could also encompass personal area network technologies such as Bluetooth® or Bluetooth Low Energy (BLE), IEEE 802.15.4 based protocols (e.g., 6LoWPAN, WirelessHART, MiWi, Thread, etc.), WiFi-direct, and/or the like. Each (R)AN 110 includes one or more (R)AN nodes 111, which may be macro cell base stations, remote radio heads (RRHs), small and/or micro cell base stations, access points (APs), and/or other like network elements. A collection of (R)AN nodes 111 may also be referred to as an "access level edge network" or "access level edge." The (R)AN nodes 111 are configurable or operable to perform setup of transport resources, (e.g., for CDN services and/or other application level services) as well as scheduling signaling resources for providing network service of the underlying access network/RAT.

In the example of FIG. 1, the (R)AN 110A is a 3GPP-based access network such as an LTE E-UTRAN where the one or more (R)AN nodes 111A are evolved NodeBs (eNBs) or a next generation RAN (NG-RAN) where the one or more (R)AN nodes 111 are Next Generation NodeBs (gNBs) and/or NG Evolved Node-Bs (NG-eNBs). Additionally, in the example of FIG. 1, the (R)AN 110A is a WiFi-based access network where the (R)AN nodes 111B are WiFi Access Points (APs). The APs may be, for example, wireless routers, roadside ITS stations or roadside units, gateway appliances, central hubs, or the like. The multi-radio UE 101 is capable of establishing a 3GPP access link 105A with the eNB/gNB 111A (e.g., Uu interface or the like), and capable of establishing a WiFi access link 105B with the AP 111B. The eNB/gNB 111A communicates with the server 140 via a 3GPP backhaul link 106A and the AP 111B communicates with the server 140 via a WiFi backhaul link 106B. The 3GPP backhaul link 106A and the WiFi backhaul link 106B may be a suitable wired connection such as Ethernet, Data Highway Plus (DH+), PROFINET, or the like.

MAMS is a programmable framework that provides mechanisms for the flexible selection of network paths in an MX communication environment 100, based on the application needs and/or requirements, as well as adapt to dynamic network conditions when multiple network connections serve a client device 101. The MAMS framework leverages network intelligence and policies to dynamically adapt traffic distribution across selected paths and UP treatments (e.g., encryption needed for transport over WiFi, or tunneling needed to overcome a network address translation (NAT) between client 101 and a multi-path proxy) to changing network/link conditions. Network path selection and configuration messages are carried as UP data between the functional elements in the network 100 and the client 101, and thus, with little or no impact on the control plane (CP)

signaling schemes of the underlying access networks (e.g., WiFi and 3GPP access networks in FIG. 1). For example, in MX network 100 with 3GPP and WiFi technologies existing LTE and WiFi signaling procedures will be used to set up the LTE and WiFi connections, respectively, and MAMS-specific control-plane messages are carried as LTE or WiFi UP data. The MAMS framework defined in this document provides the capability to make a smart selection of a flexible combination of access paths and core network paths, as well as to choose the UP treatment when the traffic is distributed across the selected paths. Thus, it is a broad programmable framework that provides functions beyond the simple sharing of network policies such as those provided by the Access Network Discovery and Selection Function (ANDSF) discussed in 3GPP TS 24.312 v15.0.0 (2018 Jun. 21), which offers policies and rules for assisting 3GPP clients to discover and select available access networks. Further, it allows the choice and configuration of UP treatment for the traffic over the paths, depending on the application's needs The MAMS framework mechanisms are not dependent on any specific access network types or UP protocols (e.g., TCP, UDP, Generic Routing Encapsulation (GRE), QUIC, Multipath TCP (MPTCP), SCTP, Multipath QUIC (MPQUIC), etc.). The MAMS framework coexists and complements the existing protocols by providing a way to negotiate and configure those protocols to match their use to a given multi-access scenario based on client and network capabilities, and the specific needs of each access network path. Further, the MAMS framework allows load balancing of the traffic flows across the selected access network paths, and the exchange of network state information to be used for network intelligence to optimize the performance of such protocols.

The MAMS framework is based on principles of UP interworking, which can be deployed as an overlay without impacting the underlying networks. MAMS co-exists and complements existing communication protocols by providing a way to negotiate and configure the protocols based on client and network capabilities. Further it allows exchange of network state information and leveraging network intelligence to optimize the performance of such communication protocols. MAMS has minimal or no dependency on the actual access technology of the participating links, which allows MAMS to be scalable for addition of newer access technologies and for independent evolution of the existing access technologies.

The MAMS framework defines or provides the UP protocol stacks 102 and 142 for transporting user payloads, for example, an IP Protocol Data Unit (PDU) carried via the IP layer. The MAMS UP protocol 102, 142 includes the following two layers: an MX convergence layer (or sublayer) and an MX adaptation layer (or sublayer) for respective RATs The MX convergence layer is configurable or operable to perform MX-specific tasks in the UP. The MX convergence layer performs such functions as access (path) selection, multi-link (path) aggregation, splitting/reordering, lossless switching, fragmentation, and/or concatenation. The MX convergence layer can be implemented by using existing UP protocols such MPTCP, Multipath QUIC (MPQUIC), or by adapting encapsulating header/trailer schemes such as GRE or Generic Multi-Access (GMA).

The MX adaptation layer is configurable or operable to address transport-network-related aspects such as reachability and security in the UP. This layer performs functions to handle tunneling, network-layer security, and NAT. The MX Adaptation Layer can be implemented using UDP tunneling, IPsec, Datagram Transport Layer Security (DTLS), or a Client NAT (e.g., a source NAT at the client with inverse mapping at a Network Multi Access Data Proxy (N-MADP)).

The MX Adaptation Layer can be independently configured for each of the access links 105A and 105B. In particular, UP packets of the anchor connection can be encapsulated in a UDP tunnel of a delivery connection between the N-MADP and C-MADP (see e.g., FIG. 2), an IPsec tunnel can be established between the N-MADP and C-MADP (see e.g., FIG. 2) on the network path that is considered untrusted, and/or DTLS can be used if UDP tunneling is used on the network path that is considered "untrusted". For example, in example deployment of FIG. 1 including 3GPP (R)AN 110A (assumed secure) and WiFi (R)AN 110B (assumed to not be secure), the MX adaptation layer can be omitted for the 3GPP link 105A, but is configured with IPsec to secure the WiFi link 105B.

The MX convergence layer operates on top of the MX adaptation sublayer in the protocol stack. From the transmitter (Tx) perspective, a user payload (e.g., IP PDU) is processed by the MX convergence layer first, and then by the MX adaptation layer before being transported over a delivery access connection, From the receiver (Rx) perspective, an IP packet received over a delivery connection is processed by the MX adaptation sublayer first, and then by the MX convergence sublayer.

Where GMA is used, the MX convergence layer may be replaced with a "GMA convergence layer" or "GMA convergence sublayer." Here, multiple access networks 110 are combined into a single IP connection. If the NCM (see e.g., NCM 236 of FIG. 2) determines that N-MADP (see e.g., N-MADP 237 of FIG. 2) is to be instantiated with GMA as the MX Convergence Protocol, it exchanges the support of GMA convergence capability in the discovery and capability exchange procedures.

Where MPTCP is used, the MX convergence layer may be replaced with an MPTCP layer on top of individual TCP layers, where each TCP layer is onto of a respective MX adaption layer. Here, MPTCP is reused as the "MX Convergence Sublayer" protocol, and multiple access networks are combined into a single MPTCP connection. Hence, no new UP protocol or PDU format is needed in this case. If the NCM determines that the N-MADP is to be instantiated with MPTCP as the MX Convergence Protocol, it exchanges the support of MPTCP capability during discovery and capability exchange procedures. MPTCP proxy protocols may be used to manage traffic steering and aggregation over multiple delivery connection.

Where GRE is used, the MX convergence layer may be replaced with a GRE layer on top of a GRE Delivery Protocol (e.g., IP) layer. Here, GRE is reused as the "MX Convergence sub-layer" protocol, and multiple access networks are combined into a single GRE connection. Hence, no new UP protocol or PDU format is needed in this case. If the NCM determines that N-MADP is to be instantiated with GRE as the MX Convergence Protocol, it exchanges the support of GRE capability in the discovery and capability exchange procedures.

The MAMS framework can be supported by an edge computing system/network, such as ETSI Multi-access Edge Computing (MEC), which defines the technical requirements for the implementation of MEC platforms. MEC is a technology that allows applications to be instantiated at the edge of an access network, and provides a low-latency and a close proximity environment to user equipment (UEs). As a result, vertical industries are expected to significantly benefit from the deployment of MEC infrastructure together with the deployment of (R)ANs 110. These RANs 110 may be operated by different mobile network operations (MNOs) and/or operate different RATs.

MEC systems are access agnostic, and thus, can support MAMS. In some implementations, MAMS can be a MEC service which provides services to MEC applications over the Mp1 interface. Meanwhile, the MEC platform can consume services provided by NFs in 3GPP network via an NEF or PCF if the AF is in the trust domain. Other aspects of MEC systems and 3GPP networks is shown and described infra with respect to FIGS. 14, 15, 16, and 17. Moreover, the 3GPP 5G system architecture has been extended to support functionality similar to MAMS, which is referred to as ATSSS (see e.g., [R03]).

Figure 2:
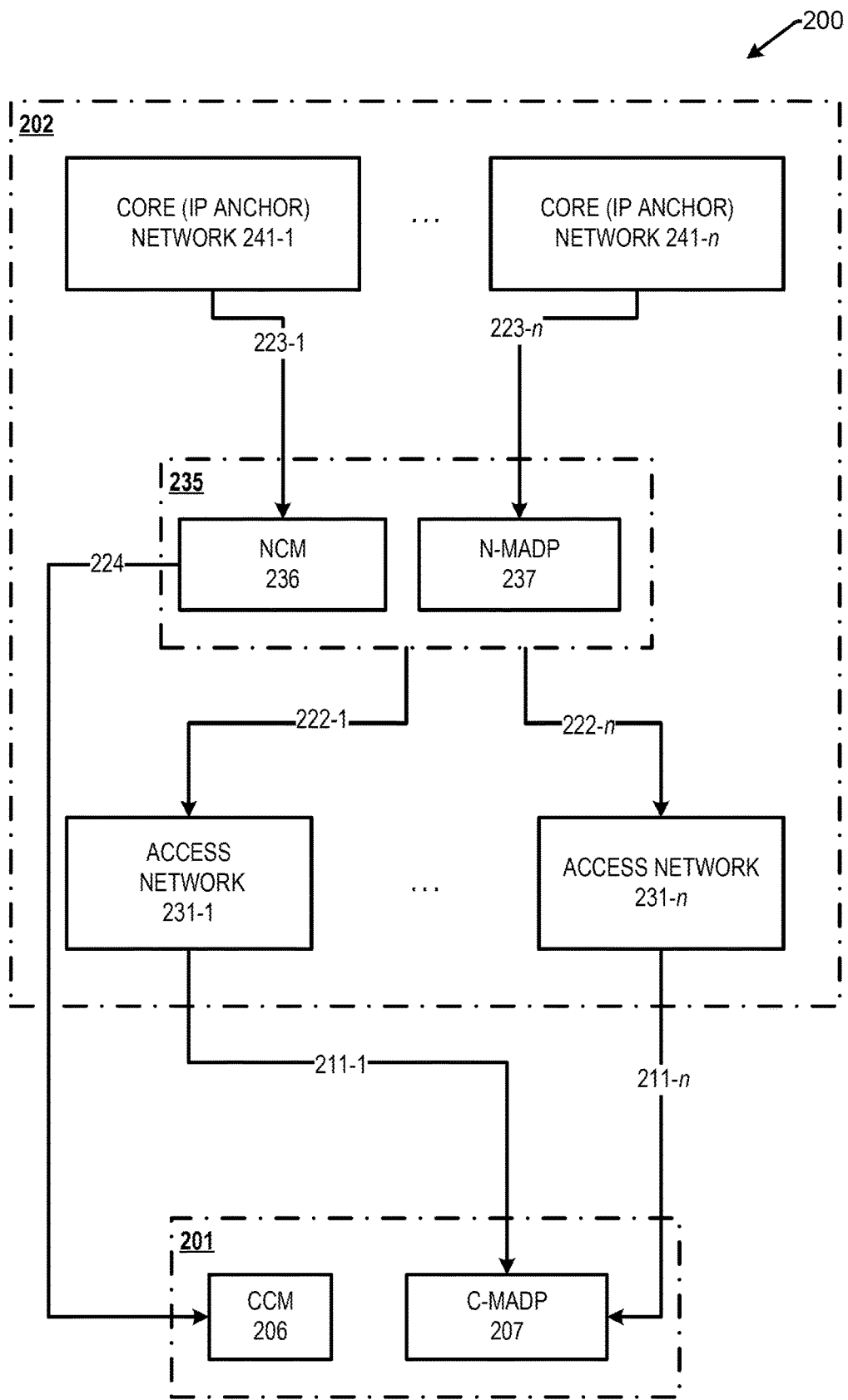
FIG. 2 illustrates an example MAMS reference architecture, according to various embodiments.

FIG. 2 illustrates an example MAMS reference architecture 200 for a scenario of a client served by n networks (where n is a number). The MAMS framework allows for dynamic selection and flexible combination of access and core network paths as uplink and downlink for a device connected to multiple communication networks. The multiple communication networks interwork at the user plane. The architecture is extendable to combine any number of networks, as well as any choice of participating network types (e.g., LTE, WLAN, MuLTEfire, DSL, 5G/NR, etc.) and deployment architectures (e.g., with user plane gateway function at the access edge).

FIG. 2 illustrates a scenario of a client 201 served by multiple (1 to n) core networks 241-1 to 241-*n* (where n is a number). The MAMS architecture 200 includes the following functional elements: a client 201 including a Client Connection Manager (CCM) 206 and a Client Multi Access Data Proxy (C-MADP) 207; multiple (1 to n) access networks (ANs) 231 (including AN 231-1 to AN 231-*n*); a MAMS system 235 including a Network Connection manager (NCM) 236 and a Network Multi Access Data Proxy (N-MADP) 237; and the multiple (1 to n) core networks 241-1 to 241-*n*. The CCM 206 and NCM 236 handle CP aspects, and the C-MADP 207 and N-MADP 237 handle UP aspects. The core networks (or simply "cores") 241-1 to 241-*n* are elements that anchor the client's 201 IP address used for communication with applications via the network. One or more of the cores 241-1 to 241-*n* may correspond to cloud computing service(s), core network(s), data center(s), and/or other like back-end system.

The client 201 is an end-user device (e.g., a UE such as UEs XE121 and/or IoT devices XE111 depicted by Figure XE1) supporting connections with multiple access nodes (e.g., edge nodes XE130 in Figure XE1), possibly over different access technologies. When the client 201 is capable of handling multiple network connections, the client 201 may be referred to as a "multiconnectivity client" or the like.

The ANs 231 are network elements in the network that deliver user data packets to the client 201 via respective point-to-point access links 211-1 to 211-*n*, which may include, for example, WiFi links, LTE or NR cellular links, DSL connections, and/or the like. In some implementations, the point-to-point access links 211-1 to 211-*n* may additionally or alternatively include short-range radio links such as, for example, Bluetooth® or BLE, IEEE 802.15.4 based protocols (e.g., 6LoWPAN, WirelessHART, MiWi, Thread, etc.), WiFi-direct, and/or the like. The ANs 231 may correspond to (R)ANs 110 and/or (R)AN nodes 111 of FIG. 1.

The NCM 236 is a functional element in the network that handles MAMS control-plane (CP) procedures. The NCM 236 configures the network (N-MADP 237) and client (C-MADP 207) UP functions, such as negotiating with the client 201 for the use of available AN paths 221-1 to 221-*n*, protocols, and rules for processing the UP traffic, as well as link-monitoring procedures. The CP messages between the NCM 236 and the CCM 206 are transported as an overlay on the user plane, without any impact on the underlying access networks. The NCM 236 handles MAMS CP messages from the client 201 and configures distribution of data packets over the multiple available access paths 221-1 to 221-*n*, delivery paths 222-1 to 222-*n*, and/or core network paths 223-1 to 223-*n*, as well as UP treatment of traffic flows. The CP messages exchanged between the NCM 236 and CCM 206 are transported as an overlay on the UP, without any impact to the underlying ANs 231.

The CP path 224 may be overlaid over any access user plane path. A "path" may be a UDP flow between two hosts, which may be denoted by a 4-tuple (IP source address, IP destination address, source port, destination port). In some embodiments, WebSocket is used for transporting management and control messages between the NCM 236 and CCM 206, wherein MX Control Message are carried over (or encapsulated in) a WebSocket, and the WebSocket is carried over (or encapsulated in) TCP/TLS.

The CCM 206 is a peer functional element in the client 201 for handling MAMS CP procedures. The CCM 206 manages multiple network connections 221-1 to 221-*n* at the client 201, and configures the multiple network paths 221-1 to 221-*n* at the client 201 for transport of user data.

The CCM 206 exchanges MAMS signaling with the NCM 236 to support such functions as the configuration of the UL and DL user network path for transporting user data packets and the adaptive selection of network path by the NCM 236 by reporting on the results of link probing. Link probing and reporting may be used to support adaptive network path selection by the NCM 236. In the DL for user data received by the client 201, the CCM 206 configures C-MADP 207 such that application data packet received over any of the accesses to reach the appropriate application on the client 201. In the UL for the data transmitted by the client 201, the CCM 206 configures the C-MADP 207 to determine the best access links 221 to be used for UL data based on a combination of local policy and network policy delivered by the NCM 236 over link 224.

The C-MADP 207 is an element in the client 201 that handles user data traffic forwarding across multiple network paths. The C-MADP 207 is responsible for MAMS-specific user plane functionalities in the client 201 such as encapsulation, fragmentation, concatenation, reordering, retransmissions, etc. The C-MADP 207 is configured by the CCM 206 based on signaling exchange with the NCM 236 and local policies at the client 201. The CCM 206 configures the selection of delivery connections 222-1 to 222-*n* and the user plane protocols to be used for UL user data traffic based on the signaling exchanged with the NCM 236.

The N-MADP 237 is an entity in the network handles the user data traffic forwarding across multiple network paths. N-MADP 237 is responsible for MAMS-specific user plane ("u-plane") functionalities in the network. Such as encapsulation, fragmentation, concatenation, reordering, retransmission, etc. The N-MADP 237 is the distribution node that routes the UL user plane traffic to the appropriate anchor connection 223-1 to 223-*n* towards a respective core network 241-1 to 241-*n*, and the DL user traffic to the client 201 over the appropriate delivery connection(s) 222-1 to 222-*n*. The anchor connections 223-1 to 223-*n* are network paths from the N-MADP 237 to the user plane gateway (IP anchor) that has assigned an IP address to the client 201, and the delivery connections 222-1 to 222-*n* are network paths from the N-MADP 237 to the client 201.

In the DL, the NCM 236 configures the use of delivery connections, and user plane protocols at the N-MADP 237 for transporting user data traffic. The N-MADP 237 may implement Equal-Cost Multi-Path routing (ECMP) support for the down link traffic. Additionally or alternatively, the N-MADP 237 may be connected to a router or other like network element (e.g., AP XE136 of Figure XE1) with ECMP functionality. The NCM 236 configures the N-MADP 237 with a load balancing algorithm based on static and/or dynamic network policies. These network policies may include assigning access and core paths for specific user data traffic type, data volume based percentage distribution, link availability and feedback information from exchange of MAMS signaling with the CCM 206 at the client 201, and/or the like. The N-MADP 237 can be configured with appropriate user plane protocols to support both per-flow and per-packet traffic distribution across the delivery connections.

In the UL, the N-MADP 237 selects the appropriate anchor connection 223-1 to 223-*n* over which to forward the user data traffic, received from the client 201 via one or more delivery connections 222-1 to 222-*n*. The forwarding rules in the UL at the N-MADP 237 are configured by the NCM 236 based on application requirements (e.g., Enterprise hosted Application flows via a WiFi anchor 241 (e.g., cloud XE144 of Figure XE1), Mobile Operator hosted applications via a cellular core 241 (e.g., CN XE142 of Figure XE1), and/or the like).

The NCM 236 and the N-MADP 237 can be either collocated with one another or instantiated on different network nodes. The NCM 236 can setup multiple N-MADP 237 instances in the network. The NCM 236 controls the selection of an individual N-MADP 237 instance by the client and the rules for distribution of user traffic across the N-MADP 237 instances. In this way, different N-MADP 237 instances may be used to handle different sets of clients for load balancing across clients. Additionally, the different N-MADP 237 instances may be used for different address deployment topologies (e.g., N-MADP 237 hosted at the user plane node at the access edge or in the core network, while the NCM 236 hosted at the access edge node), as well as address access network technology architecture. For example, an N-MADP 237 instance at a CN node 241 may be used to manage traffic distribution across LTE and DSL networks, and another N-MADP 237 instance at a (R)AN node 131/132 may be used to manage traffic distribution across LTE and WiFi traffic. Furthermore, a single client 201 can be configured to use multiple N-MADP 237 instances, which may be used for addressing different application requirements. For example, individual N-MADP 237 instances may be used to handle TCP and UDP transport based traffic.

The CCM 206 and NCM 236 exchange signaling messages to configure the user plane functions, C-MADP 207 and N-MADP 237, at the client and network respectively. The CCM 206 may obtain the CCM 236 credentials (FQDN or IP Address) for sending the initial discovery messages. As an example, the client 201 can obtain the NCM 236 credentials using methods like provisioning, DNS query. Once the discovery process is successful, the (initial) NCM 236 can update and assign additional NCM 236 addresses, for example, based on MCC/MNC tuple information received in the MX Discovery Message, for sending subsequent control plane messages.

The CCM 206 discovers and exchanges capabilities with the NCM. The NCM 236 provides the credentials of the N-MADP 237 end-point and negotiates the parameters for user plane with the CCM 206. CCM 206 configures C-MADP 207 to setup the user plane path (e.g., MPTCP/UDP Proxy Connection) with the N-MADP 237 based on the credentials (e.g., (MPTCP/UDP) Proxy IP address and port, Associated Core Network Path), and the parameters exchanged with the NCM 236. Further, NCM 236 and CCM 206 exchange link status information to adapt traffic steering and user plane treatment with dynamic network conditions. The key procedures are described in details in the following sub-sections.

In embodiments, a UDP (or QUIC) connection may be configured between the C-MADP 207 and the N-MADP 237 to exchange control messages. The control messages may be or include, for example, keep-alive, probe request (REQ)/acknowledgement (ACK), Packet Loss Report (PLR), First Sequence Number (FSN), Coded MX SDU (CMS), Traffic Splitting Update (TSU), Traffic Splitting ACK (TSA) messages, and/or path quality estimation information. The N-MADP 237 end-point IP address and UDP port number of the UDP connection is used to identify MX control PDUs.

The various elements depicted in the example of FIG. 2 may be implemented using a variety of different physical and/or virtualized components. In some embodiments, for example, the elements within MAMS network 202 may be implemented using one or more components of an edge node, such as one or more LTE or 5G RANs, or the MEC system 1600 of FIG. 16 or the like. In some embodiments, the MAMS system 235 may be implemented in or by an individual RAN node, such as one or more of the RAN nodes 111 in FIG. 1. In one example, the MAMS system 235 is implemented as part of the layer 3 (L3) protocol stack (e.g., the RRC layer or the like). In another example, the MAMS system 235 is implemented as part of a layer above L3 such as the network layer (e.g., IP, UDP, QUIC, GTP-U, etc.) data-plane protocol stack of the RAN nodes. In another example of such embodiments, the MAMS system 235 may be is implemented as a separate layer between the L3 and upper layers. In another example of such embodiments, the MAMS system 235 may be implemented in or by a gNB-CU of a CU/DU split architecture. In another example of such embodiments, the MAMS system 235 may be implemented in or by a vBBU pool, or a cloud RAN (C-RAN). In some embodiments, the functional elements within MAMS network 202 may be implemented by one or more network functions (or as a VNF) of CN 150 in FIG. 1. For example, the N-MADP 237 may run on an S-GW or P-GW when CN 150 is an EPC, or the N-MADP 237 may run on a UPF when CN 150 is a 5GC.

In MEC-based implementations (see e.g., FIGS. 16-17), the MAMS system 235 may be implemented in or by a MEC host/server (e.g., MEC host 1602 of FIG. 16) that is located in, or co-located with, a RAN 110 or RAN node 111. The functions that are located in the network side (e.g., the NCM 236 and N-MADP 237) can be hosted either at a centralized location or at the Edge Cloud. They can be deployed either as MEC application (e.g., MEC apps 1626 of FIG. 16) or co-located with other functions (e.g., MEC platform 1632 of FIG. 16). In these embodiments, up-to-date information from the access networks may be provided to the NCM 236 for intelligent network path selection over APIs by the MEC platform (e.g., MEC platform 1632 of FIG. 16) the same way as it exposes RNI over RNI API or BWMS over BWM API. In these embodiments, similar levels of information may be defined for 3GPP access networks as well as for WiFi, MulteFire, DSL, etc., either by amending the existing RNI/BWM APIs or by defining new APIs specific for the new access technologies.

Figure 16:
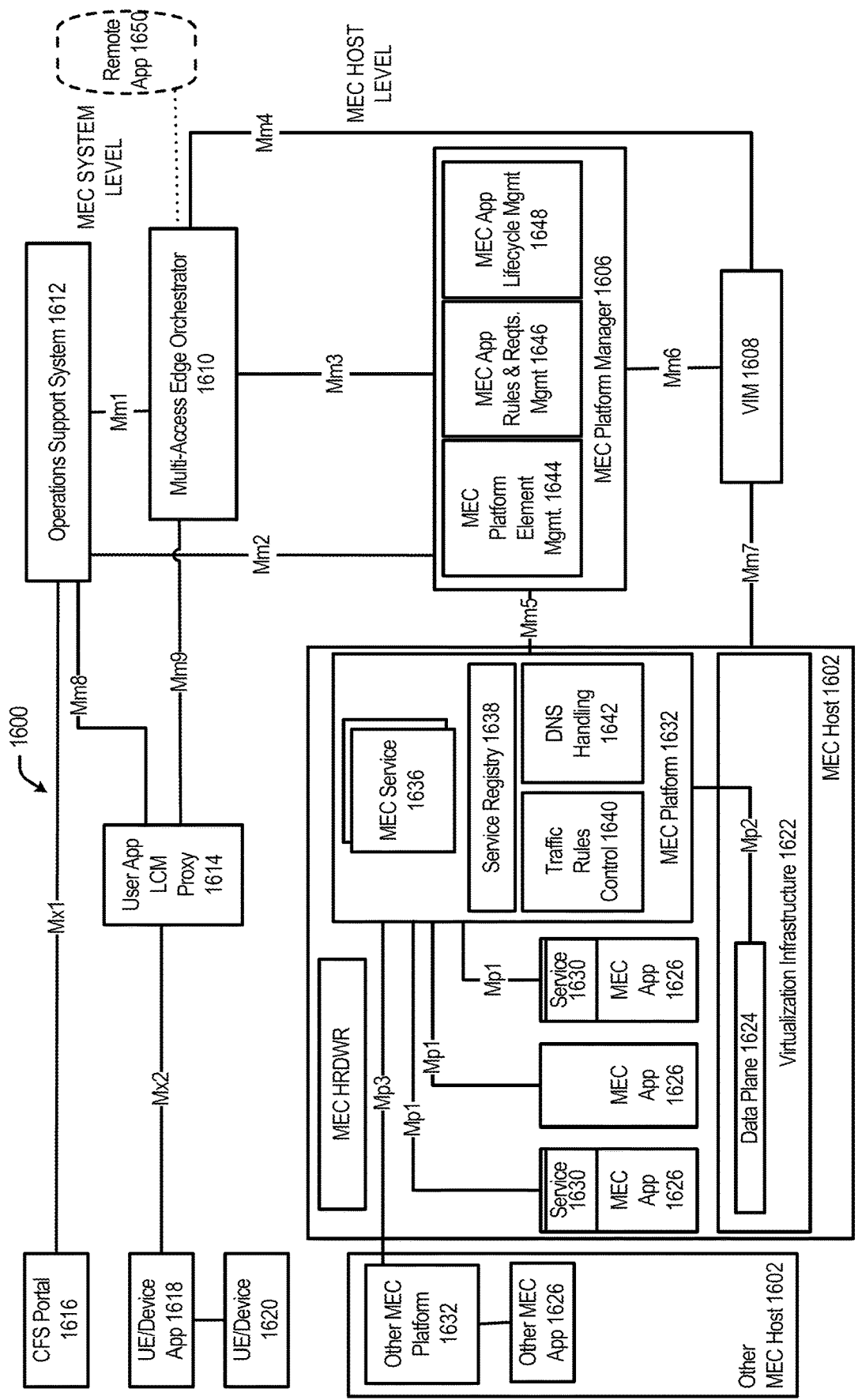
FIG. 16 illustrates an example MEC system reference architecture.

In additional or alternative MEC-based implementations (see e.g., FIGS. 16-17), the NCM 236 can be hosted on a MEC cloud server (e.g., MEC host 1602 and/or MEC app(s) 1626 in FIG. 16) that is located in the UP path at the edge of the multi-technology access network. The NCM 236 and CCM 206 can negotiate the network path combinations based on an application's needs and the necessary UP protocols to be used across the multiple paths. The network conditions reported by the CCM 206 to the NCM 236 can be complemented by a Radio Analytics application (see e.g., [M12]) residing at the MEC cloud server to configure the uplink and downlink access paths according to changing radio and congestion conditions. Additionally or alternatively, the UP functional element (e.g., the N-MADP 237) can either be collocated with the NCM 236 at the MEC cloud server (e.g., MEC-hosted applications, etc.) or placed at a separate network element like a common UP gateway across the multiple networks. Also, even in scenarios where an N-MADP 237 is not deployed, the NCM 206 can be used to augment the traffic steering decisions at the client 201. These enhancements is to improve the end user's QoE by leveraging the best network path based on an application's needs and network conditions, and building on the advantages of significantly reduced latency and the dynamic and real-time exposure of radio network information available at the MEC.

Figure 3:
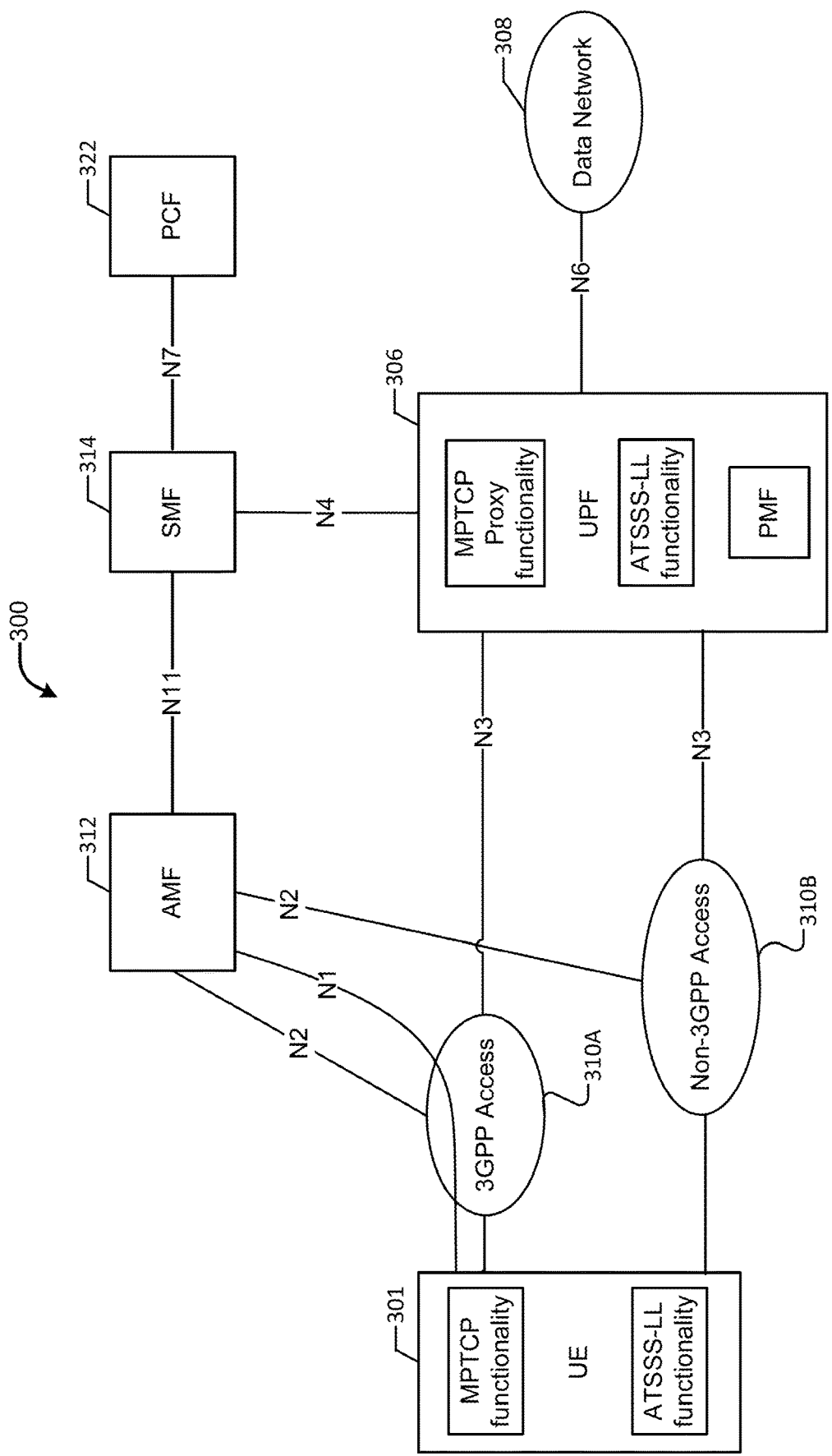
FIG. 3 depicts an example Fifth Generation System (5GS) architecture with Access Traffic Steering, Switching, Splitting (ATSSS) support.

FIG. 3 shows an example Fifth Generation System (5GS) architecture 300 extended to support Access Traffic Steering, Switching, Splitting (ATSSS). In FIG. 3, the UE 301 may be the same or similar as the UE 101, 3GPP access 310A may correspond to the (R)AN 110A of FIG. 1, and non-3GPP access 3101B may correspond to the (R)AN 110B.

The ATSSS feature is an optional feature that may be supported by the UE and the 5GC network. The ATSSS feature enables a multi-access PDU Connectivity Service, which can exchange PDUs between the UE 301 and a data network (DN) 308 by simultaneously using one 3GPP AN 310A and one non-3GPP AN 310B. The multi-access PDU Connectivity Service is realized by establishing a Multi-Access PDU (MA PDU) Session (e.g., a PDU Session that may have UP resources on two access networks). The functionality in the UE 301 that can steer, switch and split the MA PDU Session traffic across 3GPP access 310A and non-3GPP access 310B, is called a "steering functionality".

In this example, the UE 301 supports one or more of the steering functionalities, namely the MPTCP functionality and/or ATSSS lower level (ATSSS-LL) functionality. Each steering functionality in the UE 101 enables traffic steering, switching and splitting across 3GPP access 310A and non-3GPP access 310B, in accordance with the ATSSS rules provided by the network.

The UPF 306 supports MPTCP Proxy functionality, which communicates with the MPTCP functionality in the UE 301 by using the MPTCP protocol. The UPF 306 supports ATSSS-LL functionality, which is similar to the ATSSS-LL functionality defined for the UE 301. There may not be a protocol defined between the ATSSS-LL functionality in the UE 301 and the ATSSS-LL functionality in the UPF 306. In addition, the UPF 306 supports Performance Measurement Functionality (PMF), which may be used by the UE 301 to obtain access performance measurements (see e.g., clause 5.32.5 of [R03]) over the UP of 3GPP access 310A and/or over the UP of non-3GPP access 310B. A UPF 306 that supports the MPTCP Proxy functionality and the PMF can be connected via an N9 reference point instead of the N3 reference point (see e.g., FIGS. 14 and 15).

The UE 301 may request a MA PDU Session when the UE 301 is registered via both 3GPP and non-3GPP accesses 310A-B, or when the UE 301 is registered via one access only. After the establishment of a MA PDU Session, and when there are UP resources on both access networks, the UE 301 applies network-provided policy (e.g., ATSSS rules) and considers local conditions (e.g., network interface availability, signal loss conditions, user preferences, etc.) for deciding how to distribute the uplink traffic across the two access networks. Similarly, the UPF 306 anchor of the MA PDU Session applies network-provided policy (e.g., N4 rules) and feedback information received from the UE via the UP (e.g., signal loss conditions, access network Unavailability or Availability, etc.) for deciding how to distribute the downlink traffic across the two N3/N9 tunnels and the two access networks 310A-B. When there are UP resources on only one access network 310, the UE 301 applies the ATSSS rules 425 and considers local conditions for triggering the establishment or activation of the UP resources over another access 310.

The type of a MA PDU Session may be one of the following types defined in clause 5.6.1 of [R03]: IPv4, IPv6, IPv4v6, and Ethernet. Sections 5.32.6.2.1 and 5.32.6.3.1 in [R03] define what Steering Functionalities can be used for each supported type of a MA PDU Session. The ATSSS feature can be supported over any type of access network, including untrusted and trusted non-3GPP access networks (see clauses 4.2.8 and 5.5 of [R03]), wireline 5G access networks (see e.g., clause 4.2.8 of [R03]), etc., as long as a MA PDU Session can be established over this type of access network 310.

Figure 14:
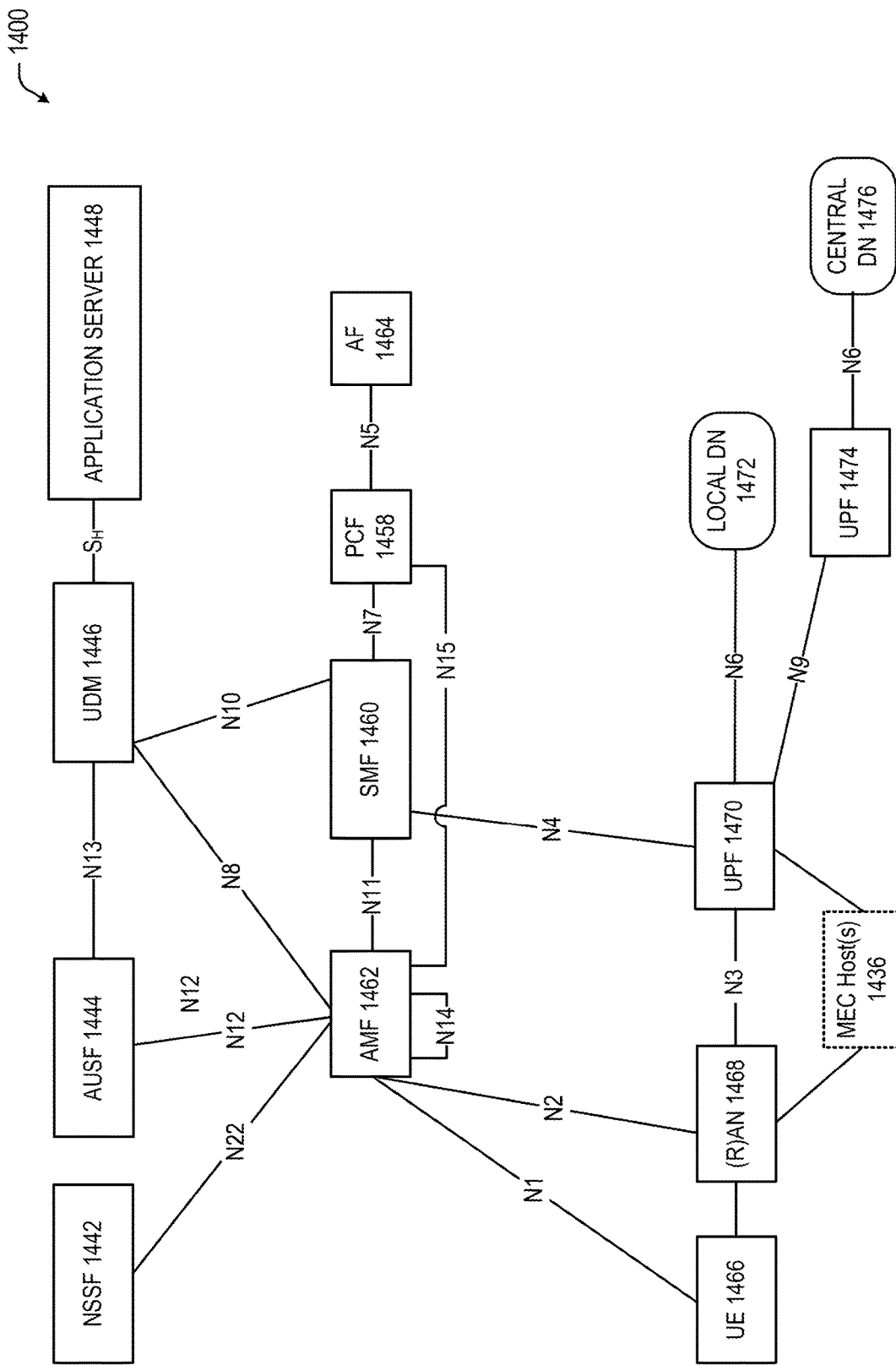
FIG. 14 illustrates an example 5G system architecture deployable in an edge computing system.
Figure 15:
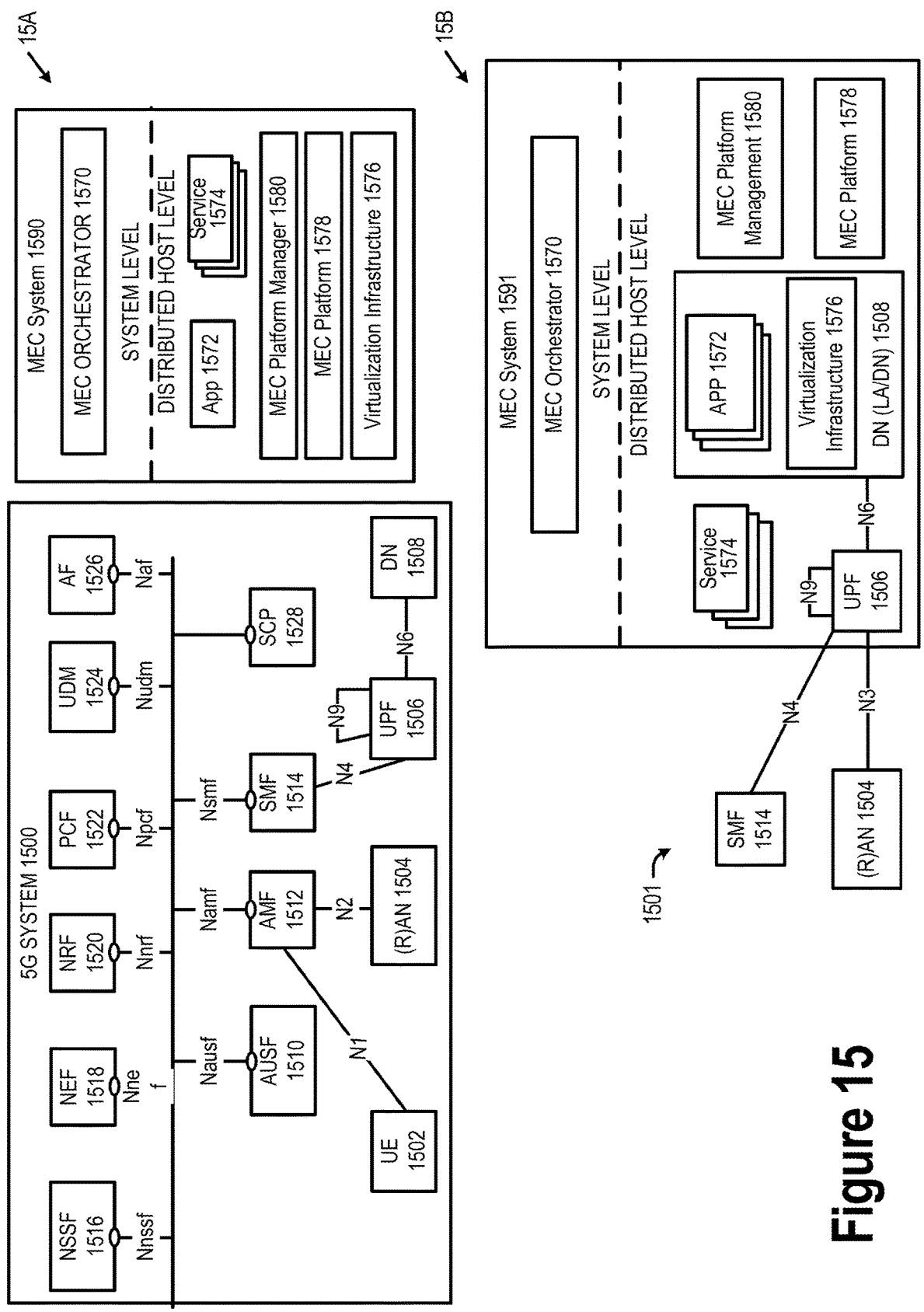
FIG. 15 illustrates a 5G service-based architecture and a MEC architecture deployable in an example edge computing system, and an integrated MEC deployment in a 5G network usable with an example edge computing system.

The AMF 312, SMF 314, and PCF 322 are discussed in more detail infra with respect to FIGS. 14 and 15, and are extended with ATSSS-relevant functionality that is further discussed in clause 5.32 of [R03] and/or clause 4.22.8 of [R03]. For example, an MA PDU Session is managed by the SMF 314, and the UE 301, AMF 312, and SMF 314 may follow the procedures discussed in clause 5.32.2 of [R03] when the UE 301 wants to request a new MA PDU Session. The AMF 312 informs the SMF 314 that the UE 301 is registered over both accesses and this triggers the establishment of UP resources on both accesses. The AMF 312 also informs the SMF 314 when an access type becomes unavailable for an established MA PDU Session, and the SMF 314 subsequently notifies the UPF 306 that the access type has become unavailable. Additionally, during the establishment of a MA PDU session, the PCF 322 may take ATSSS policy decisions and create PCC rules that contain ATSSS policy control information, which determines how the uplink and the downlink traffic of the MA PDU Session should be distributed across the 3GPP and non-3GPP accesses 310 (see e.g., clause 5.32.3 of [R03] and [R07]). The interactions between the UE 301 and PCF 322 that may be required for ATSSS control are specified in [R07].

When an MA PDU Session is established, the network may provide the UE 301 with Measurement Assistance Information (MAI). The MAI assists the UE 301 in determining which measurements should be performed over both accesses 310, as well as whether measurement reports need to be sent to the network. MAI includes the addressing information of a PMF in the UPF 306, and the UE 301 can send PMF protocol messages to the PMF. For a PDU Session of IP type, the MAI contains one IP address for the PMF, one UDP port associated with 3GPP access 310A and another UDP port associated with non-3GPP access 310B. For a PDU Session of Ethernet type, the MAI contains one MAC address associated with 3GPP access 310A and another MAC address associated with non-3GPP access 310B. To protect the PMF in the UPF 306 (e.g., to block DDOS to the PMF), the IP addresses of the PMF are only accessible from the UE 301 IP address via the N3/N9 interface. After the MA PDU Session is released, the same UE 301 IP address/prefix is not allocated to another UE 301 for MA PDU Session in a short time.

The addressing information of the PMF in the UPF 306 is retrieved by the SMF 314 from the UPF 306 during N4 session establishment. The following PMF protocol messages can be exchanged between the UE 301 and the PMF: messages to allow for Round Trip Time (RTT) measurements (e.g., when the "Smallest Delay" steering mode is used); and messages for reporting Access availability/unavailability by the UE 301 to the UPF 306.

The PMF protocol is specified in 3GPP TS 24.193. The PMF protocol messages exchanged between the UE 301 to the UPF 306 use the QoS Flow associated with default QoS rule over the available access(es). The QoS Flow associated with default QoS rule for MA PDU Session is Non-GBR QoS Flow. The UE 301 does not apply the ATSSS rules 425 and the UPF 306 does not apply the Multi-Access Rules (MAR) for the PMF protocol messages.

When the UE requests a MA PDU session and indicates it is capable to support the MPTCP functionality with any steering mode and the ATSSS-LL functionality with only the Active-Standby steering mode (as specified in clause 5.32.6.1 of [R03]), the network may send MAI for the UE 301 to send Access availability/unavailability reports to the UPF 306. In this case, the UE 301 and the UPF 306 do not perform RTT measurements using PMF as the UE 301 and the UPF 306 can use measurements available at the MPTCP layer.

Figure 4:
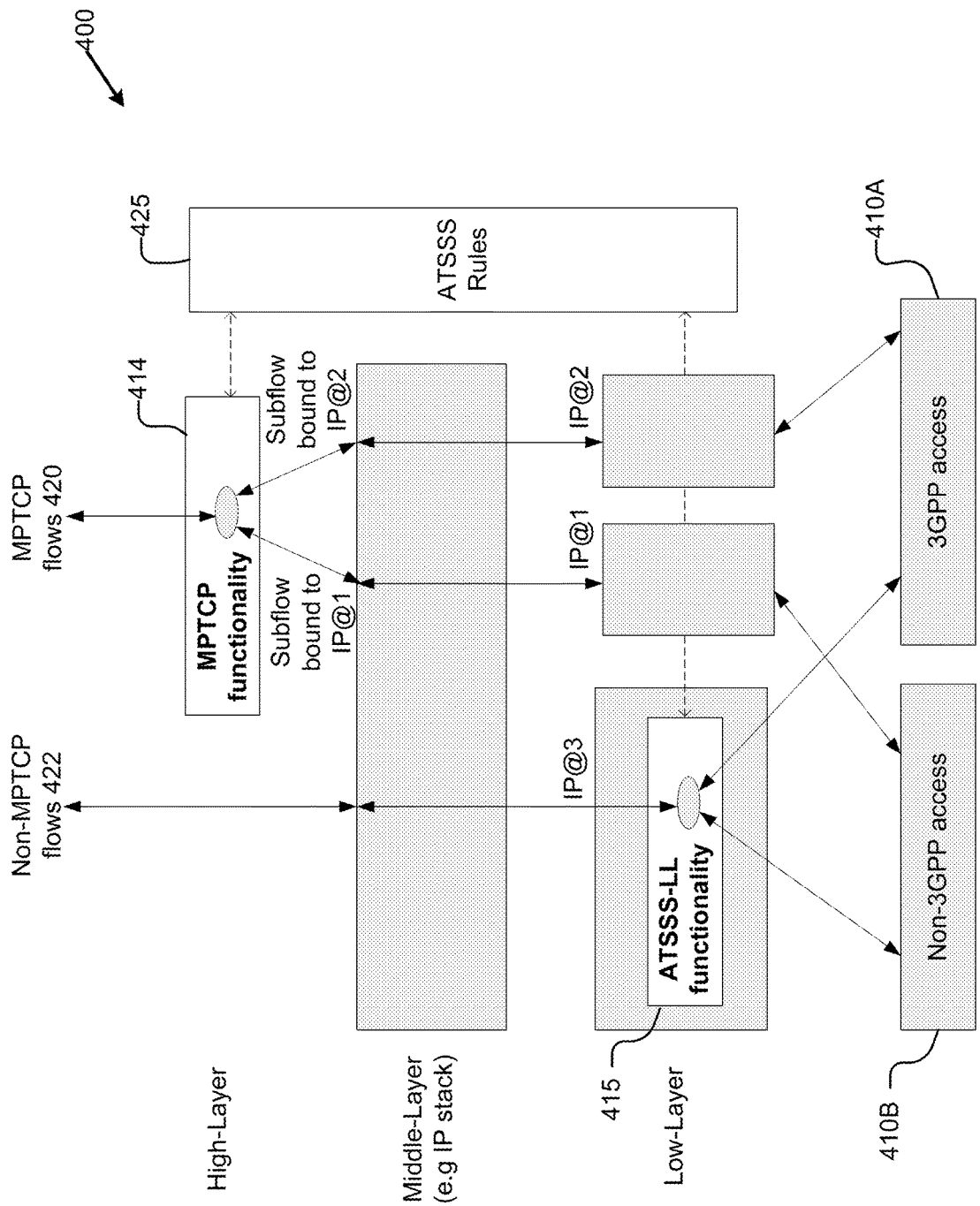
FIG. 4 depicts various steering functionalities, according to various embodiments.

FIG. 4 schematically illustrates steering functionalities framework 400 (also referred to as "ATSSS functionality 400," "ATSSS mechanism 400," "ATSSS 400," or the like) according to various embodiments. ATSSS refers to Access Traffic Steering, Switching, Splitting. Access Traffic Steering is a procedure for selecting an access network for a new data flow and transferring the traffic of this data flow over the selected access network. Access Traffic Switching is a procedure that moves all traffic of an ongoing data flow from one access network to another access network in a way that maintains the (service) continuity of the data flow. Access Traffic Splitting is a procedure that splits the traffic of a data flow across multiple access networks. When traffic splitting is applied to a data flow, some traffic of the data flow is transferred via one access (or access network connection) and some other traffic of the same data flow is transferred via one or more other accesses (or one or more other access network connections). In 3GPP, access traffic steering, switching, and splitting is applicable between one 3GPP access 310A and one non-3GPP access 310B. The steering functionalities framework 400 may be implemented by an ATSSS-capable UE 301 and/or an ATSSS-capable UPF 306. The steering functionalities 400 may support one or more of "high-layer steering functionalities" that operate above the IP layer and/or "low-layer steering functionalities" that operate below the IP layer (e.g., different network interfaces in the UE 301).

In this example, only one high-layer steering functionality is depicted, namely the MPTCP functionality 414 (see e.g., clause 5.32.6.2.1 of [R03]). The MPTCP functionality 414 can be applied to steer, switch and split MPTCP traffic flows 420, which includes the TCP traffic of applications allowed and/or capable of using MPTCP. The MPTCP functionality 414 in the UE 301 may communicate with an associated MPTCP Proxy functionality in the UPF 306, by using the MPTCP protocol over the 3GPP and/or the non-3GPP UP. Additionally, only one type of low-layer steering functionality is depicted, namely the ATSSS-LL functionality 415 (see e.g., clause 5.32.6.3.1 of [R03]). This steering functionality can be applied to steer, switch and split non-MPTCP flows 422, which may include all types of traffic such as TCP traffic, UDP traffic, Ethernet traffic, etc. Steering functionality similar to the ATSSS-LL functionality 415 is also supported in the UPF 306.

The MPTCP flows 420 in FIG. 4 represent the traffic of the applications for which MPTCP can be applied. The three different IP addresses illustrated in the UE 301 are discussed in clause 5.32.6.2.1 of [R03]. Within the same MA PDU Session in the UE 301, it is possible to steer the MPTCP flows 420 by using the MPTCP functionality 414, and simultaneously, to steer all other flows 422 by using the ATSSS-LL functionality 415. For the same packet flow, only one steering functionality may be used in some embodiments.

All steering functionalities in the UE 301 take ATSSS decisions (e.g., decide how to steer, switch and split the traffic) by using the same set of ATSSS rules 425 (see e.g., clause 5.32.8 of [R03]). Similarly, all ATSSS decisions in the UPF 306 are taken by applying the same set of N4 rules, which support ATSSS. The ATSSS rules 425 and the N4 rules supporting ATSSS are provisioned in the UE 301 and in the UPF 306, respectively, when the MA PDU Session is established. If the UE 301 supports both the MPTCP functionality 414 and the ATSSS-LL functionality 415, the UE 301 uses the provisioned ATSSS rules 425 (see e.g., [R07]) to decide, which functionality to apply for taking ATSSS decisions for a specific packet flow.

Additionally, in FIG. 4, if the MPTCP functionality 414 is used (e.g., the "Layer 4 approach"), the MA PDU session contains IP traffics of two interfaces over 3GPP access 310A and Non-3GPP access 310B with two corresponding IP addresses (e.g., IP@1 and IP@2). If the ATSSS-LL functionality 415 is used (e.g., the "Layer 3 approach"), the MA PDU session contains IP traffic of two interfaces over 3GPP access 310A and Non-3GPP access 310B with one common IP addresses (e.g., IP@3). Other ATSSS aspects are discussed in clause 5.32 of [R03].

The MPTCP functionality 414 in the UE 301 may communicate with the MPTCP Proxy functionality in the UPF 306 using the UP of the 3GPP access 310A, the non-3GPP access 310B, or both. The MPTCP functionality 414 is enabled in the UE 301 when the UE 301 requests an MA PDU Session and it provides an "MPTCP capability" in the MA PDU Session Establishment Request message. If the UE 301 indicates it is capable of supporting the MPTCP functionality, and the network (e.g., 5GS) agrees to enable the MPTCP functionality for the MA PDU Session then, the associated MPTCP Proxy functionality is enabled in the UPF 306 for the MA PDU Session.

If the UE 301 indicates it is capable of supporting the MPTCP functionality, and the network (e.g., 5GS) agrees to enable the MPTCP functionality for the MA PDU Session then the network allocates to UE 301 one IP address/prefix for the MA PDU Session and two additional IP addresses/prefixes, called "link-specific multipath" addresses/prefixes; one associated with 3GPP access 310A and another associated with the non-3GPP access 310B. In the UE 301, these two IP addresses/prefixes are used only by the MPTCP functionality 414. Each "link-specific multipath" address/ prefix assigned to UE 301 may not be routable via N6. The MPTCP functionality 414 in the UE 301 and the MPTCP Proxy functionality 414 in the UPF 306 use the "link-specific multipath" addresses/prefixes for subflows over non-3GPP access 310B and over 3GPP access 310A and MPTCP Proxy functionality 414 in the UPF 306 uses the IP address/prefix of the MA PDU session for the communication with the final destination. In FIG. 4, the IP@3 corresponds to the IP address of the MA PDU Session and the IP@1 and IP@2 correspond to the "link-specific multipath" IP addresses. The following UE IP address management applies: the MA PDU IP address/prefix are provided to the UE 301 via mechanisms defined in clause 5.8.2.2 of [R03]; and The "link-specific multipath" IP addresses/prefixes are allocated by the UPF 306 and are provided to the UE 301 via SM NAS signaling.

Additionally, the network sends MPTCP proxy information to the UE 301 (e.g., the IP address(es)), a port number and the type of the MPTCP proxy). The following types of MPTCP proxy 414 may be supported: Type 1: Transport Converter defined in Bonaventure et al., "0-RTT TCP Convert Protocol," draft-ietf-tcpm-converters-05, "0-RTT TCP Convert Protocol", IETF TCPM Working Group (7 Feb. 2019) ("[I05]"). The UE should also support the client extensions specified in [I05]. The MPTCP proxy information is retrieved by the SMF 314 from the UPF 604 during N4 session establishment Additionally, the network may indicate to UE 601 the list of applications for which the MPTCP functionality 414 should be applied. This is achieved by using the Steering Function component of an ATSSS rule (see e.g., clause 5.32.8 in [R03] and/or [R07]).

Additionally, when the UE 301 indicates it is capable of supporting the MPTCP functionality 414 with any steering mode and the ATSSS-LL functionality 415 with only the Active-Standby steering mode (as specified in clause 5.32.6.1 in [R03]) and these functionalities are enabled for the MA PDU Session, then the UE 301 routes via the MA PDU Session the TCP traffic of applications for which the MPTCP functionality 414 should be applied (e.g., the MPTCP traffic 420), as discussed previously. The UE 301 may route all other traffic 422 (e.g., the non-MPTCP traffic) via the MA PDU Session, but this type of traffic may be routed on one of 3GPP access 310A or non-3GPP access 310B based on the received ATSSS rule 425 for non-MPTCP traffic 422 (see clause 5.32.2 in [R03]). The UPF 306 routes all other t traffic 422 (e.g., the non-MPTCP traffic) based on the N4 rules provided by the SMF 314. This may include N4 rules for ATSSS-LL 415, using any steering mode as instructed by the N4 rules.

The ATSSS-LL functionality 415 in the UE 301 does not apply a specific protocol. It is a data switching function, which decides how to steer, switch and split the uplink traffic across 3GPP and non-3GPP accesses 310A-B based on the provisioned ATSSS rules 425 and local conditions (e.g. signal loss conditions, etc.). The ATSSS-LL functionality 415 in the UE 30 may be applied to steer, switch and split all types of traffic, including TCP traffic, UDP traffic, Ethernet traffic, etc. The ATSSS-LL functionality 415 may be enabled in the UE 301 when the UE 301 provides an "ATSSS-LL capability" during the PDU Session Establishment procedure.

The ATSSS-LL functionality 415 is mandatory in the UE 301 for MA PDU Session of type Ethernet. When the UE 301 does not support the MPTCP functionality 414, the ATSSS-LL functionality 415 is mandatory in the UE 301 for an MA PDU Session of type IP. When the UE 301 supports the MPTCP functionality 414, the ATSSS-LL functionality 415 with Active-Standby Steering Mode is mandatory in the UE 301 for an MA PDU Session of type IP to support non-MPTCP traffic.

The network (e.g., UPF 306) also supports the ATSSS-LL functionality 415 as defined for the UE 301. The ATSSS-LL functionality 415 in the UPF 306 is enabled for an MA PDU Session by the ATSSS-LL functionality 415 indication received in the Multi-Access Rules (MAR) and/or when the UE 301 provides an "ATSSS-LL capability" in the MA PDU Session Establishment Request message.

I.a. Application Control for MEC MAMS and 5G ATSSS

Embodiments of the present disclosure allow third party applications to influence multi-access traffic steering decisions, as well as get informed of various multi-access traffic steering capabilities in MEC and/or 5GS. The embodiments herein include Traffic Management Service (TMS) APIs to support the requirements defined for ETSI MEC. The embodiments herein also enhance the API interface (e.g., Mp1 in ETSI MEC, 3GPP NEF, or the like) such that the application can influence the multi-access traffic steering decisions and also get informed of various multi-access traffic steering modes.

Figure 5:
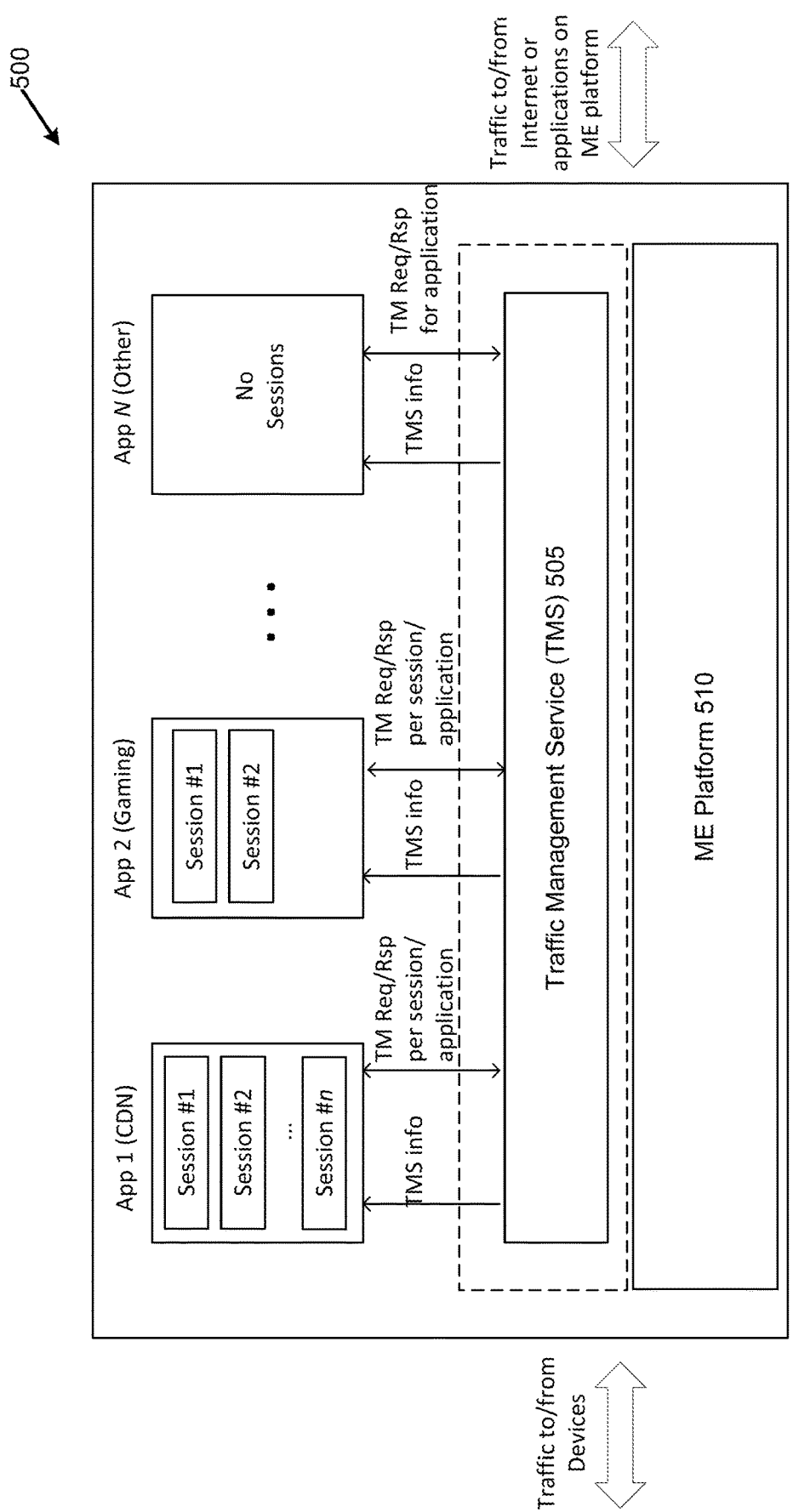
FIG. 5 illustrates an example Traffic Management Service (TMS) architecture according to various embodiments.

FIG. 5 illustrates an example TMS architecture 500 according to various embodiments. TMS architecture 500 includes the TMS 505, ME platform 510 (corresponding to MEC platform 1632 and/or MEC Platform VNF 1702 of FIG. 17), and applications (Apps) 1 to N (where N is a number). As an example, the App 1 may be a CDN app/service hosting 1 to n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as ME platform 510) and consumers (e.g., UEs 301, user apps instantiated by individual UEs 301, other servers/services, network functions, application functions, etc.). Each session represents an interactive information exchange between two or more elements, such as a client-side app and its corresponding server-side app, a user app instantiated by a UE 301 and a MEC app instantiated by the ME platform 510, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or MA PDU session. A PDU session is an association between a UE 301 and a Data Network 308 that provides a PDU connectivity service, which is a service that provides for the exchange of PDUs between a UE 301 and a Data Network 308. An MA PDU session is a PDU Session that provides a PDU connectivity service, which can use one access network at a time, or simultaneously a 3GPP access network 310A and a non-3GPP access network 310B. Furthermore, each session may be associated with a session identifier (ID) which is data the uniquely identifies a session, and each App (or App instance) may be associated with an App ID (or App instance ID) which is data the uniquely identifies an App (or App instance).

The TMS 505 provides Bandwidth Management (BWM) services and Multi-access Traffic Steering (MTS) services to MTS consumers (e.g., Apps 1 to N). The TMS 505 may optionally run as part of the platform (e.g., ME platform 510) or as an application (e.g., ME app). Different Apps 1 to N, whether managing a single instance or several sessions (e.g., CDN), may request specific BWM and/or MTS requirements for the whole application instance or different requirements per session. The TMS 505 may aggregate all the requests and act in a manner that will help optimize the BW usage and improve Quality of Experience (QoE) for applications.

Different MEC applications (apps) running in parallel on the same MEC host may require specific static/dynamic up/down bandwidth (BW) resources, including BW size and BW priority. In some cases different sessions running in parallel on the same app may each have specific BW requirements. In addition, sessions driven by Apps running from closer to end users (e.g., shorter RTT) may receive unfair advantage over session driven by apps running from distant locations (e.g., outside the RAN). To resolve potential resource conflicts between such competing applications, BWM and/or MTS services may be used.

The BWM service is for allocating/adjusting BW resources for MEC apps, and allows MEC apps to provide their BW requirements. The MTS service is for seamlessly steering/splitting/duplicating app data traffic across multiple access network connections. The MTS service allows apps/MEC apps to get informed of various MTS capabilities and MX network connection info. The MTS also allows MEC apps to provide requirements (e.g., delay, throughput, loss, etc.) for influencing traffic management operations. The specific session or app/MEC app may be identified using a set of filters and/or identifiers (IDs) within the resource request.

Figure 7:
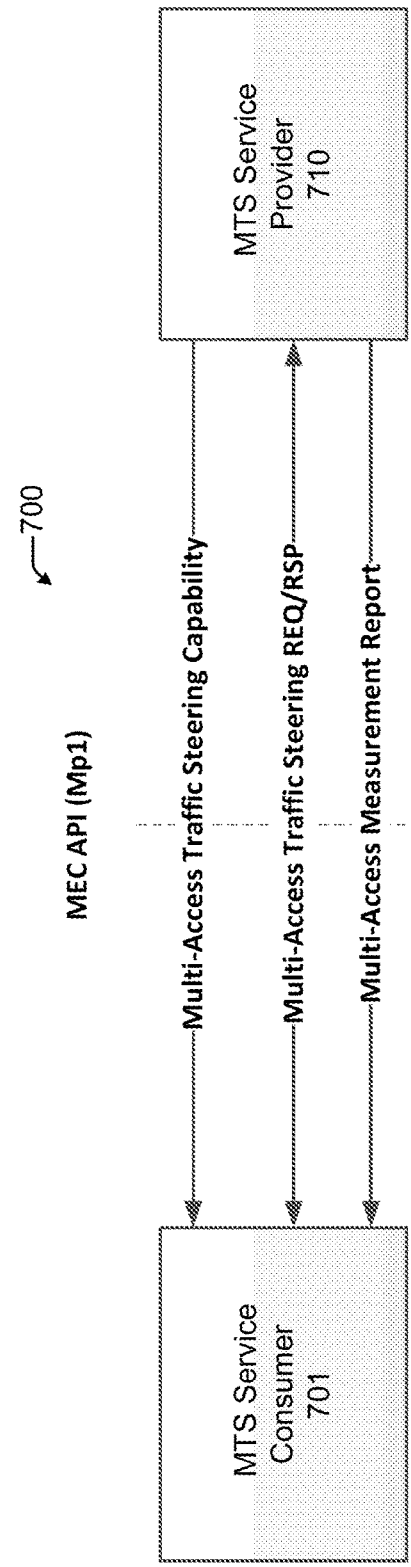
FIG. 7 depicts an example message exchange architecture according to various embodiments.
Figure 8:
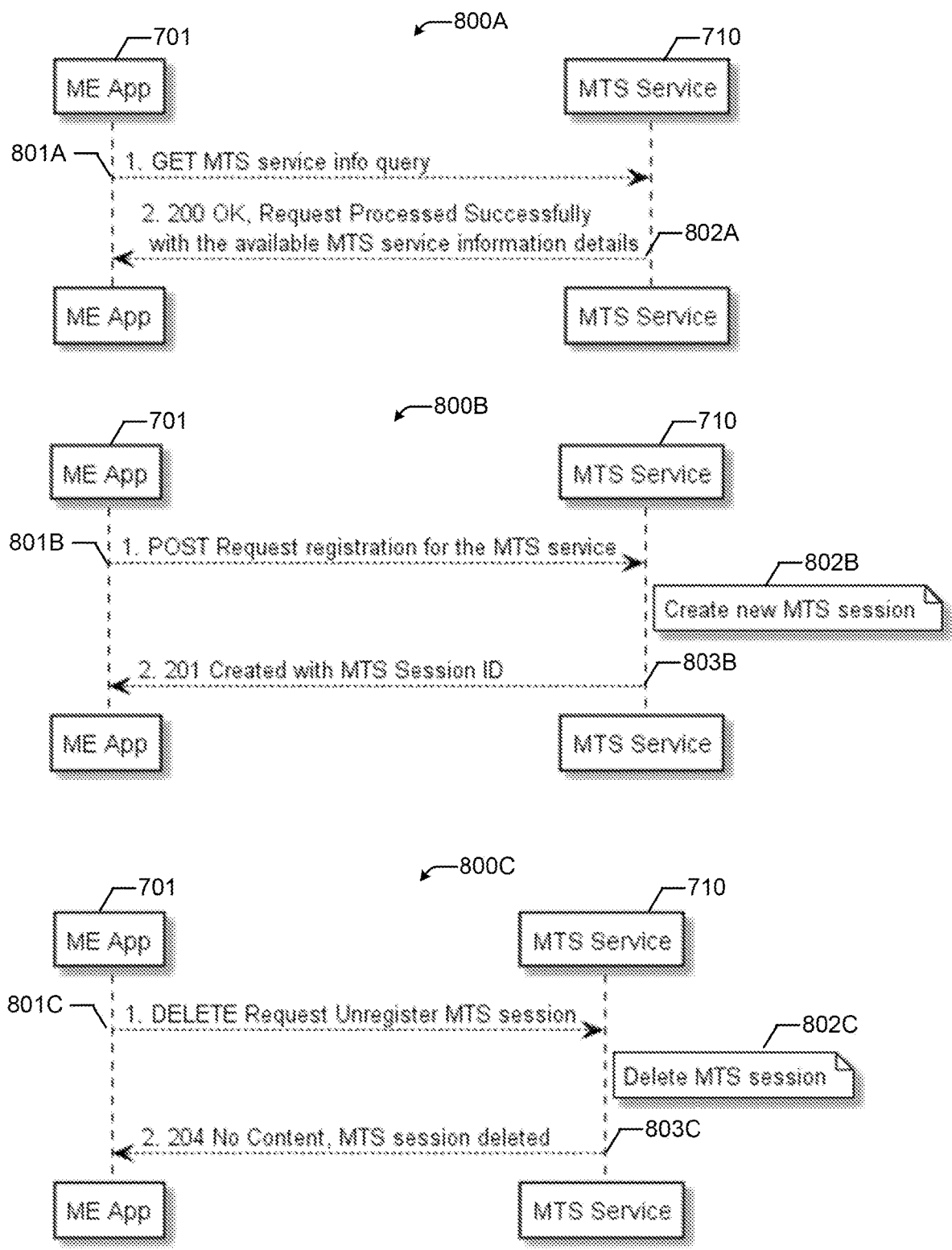
FIGS. 8-9 illustrate various example MTS application programming interface (API) procedures according to various embodiments.
Figure 9:
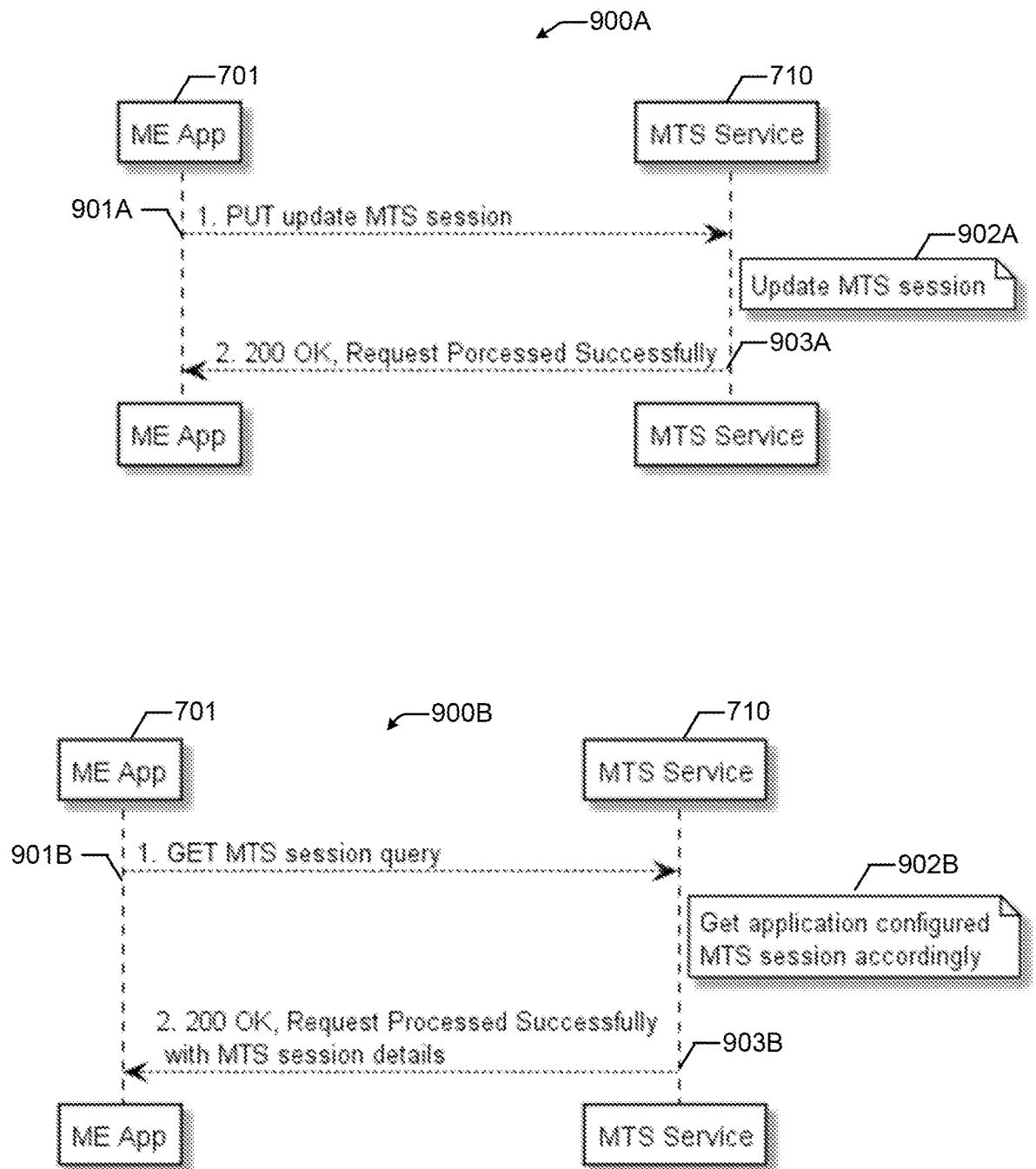

The TMS 505 provides a TMS API that supports both queries and subscriptions (e.g., pub/sub mechanism) that are used over a Representational State Transfer ("REST" or "RESTful") API or over alternative transports such as a message bus. For RESTful architectural style, the TM APIs contain the HTTP protocol bindings for traffic management functionality. Some procedures/operations of the TMS API are depicted by FIGS. 7-9.

Each Hypertext Transfer Protocol (HTTP) message is either a request or a response. A server listens on a connection for a request, parses each message received, interprets the message semantics in relation to the identified request target, and responds to that request with one or more response messages. A client constructs request messages to communicate specific intentions, examines received responses to see if the intentions were carried out, and determines how to interpret the results. The target of an HTTP request is called a "resource." Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything, and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For the purposes of HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see e.g., IETF RFC 7231 (2014 June)).

Figure 6:
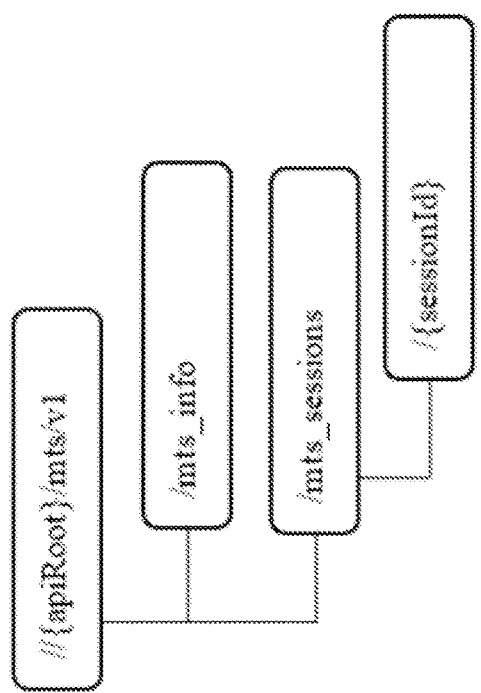
FIG. 6 illustrates a resource Universal Resource Indicator (URI) structure of the MTS API according to various embodiments.

FIG. 6 illustrates a resource Universal Resource Indicator (URI) structure of the MTS API according to various embodiments. Table 1 provides an overview of the resources and the applicable HTTP methods defined by the MTS API. The MTS API supports additional application-related error information to be provided in the HTTP response when an error occurs (see e.g., clause 6.15 of ETSI GS MEC 009 V2.1.1 (2019 January) ("[R06]")).

TABLE 1

MTS HTTP methods overview

| Resource name | Resource URI | HTTP method | Meaning |
| --- | --- | --- | --- |
| Traffic Management service information | /mts_info | GET | Retrieve the traffic management service information |
| A list of traffic management sessions | /mts_sessions | GET | Retrieve information about a list of MTS sessions |
|  |  | POST | Create a MTS session |
| Individual traffic management session | /mts_sessions/{sessionId} | GET | Retrieve information about specific MTS session |
|  |  | PUT | Update the information about specific MTS session |
|  |  | DELETE | Remove specific MTS session |

The syntax of each resource URI follows [R06], as well as IETF RFC 3986 (2005 January) or IETF RFC 7320 (2014 July). In the RESTful MEC service APIs, including the VIS API, the resource URI structure for each API has the following structure: {apiRoot}/{apiName}/{apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under control of the deployment, whereas the remaining parts of the URI are under control of the API specification. In the above root, "apiRoot" and "apiName" are discovered using the service registry (see e.g., service registry 1638 in FIG. 16). It includes the scheme ("http" or "https"), host and optional port, and an optional prefix string. For the MTS API, the "apiName" may be set to "mts" and "apiVersion" may be set to a suitable version number (e.g., "v1" for version 1). The MEC APIs support HTTP over TLS (also known as HTTPS). All resource URIs in the MTS procedures (see e.g., FIGS. 7-10) are defined relative to the above root URI.

The JSON content format may also be supported. The JSON format is signaled by the content type "application/json". The MTS API may use the OAuth 2.0 client credentials grant type with bearer tokens (see e.g., [R06]). The token endpoint can be discovered as part of the service availability query procedure defined in [R06]. The client credentials may be provisioned into the MEC app using known provisioning mechanisms.

FIG. 7 depicts an example message exchange architecture 700 according to various embodiments. In this example, an MTS service consumer 701 (e.g., ME app) can get informed of MX traffic steering capability/modes from an MTS service provider 710 (e.g., a ME platform, MAMS server 140, etc.). In embodiments, the MTS service consumer 701 may obtain MX traffic steering capability/modes available on the ME platform as well as real-time measurement reports. The MTS service consumer 701 can also influence the MX traffic steering decisions using a MEC API to pass various messages to one another over the Mp1 interface. The messages to be passed may include one or more of the following new API messages: Multi-Access Traffic Steering Capability; Multi-Access Traffic Steering Request (REQ); Multi-Access Traffic Steering Response (RSP); and Multi-Access Measurement Report. Alternatively, the various API messages can be added to the NEF in the 3GPP 5GS, such as the NEF Northbound API (see e.g., 3GPP TS 29.522 v16.0.0 (2019 Jun. 18) ("[ts29522]").

The new "Multi-Access Traffic Steering Capability" message may include a Multi-Access Traffic Steering Mode data element, data field, IE, etc., which includes a list of supported Multi-Access Traffic Steering Modes (e.g., MPTCP, MPQUIC, MAMS, etc.). For each listed Multi-Access Traffic Steering mode, the Multi-Access Traffic Steering Capability message may include a data element, data field, IE, etc., for each of the following: a list of access networks that can be used for this mode; a Traffic Direction indicator to indicate the list of supported traffic steering modes is for downlink, uplink, or both; a list of supported dynamic multi-access traffic steering modes including, for example, lowest cost, lowest latency, maximum throughput mode #1, maximum throughput mode #2, and QoS-based; and a list of supported static multi-access traffic steering modes (e.g., the static multi-access traffic steering modes may include steering, splitting, and duplication).

For each listed access network, the Multi-Access Traffic Steering Capability message may include a data element, data field, IE, etc., for each of the following elements: Access Network ID to uniquely identify the access network; Access Network Type, for example, Wi-Fi, LTE, 5G, MulteFire, Bluetooth® or BLE, and/or the like; and Access Network Cost, for example, indicating whether the access network is metered, unmetered, or the like.

The new "Multi-Access Traffic Steering Request" message may include a data element, data field, IE, etc., for each of the following elements: a Traffic Steering REQ ID to uniquely identify this traffic steering request; IP Packet Filter Set to identify the IP flows that the requested traffic steering rule applies, and may include IP source (src)/destination (dst) addresses (addr), src/dst port, and protocol type (number); Traffic Direction indicator to indicate downlink, uplink, or both; and Traffic Steering preferences/modes, which indicates whether a dynamic mode or static mode is preferable. Additionally or alternatively, the IP Packet Filter Set could include a differentiated services codepoint (DSCP) in an IPv4 header or Traffic Class in an IPv6 header. Additionally or alternatively, the IP Packet Filter Set could include a flow label in the IP header (e.g., an IPv6 header).

When Dynamic Mode is indicated in the Traffic Steering preferences/modes field, one of the following options may be included to steer traffic across multiple access networks dynamically: Lowest Cost (default): always use the unmetered access network whenever it is available; Lowest Latency: use the access network with lowest e2e delay; Maximum Throughput Mode #1 (without packet-level splitting): use the access network with higher throughput; Maximum Throughput Mode #2 (with packet-level splitting): use multiple access networks to get higher throughput when possible; and/or QoS-based Mode: perform multi-access traffic steering to meet the QoS requirements. If "QoS-based Mode" is included, the following data element, data field, IE, etc., may also be included: QoS Requirements to indicate the desired maximum e2e latency (ms), minimum throughput/bandwidth (bps), and tolerable packet loss rate (%).

When Static Mode is indicated in the Traffic Steering preferences/modes field, one of the following options may be used to steer or split traffic across multiple access networks dynamically: Steering (e.g., only use one access network at a time); Splitting/Aggregation (e.g., use multiple access network simultaneously); and/or Duplication (e.g., sending the same packet over multiple access networks).

If "Static Steering Mode" is included (or Static Mode is indicated in the Traffic Steering preferences/modes field), the following data element, data field, IE, etc., may also be included: Access Network ID to identify the access network that should be used to deliver the traffic.

If "Static Splitting/Aggregation Mode", the following data element, data field, IE, etc., may also be included: a list of Access Networks used to deliver traffic. For each listed access network, the following data elements, data fields, IEs, etc., may also be included: Access Network ID to identify the access network; and/or Traffic Load Ratio (%) to identify how much traffic is delivered over the access network.

The new "Multi-Access Traffic Steering Response" message may include a data element, data field, IE, etc., for each of the following elements: Traffic Steering REQ ID to uniquely identify this traffic steering request; and/or Result to indicate whether the request was accepted or rejected. If rejected, in some embodiments, a cause or reason value may be included to indicate why the request was rejected.

The new "Multi-Access Measurement Report" message may include a data element, data field, IE, etc., for a list of Access Networks that may be available for the application. For each listed access network, the following data elements, data fields, IEs, etc., may also be included: access network ID; direction (e.g., downlink or uplink); average e2e (end-to-end) packet loss rate; average/min/max e2e available bandwidth; average/min/max e2e round trip time; and/or average/min/max one way delay (only possible if client and network are time-synchronized).

FIGS. 8-9 illustrate various example MTS API procedures according to various embodiments. In the procedures of FIGS. 8-9, an MTS service consumer 701 (e.g., an ME app instance) uses TMS API(s) to update/receive MTS information (info) to/from an MTS service provider 710 (e.g., a MEC platform). The TMS APIs enable all registered MTS service consumers (applications) to statically and/or dynamically register for specific MTS requirements per session/application. In the procedures of FIGS. 8-9, the MTS service consumer 701 sends a request for MTS info. In response to the request, the MTS service provider 710, which is the MTS service provider 710 generates a response including the requested information, and sends the response to the service consumer. The MTS service consumer 701 receives the response including the requested information from the MTS service provider 710.

used to represent an MTS service instance, which follows the resource data type of MtsInfo. The MTS info resource supports the resource URI variable "apiRoot" discussed previously. The MTS info resource has a Resource URL of "{apiRoot}/mts/v1/mts_info". In some embodiments, the request may include a service consumer instance ID and/or one or more application instance IDs as input parameter(s), which may be included in a message body of the request message.

At operation 802A, the MTS service 710 responds with the available MTS service information details. In this embodiment, the response is an HTTP response message including the status code "200 OK" in the header of the HTTP message, which indicates that the service consumer's 701 request succeeded (i.e., that the request was processed successfully). Additionally, an MTS service info data structure (e.g., MtsInfo) is included in the body of the HTTP response message. In some embodiments, the response message may include an MtsInfo IE, field, data field, data element, or the like to include the MtsInfo data structure.

In this embodiment, the MTS consumer 701 uses the GET method to obtain (e.g., read/query for) the MTS service info from the MTS service 710. This GET method supports the request and response data structures, and response codes, as specified in table 2.

TABLE 2

Data structures supported by the GET request/response on this resource

| | | Data type | Cardinality | Remarks |
|---|---|---|---|---|
| Request body | | n/a | | |

| | | Data type | Cardinality | Response Codes | Remarks |
|---|---|---|---|---|---|
| Response body | MtsInfo | | 1 | 200 OK | Upon success, a response body containing the MTS service information is returned. |
| | ProblemDetails | | 0 . . . 1 | 400 Bad Request | It is used to indicate that incorrect parameters were passed in the request. This error condition can also occur if the target area for the request is considered too large. In the returned ProblemDetails structure, the "detail" attribute should convey more information about the error. |
| | ProblemDetails | | 1 | 403 Forbidden | The operation is not allowed given the current status of the resource. More information shall be provided in the "detail" attribute of the "ProblemDetails" structure. |
| | ProblemDetails | | 0 . . . 1 | 404 Not Found | It is used when a client provided a URI that cannot be mapped to a valid resource URI. In the returned ProblemDetails structure, the "detail" attribute should convey more information about the error. |

FIG. 8 illustrates an MTS API procedure 800A for obtaining MTS service information (info) according to various embodiments. Procedure 800A allows the ME app instance 701 to obtain available MTS service info from the MTS service 710. Procedure 800A begins at operation 801A where the ME application instance 701 sends a request to get the available MTS service information. In this embodiment, the MTS service 710 is a resource representing MTS info details of the MTS service 710. An MTS info resource is As shown by table 2, the response body may include the MtsInfo data structure. The MtsInfo may be a resource data type. The MtsInfo type represents the MTS information for one or more access network connections. This information may be per access network connection based (e.g., tailored to a specific access network, RAT, or individual link). The attributes of the MtsInfo may follow the notations provided by table 3.

TABLE 3

Attributes of the MtsInfo

| Attribute name | Data type | Cardinality | Description |
| --- | --- | --- | --- |
| timeStamp | Structure (inlined) | 0 . . . 1 | Time stamp to indicate when the corresponding information elements are sent |
| >seconds | Uint32 | 1 | Time in seconds in Unix-time since Jan. 1, 1970, 00:00:00 UTC |
| >nanoSeconds | Uint32 | 1 | Time in nanoseconds in Unix-time since Jan. 1, 1970, 00:00:00 UTC |
| mtsAccessInfo | Structure (inlined) | 1 . . . N | The information on access network connection as defined below |
| >accessId | Uint32 | 1 | Unique identifier for the access network connection |
| >accessType | Uint32 | 1 | Numeric value (0-255) corresponding to specific type of access network as following:<br>0 = Unknown<br>1 = Any IEEE802.11-based WLAN technology<br>2 = Any 3GPP-based Cellular technology<br>3 = Any Fixed Access<br>11 = IEEE802.11 a/b/g WLAN<br>12 = IEEE 802.11 a/b/g/n WLAN<br>13 = IEEE 802.11 a/b/g/n/ac WLAN<br>14 = IEEE 802.11 a/b/g/n/ac/ax WLAN (Wi-Fi 6)<br>15 = IEEE 802.11 b/g/n WLAN<br>31 = 3GPP GERAN/UTRA (2G/3G)<br>32 = 3GPP E-UTRA (4G/LTE)<br>33 = 3GPP NR (5G) |
| >metered | Uint32 | 1 | Numeric value (0-255) corresponding to the following:<br>0: the connection is not metered (NOTE 1)<br>1: the connection is metered<br>2: unknown |
| mtsMode | Uint32 | 1 . . . N | Numeric value corresponding to a specific MTS operation supported by the TMS<br>0 = low cost, e.g., using the unmetered access network connection whenever it is available<br>1 = low latency, e.g., using the access network connection with lower latency<br>2 = high throughput, e.g., using the access network connection with higher throughput, or/and multiple access network connection simultaneously if supported<br>3 = redundancy, e.g., sending duplicated (redundancy) packets over multiple access network connections for high-reliability and low-latency applications<br>4 = QoS, e.g., performing MTS based on the specific QoS requirements from the app |

(NOTE 1):
A metered connection is a network connection that has a maximum data usage in a specific period, e.g., per hour/day/week/month. The user may get billed extra charges if they go over the allotted amount.

FIG. 8 also includes an MTS service registration procedure 800B, according to various embodiments. Procedure 800B allows the ME app 701 to register to (with) the MTS service 710. Procedure 800 begins at operation 801B where the ME application instance 701 sends a request to register to the MTS service with the requested requirements. In this embodiment, the MTS service 710 is a resource representing one or more MTS sessions being handled by the MTS service 710. An MTS sessions resource (or 'a list of MTS sessions' resource) is used to represent a list of MTS sessions. The MTS sessions resource may follow the resource data type of TmInfo. The MTS sessions resource has a Resource URL of "{apiRoot}/mts/v1/mts_sessions". The MTS sessions resource supports the resource URI variable "apiRoot" discussed previously. In some embodiments, the request may include a service consumer instance ID, app instance IDs, and/or one or more session IDs as input parameter(s), which may be included in a message body of the request message.

At operation 802B, the MTS service 710 creates a new MTS session, and at operation 803B, the MTS service 710 responds with a registration and initialization approval. In this embodiment, the response is an HTTP response message including the status code "201 Created" in the header of the HTTP message, which indicates that the service consumer's 701 request has been fulfilled resulting in the creation of a new resource (i.e., the new MTS session). The response message also includes a session ID generated for the newly created session. For example, a traffic management info data structure (e.g., TmInfo) may be included in the body of the HTTP response message, which may be carried in a suitable TmInfo IE, field, data field, data element, or the like. The MTS service consumer 701 may store this session ID (or the entire contents of the TmInfo data structure) in a suitable data structure for later usage.

In this embodiment, the MTS consumer 701 uses the POST method to create an MTS session. This POST method supports the request and response data structures, and response codes, as specified in table 4.

TABLE 4

Data structures supported by the POST request/response on this resource

|  | Data type | Cardinality | Remarks |
|---|---|---|---|
| Request body | TmInfo | 1 | Entity body in the request contains TmInfo to be created. |

| | Data type | Cardinality | Response codes | Remarks |
|---|---|---|---|---|
| Response body | TmInfo | 1 | 201 Created | Upon success, the HTTP response shall include a "Location" HTTP header that contains the resource URI of the created resource. |
| | ProblemDetails | 0 . . . 1 | 400 Bad Request | It is used to indicate that incorrect parameters were passed to the request. In the returned ProblemDetails structure, the "detail" attribute should convey more information about the error. |
| | ProblemDetails | 0 . . . 1 | 404 Not Found | It is used when a client provided a URI that cannot be mapped to a valid resource URI. In the returned ProblemDetails structure, the "detail" attribute should convey more information about the error. |
| | ProblemDetails | 1 | 403 Forbidden | The operation is not allowed given the current status of the resource. More information shall be provided in the "detail" attribute of the "ProblemDetails" structure. |

FIG. 8 also includes and MTS service unregistration procedure 800C, according to various embodiments. Procedure 800C allows the ME app 701 to unregister from the TS service 710. Procedure 800 begins at operation 801C where the ME application instance 701 sends an unregister request to the MTS service 710. In this embodiment, the MTS service 710 is a resource representing an individual MTS session being handled by the MTS service 710. The MTS individual session resource is used to represent an MTS instance, which follows the resource data type of TmInfo. The MTS individual session resource has a Resource URL of "{apiRoot}/mts/v1/mts_sessions/{sessionId}", where the parameter {sessionId} represents the session ID to be unregistered. The session ID may be the session ID obtained when the session was created (see e.g., procedure 800B). The MTS individual session resource supports the resource URI variables defined in table 5.

TABLE 5

Resource URL Variables for resource "individual MTS session"

| Name | Definition |
|---|---|
| apiRoot | See FIG. 6 and related discussion |
| sessionId | Represents a MTS session instance |

In some embodiments, the request may include a service consumer instance ID, app instance IDs, and/or one or more session IDs as input parameter(s), which may be included in a message body of the request message. At operation 802C, the MTS service 710 deletes the MTC session, and at operation 803C, the MTS service 710 responds with an unregistration approval. In this embodiment, the response is an HTTP response message including the status code "204 No Content" in the header of the HTTP message, which indicates that the service consumer's 701 request has been successfully processed (i.e., deleting the indicated MTS session) and is not returning any content.

The MTS consumer 701 uses the DELETE method to unregister from the MTS service 710. This DELETE method supports the request and response data structures, and response codes, as specified in table 6.

TABLE 6

Data structures supported by the DELETE request/response on this resource body

| | Data type | Cardinality | Remarks |
|---|---|---|---|
| Request body | n/a | | |

| | Data type | Cardinality | Response codes | Remarks |
|---|---|---|---|---|
| Response body | n/a | | 204 No Content | |
| | ProblemDetails | 0 . . . 1 | 404 Not Found | It is used when a client provided a URI that cannot be mapped to a valid resource URI. In the returned ProblemDetails structure, the "detail" attribute should convey more information about the error. |

TABLE 6-continued

| | | | Data structures supported by the DELETE request/response on this resource body |
|---|---|---|---|
| ProblemDetails | 1 | 403 Forbidden | The operation is not allowed given the current status of the resource. More information shall be provided in the "detail" attribute of the "ProblemDetails" structure. |

FIG. 9 includes an MTS service update procedure 900A, according to various embodiments. Procedure 900A allows the ME app 701 to update its requested requirements on the MTS service 710. Procedure 900A begins at operation 901A where the ME application instance 701 sends a request to update a specific MTS session on the MTS service 710. In this embodiment, the MTS service 710 is a resource representing an individual MTS session being handled by the MTS service 710. The MTS individual session resource is used to represent an MTS instance, which follows the resource data type of TmInfo. The MTS individual session resource has a Resource URL of "{apiRoot}/mts/v1/mts_sessions/{sessionId}", where the parameter {sessionId} represents the session ID to be unregistered. As mentioned previously, the MTS individual session resource updated. Additionally, a traffic management info data structure (e.g., TmInfo) is included in the body of the HTTP response message. In some embodiments, the response message may include a TmInfo IE, field, data field, data element, or the like to include the TmInfo data structure.

In this embodiment, the MTS consumer 701 uses the PUT method to update the information about an individual MTS session. As specified in [R06], the PUT HTTP method has "replace" semantics. That is, the new state of the resource is determined by the representation in the payload body of the PUT message, and the previous resource state is discarded by the MITS service 710 when executing the PUT request. This PUT method supports the URI query parameters, request and response data structures, and response codes, as specified in table 7.

TABLE 7

| | Data structures supported by the PUT request/response on this resource | | | |
|---|---|---|---|---|
| | Data type | | Cardinality | Remarks |
| Request body | TmInfo | | 1 | TmInfo with updated information is included as entity body of the request. |
| | Data type | Cardinality | Response codes | Remarks |
| Response body | TmInfo | 1 | 200 OK | Upon success, a response body containing data type describing the updated TmInfo is returned. |
| | ProblemDetails | 0 . . . 1 | 400 Bad Request | It is used to indicate that incorrect parameters were passed to the request. In the returned ProblemDetails structure, the "detail" attribute should convey more information about the error. |
| | ProblemDetails | 0 . . . 1 | 404 Not Found | It is used when a client provided a URI that cannot be mapped to a valid resource URI. In the returned ProblemDetails structure, the "detail" attribute should convey more information about the error. |
| | ProblemDetails | 1 | 403 Forbidden | The operation is not allowed given the current status of the resource. More information shall be provided in the "detail" attribute of the "ProblemDetails" structure. |
| | ProblemDetails | 0 . . . 1 | 412 Precondition Failed | It is used when a condition has failed during conditional requests, e.g., when using ETags to avoid write conflicts. In the returned ProblemDetails structure, the "detail" attribute should convey more information about the error. | supports the resource URI variables defined in table 5. In some embodiments, the request may include a service consumer instance ID, app instance IDs, and/or one or more session IDs as input parameter(s), which may be included in a message body of the request message.

At operation 902A, the MTS service 710 updates the MTC session, and at operation 903A, the MTS service 710 responds with an update approval. In this embodiment, the response is an HTTP response message including the status code "200 OK" in the header of the HTTP message, which indicates that the service consumer's 701 request has been fulfilled resulting in the indicated MTS session being FIG. 9 also includes an MTS service update procedure 900B, according to various embodiments. Procedure 900B allows the ME app 701 to obtain (get) its configured MTS session info from the MITS service 710. Procedure 900B begins at operation 901B where the ME application instance 701 sends a request to get its configured MITS session information on the MTS service 710.

In some embodiments, the MITS service 710 is a resource representing an individual MTS session being handled by the MTS service 710. The MTS individual session resource is used to represent an MITS instance, which follows the resource data type of TmInfo. The MITS individual session resource has a Resource URL of "{apiRoot}/mts/v1/mts_sessions/{sessionId}", where the parameter {sessionId} represents the session ID to be unregistered. As mentioned previously, the MTS individual session resource supports the resource URI variables defined in table 5. In some embodiments, the request may include a service consumer instance ID, app instance IDs, and/or one or more session IDs as input parameter(s), which may be included in a message body of the request message.

In some embodiments, the MTS service 710 is a resource representing one or more MTS sessions being handled by the MTS service 710. An MTS sessions resource (or 'a list of MTS sessions' resource) is used to represent a list of MTS sessions. The MTS sessions resource may follow the resource data type of TmInfo. The MTS sessions resource has a Resource URL of "{apiRoot}/mts/v1/mts_sessions". The MTS sessions resource supports the resource URI variable "apiRoot" discussed previously.

At operation 902B, the MTS service 710 gets the application configured MTC session accordingly, and at operation 903B, the MTS service 710 responds with the MTS session details. In this embodiment, the response is an HTTP response message including the status code "200 OK" in the header of the HTTP message, which indicates that the service consumer's 701 request has been fulfilled, resulting in the MTS session details being found and obtained. Additionally, a traffic management info data structure (e.g., TmInfo) is included in the body of the HTTP response message. In some embodiments, the response message may include a TmInfo IE, field, data field, data element, or the like to include the TmInfo data structure.

In this embodiment, the MTS consumer 701 uses the GET method to retrieve (get) configured MTS Session Info from the MTS Service 710. When used to obtain info about an individual MTS session, the GET method supports the request and response data structures, and response codes, as specified in table 8.

When used to get info about a list of sessions, the GET method supports the URL query parameters, the request and response data structures, and response codes, as specified in tables 9 and 10.

TABLE 8

Data structures supported by the GET request/response on this resource

| | | Data type | Cardinality | Remarks |
|---|---|---|---|---|
| Request body | | n/a | | |

| | Data type | Cardinality | Response codes | Remarks |
|---|---|---|---|---|
| Response body | TmInfo | 1 | 200 OK | It is used to indicate nonspecific success. The response body contains a representation of the resource. |
| | ProblemDetails | 0 . . . 1 | 400 Bad Request | It is used to indicate that incorrect parameters were passed to the request.<br>In the returned ProblemDetails structure, the "detail" attribute should convey more information about the error. |
| | ProblemDetails | 0 . . . 1 | 404 Not Found | It is used when a client provided a URI that cannot be mapped to a valid resource URI.<br>In the returned ProblemDetails structure, the "detail" attribute should convey more information about the error. |
| | ProblemDetails | 1 | 403 Forbidden | The operation is not allowed given the current status of the resource.<br>More information shall be provided in the "detail" attribute of the "ProblemDetails" structure. |

TABLE 9

URL query parameters supported by the GET method on this resource

| Name | Data type | Cardinality | Remarks |
|---|---|---|---|
| app_instance_id | String | 0 . . . N | A ME application instance may use multiple app_instance_ids as an input parameter to query the MTS session of a list of ME application instances. See note. |
| app_name | String | 0 . . . N | A ME application instance may use multiple app_names as an input parameter to query the MTS session of a list of ME application instances. See note. |
| session_id | String | 0 . . . N | A ME application instance may use session_id as an input parameter to query the information of a list of MTS sessions. See note. |

NOTE:
Either "app_instance_id" or "app_name" or "session_Id" or none of them shall be present.

TABLE 10

Data structures supported by the GET request/response on this resource

| | | Data type | Cardinality | Remarks |
|---|---|---|---|---|
| Request body | | n/a | | |

| | Data type | Cardinality | Response codes | Remarks |
|---|---|---|---|---|
| Response body | TmInfo | 0 . . . N | 200 OK | Upon success, a response body containing an array of the TM sessions is returned. |
| | ProblemDetails | 0 . . . 1 | 400 Bad Request | It is used to indicate that incorrect parameters were passed to the request. In the returned ProblemDetails structure, the "detail" attribute should convey more information about the error. |
| | ProblemDetails | 0 . . . 1 | 404 Not Found | It is used when a client provided a URI that cannot be mapped to a valid resource URI. In the returned ProblemDetails structure, the "detail" attribute should convey more information about the error. |
| | ProblemDetails | 1 | 403 Forbidden | The operation is not allowed given the current status of the resource. More information shall be provided in the "detail" attribute of the "ProblemDetails" structure. |

As shown by tables 4, 7, 8, 9, and 10, the request body and/or the response body may include the TmInfo data structure. The TmInfo may be a resource data type. The TmInfo type represents traffic steering information for one or more app instances. This information is per app instance based (e.g., tailored to a app instance). The attributes of the TmInfo may follow the notations provided by table 11.

TABLE 11

Elements of TmInfo

| Element | Type | Cardinality | Description |
|---|---|---|---|
| timeStamp | Structure (inlined) | 0 . . . 1 | Time stamp to indicate when the corresponding information elements are sent |
| >seconds | Uint32 | 1 | The seconds part of the Time. Time is defined as Unix-time since Jan. 1, 1970, 00:00:00 UTC |
| >nanoSeconds | Uint32 | 1 | The nanoseconds part of the Time. Time is defined as Unix-time since Jan. 1, 1970, 00:00:00 UTC |
| appInsId | String | 1 | Application instance identifier |
| requestType | Enum (inlined) | 1 | Numeric value (0-255) corresponding to specific type of consumer as following: 0 = APPLICATION_SPECIFIC_MTS_SESSION 1 = FLOW_SPECIFIC_MTS_SESSION |
| flowFilter | Structure (inlined) | 1 . . . N | Traffic flow filtering criteria, applicable only if when requestType is set as FLOW_SPECIFIC_MTS_SESSION. Any filtering criteria shall define a single session only. In case multiple sessions match flowFilter the request shall be rejected. If the flowFilter field is included, at least one of its subfields shall be included. Any flowFilter subfield that is not included shall be ignored in traffic flow filtering. |
| >sourceIp | String | 0 . . . 1 | Source address identity of session (including range) |
| >sourcePort | Uint32 | 0 . . . N | Source port identity of session |
| >dstIp | String | 0 . . . 1 | Destination address identity of session (including range) |
| >dstPort | Uint32 | 0 . . . N | Destination port identity of session |
| >protocol | Uint32 | 0 . . . 1 | Protocol number |
| >dscp | Uint32 | 0 . . . 1 | DSCP in the IPv4 header or Traffic Class in the IPv6 header |
| >flowlabel | Uint32 | 0 . . . 1 | Flow Label in the IPv6 header, applicable only if the flow is IPv6 |
| qosD | Structure | 1 | QoS requirement description of the MTS session, applicable only if mtsMode = 4 (QoS). If the qosD field is included, at least one of its subfields shall be included. Any qosD subfield that is not included shall be ignored in multi-access traffic steering (MTS). |
| >minTpt | Unit32 | 0 . . . 1 | minimal throughput in [kbps] |
| >maxLatency | Unit32 | 0 . . . 1 | tolerable (one-way) delay in [10 nanoseconds] |
| >maxLoss | Unit32 | 0 . . . 1 | tolerable packet loss rate in [1/10^x] |

TABLE 11-continued

Elements of TmInfo

| Element | Type | Cardinality | Description |
| --- | --- | --- | --- |
| >maxJitter | Unit32 | 0 ... 1 | tolerable jitter in [10 nanoseconds] |
| >priority | Unit32 | 0 ... 1 | numeric value (0-255) corresponding to the traffic priority<br>0: low; 1: medium; 2: high; 3: critical. |
| mtsMode | Uint32 | 1 | Numeric value (0-255) corresponding to a specific MTS mode of the MTS session:<br>0 = low cost, e.g., using the unmetered access network connection whenever it is available<br>1 = low latency, e.g., using the access network connection with lower latency<br>2 = high throughput, e.g., using the access network connection with higher throughput, or multiple access network connection simultaneously<br>3 = redundancy, e.g., sending duplicated (redundancy) packets over multiple access network connections for high-reliability and low-latency applications<br>4 = QoS, e.g., performing MTS based on the QoS requirement (qosD) |
| trafficDirection | String | 1 | The direction of the requested MTS session:<br>00 = Downlink (towards the UE)<br>01 = Uplink (towards the application/session)<br>10 = Symmetrical (NOTE 1) |

(NOTE 1):
for the downlink direction of a symmetrical flow, "sourceIp" and "sourcePort" in the "flowFilter" structure are used for source address and port, respectively; "dstIp" and "dstPort" are used for destination address and port, respectively. For the uplink direction of a symmetrical flow, "sourceIp" and "sourcePort" are used for destination address and port, respectively; "dstIp" and "dstPort" are used for source address and port, respectively.

The previously discussed tables define the attributes and data types that can be used for each of the resource representations. In the aforementioned tables, the "Attribute name" field provides the name of the attribute in lower-Camel case. The "Data type" field provides the data type of the attribute. A data type is a particular kind of data item defined by the values it can take and/or the operations that can be performed on it. The data type may be a simple data type where each data item can only store one value at a time (e.g., strings, unsigned integers ("Uint"), etc.). The data type may be a named data type (structured, simple, or enum) that is defined elsewhere in this document, or in a referenced document indicated in the "Description" column. The data type may also indicate the definition of an inlined nested structure, which is indicated as "Structure (inlined)". In case of inlining a structure, all attributes of the inlined structure are prefixed with one or more closing angular brackets ">", where the number of brackets represents the level of nesting. The data type may also indicate the definition of an inlined enumeration (enum) type, which is indicated as "Enum (inlined)". In case of inlining an enumeration type, the "Description" column contains the allowed values and (optionally) their meanings. The enums may define the valid values and their mapping to integers or their mapping to strings. The "Cardinality" field defines the allowed number of occurrence. The "Description" field describes the meaning and use of the attribute and may contain normative statements. In case of an inlined enumeration type, the "Description" column defines the allowed values and their meanings.

In each of the procedures of FIGS. 8-9, when the request is unsuccessful, fails, or includes error(s), the HTTP response message may include other HTTP status codes, such as a bad request status code (400) (e.g., when incorrect parameters are passed in the request), a not found status code (404) (e.g., when a URI provided in the request cannot be mapped to a valid resource URI), a forbidden status code (403) (e.g., when the operation is not allowed given the current status of the resource), and/or other like HTTP status codes. In the aforementioned examples, the response body may include a ProblemDetails IE, field, data element, or other like data structure indicating/including information about the particular error. Other message formats may be used in other embodiments, and the request/response data may be located in the header or body portion of such messages.

Figure 10:
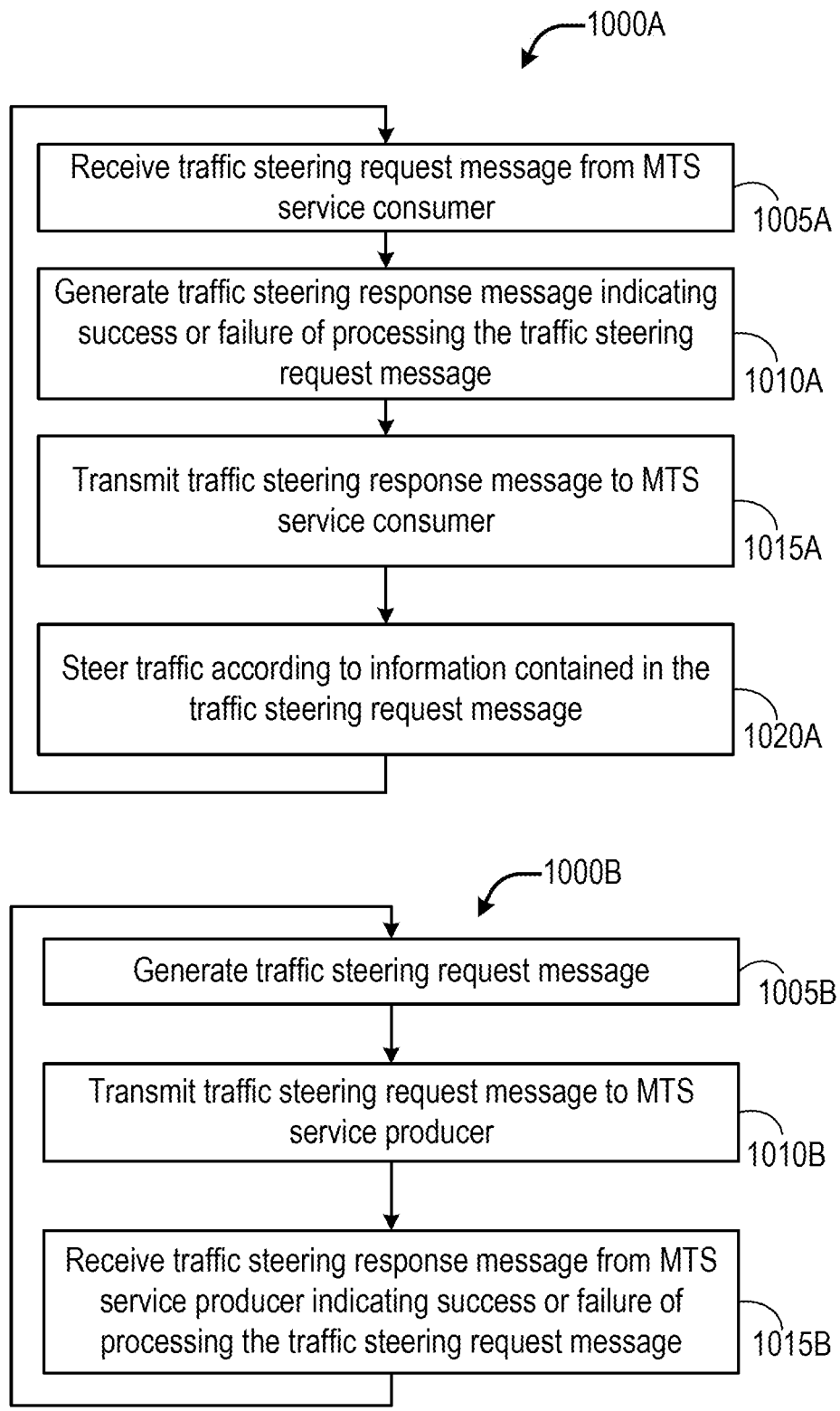
FIG. 10 depicts example MTS processes for practicing various embodiments discussed herein.

FIG. 10 illustrates example MTS service processes 1000A and 1000B according to various embodiments. For illustrative purposes, the various operations of processes 1000A and 1000B are described as being performed by elements of FIGS. 1-9. While particular examples and orders of operations are illustrated in FIG. 10, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

MTS service process 1000A may be performed by the MTS service provider 710 to provide MtsInfo and/or TmInfo to the MTS service consumer 701. Process 1000A begins at operation 1005A where the MTS service provider 710 receives a traffic steering request message from the MTS service consumer 701. The traffic steering request message includes the TmInfo data structure including a session identifier (sessionId) representing an individual session, a traffic steering mode (mtsMode) indicating how to steer traffic of the individual session, and/or other data elements provided by table 11. At operation 1010A, the MTS service producer 710 generates a traffic steering response message indicating the success or failure of processing the traffic steering request message. The traffic steering response message may include a status code and/or a TmInfo data structure depending on the success or failure to properly process the request as discussed previously with respect to FIGS. 8-9. At operation 1015A, the MTS service producer 710 transmits the traffic steering response message to the MTS service consumer 701. At operation 1020A, the MTS service producer 710 steers traffic according to the information contained in the traffic steering request message. This may include directing traffic associated with the sessionId over one or more access network connections according to the mtsMode. Other aspects of the traffic steering ae discussed elsewhere in the present disclosure. After operation 1020A, the process 1000A may end or repeat as necessary.

MTS service process 1000B may be performed by the MTS service consumer 701 to request MTS services from the to the MTS service provider 710. Process 1000B begins at operation 1005B where the MTS service consumer 701 generates a traffic steering request message, which is then transmitted to the MTS service producer 710 at operation 1010B. The traffic steering request message may be the same or similar to the traffic steering request message discussed with respect to process 1000A. At operation 1015B, the MTS service consumer 701 receives a traffic steering response message indicating success or failure of processing the traffic steering request message. The traffic steering response message may be the same or similar to the traffic steering response message discussed with respect to process 1000A. The MTS service producer 710 may steer traffic based on the traffic steering request message as discussed herein. After operation 1015B, the process 1000B may end or repeat as necessary.

In processes 1000A and 1000B, the communication of the traffic steering request and response messages may take place according to the procedures discussed with respect to FIGS. 7-9 and/or over the various interfaces discussed herein.

I.b. MEC MAMS and 5G ATSSS Coexistence Embodiments

Embodiments herein also address coexistence issues that may arise in scenarios where both the MAMS-MEC system 140 (see e.g., FIGS. 1-2) and the 5G ATSSS 400 (see e.g., FIGS. 3-4) are deployed. As alluded to previously, both the MEC system and the 5GS include solutions for managing and/or steering traffic. However, conflicts in traffic steering operations may arise if both solutions operate simultaneously. Embodiments herein enable coexistence between these two technologies by facilitating communication between these two systems so that these conflicts are minimized. "Coexistence" in the context of the present disclosure refers to sharing or managing traffic steering among multiple application instances and/or session instances using either MEC-MAMS or 5G traffic steering technologies.

In various embodiments, if a data flow is indicated as being supported by the 5GS traffic steering mechanisms (e.g., ATSSS 400 of FIG. 4), then in the MAMS-MEC system 140 will exclude that flow from the MEC-based traffic steering mechanisms. In these embodiments, the MAMS-MEC system 140 is made aware of the ATSSS 400 operation in the 5GS such that the MAMS-MEC system 140 will not be activated for a UE 101 if it is already being supported with ATSSS 400. In addition, if there is any specific QoS flow that is already supported by the 5GS traffic steering mechanisms, then that QoS flow is also excluded from the MAMS-MEC system 140 traffic steering mechanisms to avoid conflicting with 3GPP-based QoS management operations.

Figure 11:
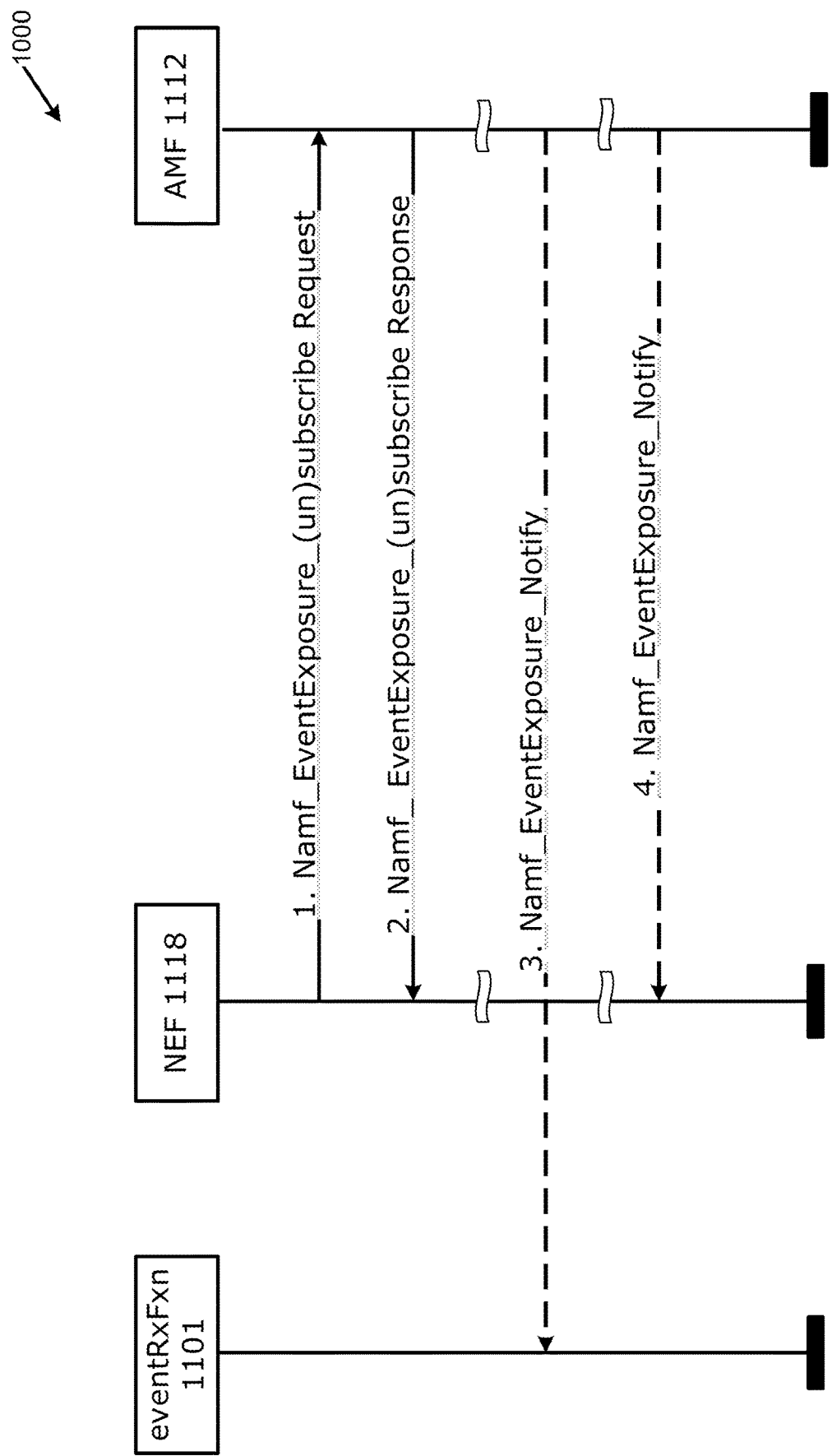
FIG. 11 shows an example 5G Application Mobility Management Event Exposure Service Procedure according to various embodiments.
Figure 12:
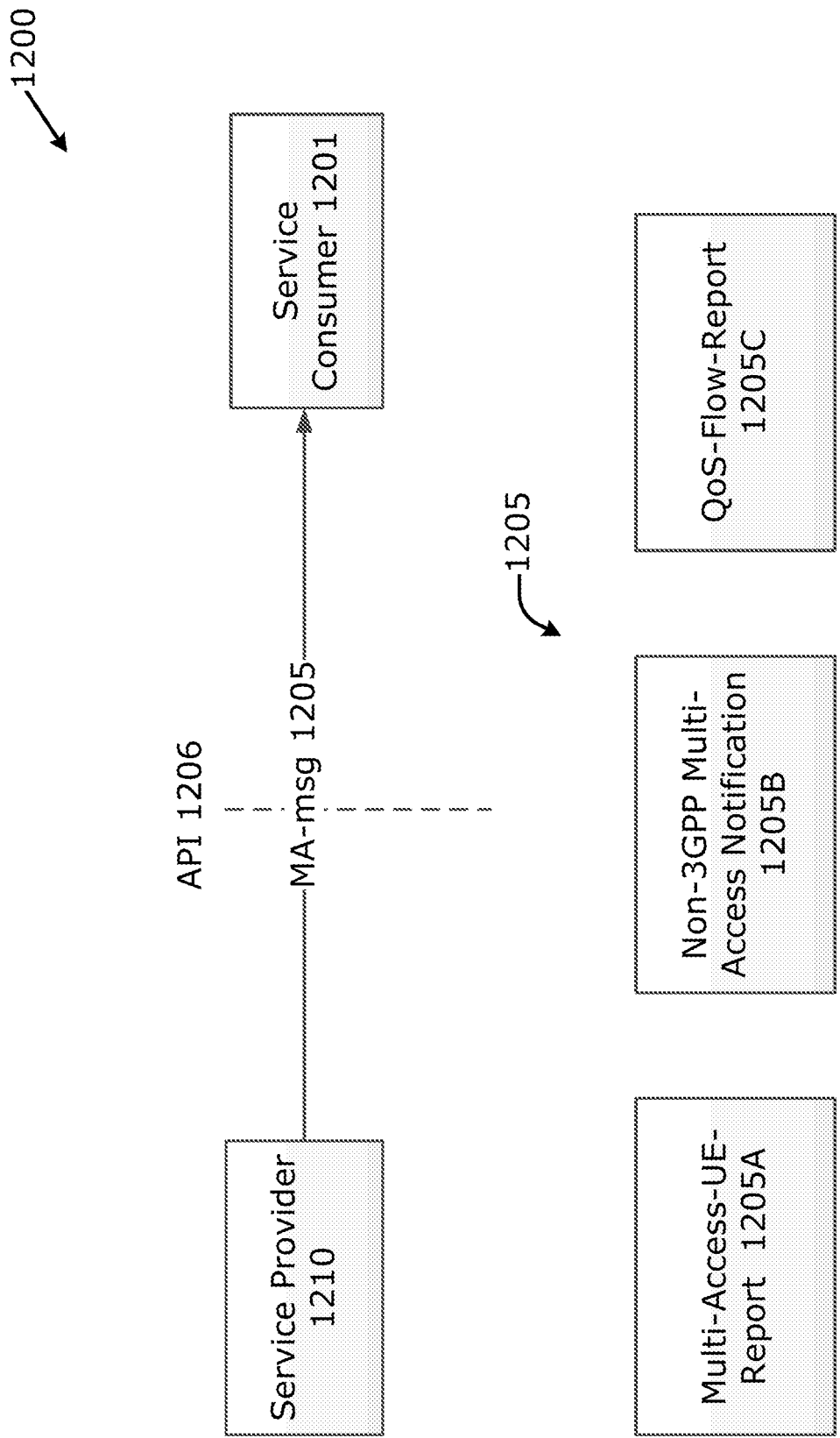
FIG. 12 illustrates example multi-access message that can be sent over an interface using a suitable API according to various embodiments.

Embodiments include API enhancements to the 5G 3GPP and/or ETSI MEC services, namely the Access Mobility Management Service (see e.g., 3GPP TS 29.518 v16.0.0 (2019 Jun. 13) ("[R04]")) and/or the MEC service (see e.g., [M03]), respectively. In one embodiment, the 5GS Network Exposure Function (NEF) is employed, where the MAMS-MEC system 140 is a subscribing network function (NF), application function (AF), or other like entity. An example of this embodiment is shown by FIG. 11. In another embodiment, the MEC Mp1 interface may be employed where the 5GS (or individual NFs within the 5GS) are treated as a MEC service consumer and/or ME app instance (see e.g., service consumer 701 of FIG. 7) and the MAMS-MEC system 140 acts as the MEC service provider or MEC platform (see e.g., service provider 710 of FIG. 7). An example of this embodiment is shown by FIG. 12. In either embodiment, a multi-access message (MA-msg) may be used to convey the necessary information between the MAMS-MEC system 140 and the 5GS, as is discussed with respect to FIG. 12.

FIG. 11 shows an example 5G Application Mobility Management Event Exposure Service Procedure 1100. In procedure 1100, an external, event receiving function (eventRxFxn) 1101 (e.g., a network function (NF), an application function (AF), a UE 101, a group of UEs 101, MAMS-MEC server 140, an ME platform 710, an ME app instance 701, and/or the like) may subscribe to an event exposure service provided by an AMF 1112 (Namf_EventExposure service), modify the Namf_EventExposure service, or unsubscribe from the Namf_EventExposure service through an NEF (see e.g., [R04]). In alternative embodiments, the eventRxFxn 1101 may subscribe to, modify, or unsubscribe from an event exposure service provided by an SMF (Nsmf_EventExposure service) (see e.g., SMF 1460 of FIG. 14) through a PCF (see e.g., PCF 1458 of FIG. 14). In either embodiment, the eventRxFxn 1101 and/or NEF 1118 (or PCF) receives a notification message (Namf_EventExposure_Notify or Nsmf_EventExposure_Notify) when the subscribed event occurs. The procedure 1100 may operate as follows.

At operation 1, the NEF 1118 sends a request to subscribe to a set of Event ID(s) in AMF 1118 in an Namf_EventExposure_(un)subscribe request. The NEF 1118 could be the same NF subscribing to receive the event notification reports (e.g., eventRxFxn 1101) or it could be a different NF. The NEF 1118 subscribes to one or several Event(s) (identified by an Event ID) and provides the associated notification endpoint of the eventRxFxn 1101. When the NEF 1118 itself is not the eventRxFxn 1101, the NEF 1118 additionally provides the notification endpoint of itself besides the notification endpoint of eventRxFxn 1101. Each notification endpoint is associated with the related (set of) Event ID(s). This is to assure the NEF 1118 can receive the notification of subscription change related event (e.g., Subscription Correlation ID Change). Event Reporting information defines the type of reporting requested. If the reporting event subscription is authorized by the AMF 1112, the AMF 1112 records the association of the event trigger and the requester identity. At operation 2, the AMF 1112 sends an Namf_EventExposure response to acknowledge the execution of Namf_EventExposure request The following services are defined for the Namf_EventExposure service: subscribe, unsubscribe, or notify (see steps 3 and 4 in procedure 1100). The subscribe service includes subscription creation and subscription modification. The request at operation 1 may be a request to create or modify a subscription, or unsubscribe from the service. The response at operation 2 indicates whether the request was successfully fulfilled.

The subscribe service operation is used by a NF Service Consumer (e.g., NEF 1118) to subscribe to an event(s) for one or more eventRxFxn's 1101 (e.g., one UE, group of UE(s) or any UE, an ME app instance 701, or the like). The Subscribe service operation is invoked by a NF Service Consumer towards the AMF 1112, when it needs to create a subscription to monitor at least one event relevant to the AMF 1112. The NF Service Consumer may subscribe to multiple events in a subscription. A subscription may be associated with one or more eventRxFxns 1101.

The NF Service Consumer requests (operation 1) to create a new subscription by using HTTP method POST with URI of the subscriptions collection (see e.g., clause 6.2.3.2 of [R04]). The payload body of the POST request shall contain a representation of the individual subscription resource to be created. The request may contain an expiry time, suggested by the NF Service Consumer as a hint, representing the time up to which the subscription is desired to be kept active and the time after which the subscribed event(s) shall stop generating report. On success (operation 2), the request is accepted, the AMF 1118 includes an HTTP Location header to provide the location of a newly created resource (subscription) together with the status code 201 indicating the requested resource is created in the response message. On failure or redirection (operation 2), one of the HTTP status code listed in Table 6.2.3.2.3.1-3 of [R04] is returned. For a 4xx/5xx response, the message body contains a ProblemDetails structure with the "cause" attribute set to one of the application error listed in Table 6.2.3.2.3.1-3 of [R04].

The NF Service Consumer modifies a subscription by using HTTP method PATCH with the URI of the individual subscription resource (see e.g., clause 6.2.3.3 of [R04]) to be modified. The NF Service Consumer sends a PATCH request (operation 1) to modify a subscription resource in the AMF 1118. The modification may be for the events subscribed or for updating the event options. On success (operation 2), the request is accepted, the AMF 1118 returns the representation of the modified subscription resource or its sub-resource together with the status code 200 OK. On failure or redirection (operation 2), one of the HTTP status code listed in Table 6.2.3.3.3.1-3 of [R04] is returned. For a 4xx/5xx response, the message body shall contain a ProblemDetails structure with the "cause" attribute set to one of the application error listed in Table 6.2.3.3.3.1-3 in [R04].

The Unsubscribe service operation is invoked by a NF Service Consumer towards the AMF 1118 to remove an existing subscription previously created by itself at the AMF 1118. The NF Service Consumer unsubscribes to the subscription (operation 1) by using HTTP method DELETE with the URI of the individual subscription resource (see e.g., clause 6.2.3.3 of [R04]) to be deleted. On success (operation 2), the request is accepted, the AMF 1118 replies with the status code 204 indicating the resource identified by subscription ID is successfully deleted in the response message. On failure or redirection (operation 2), one of the HTTP status code listed in Table 6.2.3.3.3.2-3 of [R04] is returned. For a 4xx/5xx response, the message body shall contain a ProblemDetails structure with the "cause" attribute set to one of the application error listed in Table 6.2.3.3.3.2-3 of [R04].

Continuing to refer to FIG. 11, at operation 3, the AMF 1112 detects the monitored event occurs and sends the event report by means of Namf_EventExposure_Notify message to the notification endpoint of the eventRxFxn 1101. At operation 4, the AMF 1112 detects the subscription change related event occurs, and it sends the event report by means of Namf_EventExposure_Notify message to the NEF 1118. As examples, the detected events may include Subscription Correlation ID change due to AMF 1112 reallocation and/or the like. Operations 3 and 4 are conditional and depend on the detected and/or subscribed-to event.

The Notify service operation (e.g., operations 3 and 4 in FIG. 11) is invoked by the AMF 1112, to send a notification towards the notification URI when certain event(s) included in the subscription has taken place. The AMF 1112 uses the HTTP method POST using the notification URI received in the subscription creation (see e.g., clause 5.3.2.2.2 of [R04]), including, for example, the subscription ID, Event ID(s) for which event has happened, notification correlation ID provided by the NF service consumer at the time of event subscription, to send a notification (see e.g., FIG. 5.3.2.4.1-1 of [R04]).

In addition to the above, the eventRxFxn 1101 may receive event notifications from the NEF 1118 using the Nnef_EventExposure service provided by the NEF 1118. The consumer 1101 uses the Nnef_EventExposure_Subscribe request to subscribe to receive an event (notification), or if the event is already defined in the NEF 1118, then the subscription is updated. The consumer 1101 explicitly cancels a previous subscription by sending an Nnef_EventExposure_Unsubscribe request identifying the subscription to cancel with Subscription Correlation ID. The NEF 1118 reports events to the consumer 1101 that has previously subscribed to those events 1101 using an Nnef_EventExposure_Notify message. Aspects of the Nnef_EventExposure service are discussed in [R13].

Currently, the following events are provided by Namf_EventExposure Service (see e.g., [4]): Location-Report; Presence-In-AOI-Report; Time-Zone-Report; Access-Type-Report; Registration-State-Report; Connectivity-State-Report; Reachability-Report; Subscribed-Data-Report; Communication-Failure-Report; and UEs-In-Area-Report. NF services provided by the PCF are discussed in section 5.2.5 of 3GPP TS 23.502 v16.1.1 (2019 Jun. 11) ("[R13]") and the events that can be subscribed by an NF consumer are described in clause 6.1.3.18 of [R07]; NF services provided by the NEF are discussed in section 5.2.6 of [R13]; and NF services provided by the SMF are discussed in section 5.2.8 of [R13].

An NF that subscribes to the "Registration-State-Report" event is to receive the current registration state of a UE or a group of UEs, and report for updated registration state of a UE or any UE in the group when AMF 1118 becomes aware of a registration state change of the UE. In some implementations, an AF (see e.g., AF 1464 of FIG. 14) can request the service subscription of these events via the NEF 1118 (or a PCF) if the AF is in a trusted domain, and the NEF 1118 (or a PCF) makes the request on behalf of the AF. In this way, the AF can obtain the required information for provisioning MAMS services to the UE 301 with the flexible selection of network paths in a multi-connection (access) communication environment. In these implementations, the NEF/PCF subscribes to "Registration-State-Report" event, based on the AF's service request, to receive the current registration state of a UE 301 or a group of UEs 301, and report for updated registration state of a UE 301 or any UE 301 in the group when AMF 1118 becomes aware of a registration state change of the UE.

As alluded to previously, in various embodiments, the 5GS (e.g., the AMF 1112 and NEF 1118) indicates to the eventRxFxn 1101 (e.g., the MAMS-MEC system 140) what kind of traffic are already being supported and/or are currently activated. For example, the AMF 1112 may indicate to the MAMS-MEC system 140 via the NEF 1118 that the ATSSS functionality 400 is activated in the UE 301 for managing the multiple access (e.g., operations 3 and/or 4 in FIG. 11). This indication may also indicate the IP address of the UE 301. In response to this indication, the MAMS-MEC system 140 will be able to exclude the UE 301 from its multi-access steering functionality, and may redirect the UP traffic over a path/link through to the 5GS.

In some embodiments, a new MA PDU Session Filter for this event is added. When this filter is set, the 5G system (e.g., AMF, SMF, etc.) will send out a notification (e.g., operations 3 and 4 in FIG. 11) only if the subscribed event occurs, and the reported UE 301 has an MA PDU session established.

Additionally or alternatively, a new MA message (MA-msg) event can be incorporated into a 5G service API (e.g., the Namf_EventExposure service). In these embodiments, if an AF/NF (e.g., eventRxFxn 1101) subscribes to this event, it will receive notification when an MA PDU session (e.g., with ATSSS 415 support) is established or terminated. Additionally or alternatively, the MA-msg can be added to the MEC API interface, or some other API. The MA-msg is discussed infra with respect to FIG. 12.

FIG. 12 illustrates example MA message (MA-msg) 1205 that can be sent over an interface 1206 using a suitable API (also referred to as "API 1206"), according to various embodiments. The MA-msg 1205 is sent by a service provider 1210 and is received by a service consumer 1201. As an example, the service provider 1210 may be a 5GS or an NF within the 5GS, such as an AMF 312 or SMF 314 (see e.g., FIGS. 3 and 14). In this example, the service consumer 1201 may be a MAMS-MEC system 140 or the like. Additionally, the interface may be a MEC interface such as the Mp1 interface accessible using a suitable MEC API, a 5G service API such as the NEF Northbound interface (see e.g., [ts29522]), a new internal API (e.g., a "UE internal API"), or the like. The MA-msg 1205 may be a Multi-Access-UE-Report 1205A, a Non-3GPP Multi-Access Notification 1205B, or a QoS-Flow-Report 1206C.

When the MA-msg 1205 is the Multi-Access-UE-Report 1205A, the MA-msg 1205 indicates the type of traffic steering mechanism that is activated in the UE 301 and indicates an IP address of the UE 301. Here, the IP address of the UE 301 may be an MA PDU IP address for an MA PDU session (e.g., IP@3 in FIG. 4), an MA PDU link-specific multipath (3GPP) IP address (e.g., IP@2 in FIG. 4), or an MA PDU link-specific multipath (non-3GPP) IP address (e.g., IP@1 in FIG. 4).

In various embodiments, the following information is included in the new "Multi-Access-UE Report" message 1205A: Multi-Access PDU IP address (see e.g., IP@3 in FIG. 4), and an ATSSS feature activation list indicating whether the MPTCP functionality 414 or the ATSSS-LL functionality 415 is activated in the UE 301. If the ATSSS-LL functionality 415 is activated in the UE 301, then the MAMS-MEC system 140 will allow traffic steering to be managed by the 5GS. If MPTCP functionality 414 is activated, then the physical IP address for the access will also be provided. In other words, if the MPTCP functionality 414 is activated, the Multi-Access-UE Report includes one or more of a Multi-Access PDU link-specific multipath (3GPP) IP address (e.g., IP@2 in FIG. 4) and/or Multi-Access PDU link-specific multipath (non-3GPP) IP address (e.g., IP@1 in FIG. 4). As mentioned previously, the 5GS supporting ATSSS 400 includes UEs 301 and/or UPFs 306 supporting one or more of steering functionalities. In these ways, it is possible to steer the MPTCP flows 420 by using the MPTCP functionality 414 and simultaneously steer all other flows 422 using the ATSSS-LL functionality 415 within the same MA PDU Session in the UE 301 and/or UPF 306.

When the MA-msg 1205 is the Non-3GPP Multi-Access Notification 1205B, a "Non-3GPP Multi-Access Notification" event, along with two new filters, can be incorporated into the 5G service API or the MEC service API 1206 (similar to the "Multi-Access UE Report" discussed previously). In various embodiments, the two new filters include a Non-3GPP Multi-Access Session Enabled Filter and a Non-3GPP Multi-Access Session Disabled Filter. In these embodiments, the "Non-3GPP Multi-Access Notification" 1205B may include the following information: a PDU session IP address, and/or a Non-3GPP Multi-Access Session Indicator including data or a flag indicating Enabled or Disabled.

When the Non-3GPP Multi-Access Session Enabled filter is set, the 5GS (e.g., AMF 312, SMF 314, etc.) sends out notification(s) only if the subscribed event occurs, and the reported UE 301 has a PDU session or a MA PDU session established that is allowed to be used in non-3GPP multi-access steering solution (e.g., MAMS 200 of FIG. 2). When the Non-3GPP Multi-Access Session Disabled filter is set, the 5GS (e.g., AMF 312, SMF 314, etc.) sends out notification(s) only if the subscribed event occurs, and the reported UE 301 has a PDU session or an MA PDU session established that is not allowed to be used in non-3GPP MA steering solution (e.g., MAMS 200 of FIG. 2).

These embodiments allow the 5GS to utilize the MA management capabilities of the MAMS-MEC system 140 instead of implementing these MA management features itself. The Non-3GPP Multi-Access Notification 1205B allows the 5GS to enable or disable the MA management capabilities of specific MA PDU sessions (or IP sessions) handled by the MAMS-MEC system 140. In this way, the Non-3GPP Multi-Access Notification 1205B allows the 5GS to become a controller of the MAMS-MEC system 140.

With the enhancements to the 5G service API or the MEC service API 406 discussed herein, the MAMS server (e.g., MAMS-MEC server 140 of FIG. 1 and/or MAMS system 200 of FIG. 2) will know the IP address of a MA PDU session or a PDU session that is not allowed to be used for non-3GPP multi-access/path solutions (e.g., MAMS). In response, when receiving the MAMS discovery or session establishment request using the same IP address, the MAMS server 140 can then reject such request and not activate the MAMS service for the corresponding UE 301. If the 5G system only supports MPTCP for ATSSS 415, the MAMS server may accept the request and provide the MAMS service to Non-MPTCP traffic 422. As a result, the MAMS service will only be provided to the UE 301 that does not support ATSSS 415 or only support MPTCP 414.

Alternatively, the MAMS CP function on the UE 301 side can be made aware of ATSSS 415 via a new internal API through the new "Multi-Access-UE-Report" 1205A. This new internal API may be referred to as a "UE internal API" or the like. As a result, the UE 301 will only start the MAMS discovery or session establishment if a MA-PDU has not been established or the established MA-PDU session does not support ATSSS-LL 415.

When the MA-msg 1205 is the QoS-Flow-Report 1205X, a new "QoS-Flow-Report" event can be incorporated into the 5G service API or the MEC service API (similar to the "Multi-Access UE Report" discussed previously). In some embodiments, the QoS-Flow-Report could be added to the Namf_EventExposure service discussed previously. If an NF subscribes to this event, it will receive notification whenever a QoS flow is added or modified or removed. In addition, the "QoS-Flow-Report" 1205C can be added to the MEC API interface. In these embodiments, the following information may be included in the "QoS-Flow Report" message: UE IP address (IPv4 or IPv6) and Number of Downlink QoS Flows. For each downlink QoS flow, the QoS-Flow-Report may include one or more of the following: IP Packet Filter Set, RQI, and Number of Uplink QoS Flows. For each uplink QoS flow, the QoS-Flow-Report may include the following: IP Packet Filter Set. With the new "QoS-Flow Report", the MAMS server (see e.g., FIG. 2) will be able to detect QoS flow and steer them towards the 3GPP access 310A.

The RQI allows reflective QoS to be controlled on per-packet basis for both IP PDU Session and Ethernet PDU Session. Reflective QoS enables the UE to map UL UP traffic to QoS Flows without being provided QoS rules. This is achieved by creating UE derived QoS rules in the UE based on the received DL traffic. When the UE supports Reflective QoS functionality, the UE creates a UE derived QoS rule for UL traffic based on the received DL traffic. The UE also uses the UE derived QoS rules to determine mapping of UL traffic to QoS Flows. Other aspects of reflective QoS are discussed in 3GPP TS 23.501. The IP Packet Filter Set is used in the QoS rule and the PDR to identify one or more IP packet for an IP PDU Session Type. The IP Packet Filter Set may be based on at least any combination of: Source/destination IP address or IPv6 prefix; source/destination port number; protocol ID of the protocol above IP/Next header type; type of Service (TOS) (IPv4)/Traffic class (IPv6) and Mask; Flow Label (IPv6); security parameter index; and Packet Filter direction (e.g., DL or UL). A value left unspecified in a Packet Filter matches any value of the corresponding information in a packet. An IP address or Prefix may be combined with a prefix mask. Additionally, port numbers may be specified as port ranges or the like.

In these embodiments, the 5GS exposes the QoS flows to the MAMS-MEC system 140 for exclusive handling of those flows by the 5GS. In these embodiments, if there is any specific QoS flow(s) that 5GS is already handling, then those QoS flow(s) is/are excluded from the MAMS-MEC system 140 because those QoS flow(s) may have some specific QoS requirements or management operations specific to the 3GPP access 310A. This allows the MAMS-MEC system 140 to manage traffic in a best-effort manner rather than an interception-based management of QoS flows. Alternatively, the 5GS exposes the QoS flow(s) to the MAMS-MEC system 140 so that the MAMS-MEC system 140 can move the QoS flow(s) to link(s)/access path(s) that can ensure or guarantee a minimum QoS. Since the 5GS provides more granularity (as compared to indicating individual sessions), MA traffic steering can be done at the QoS flow level rather than at the session level, which could provide additional resource utilization efficiencies than using existing traffic steering mechanisms.

Figure 13:
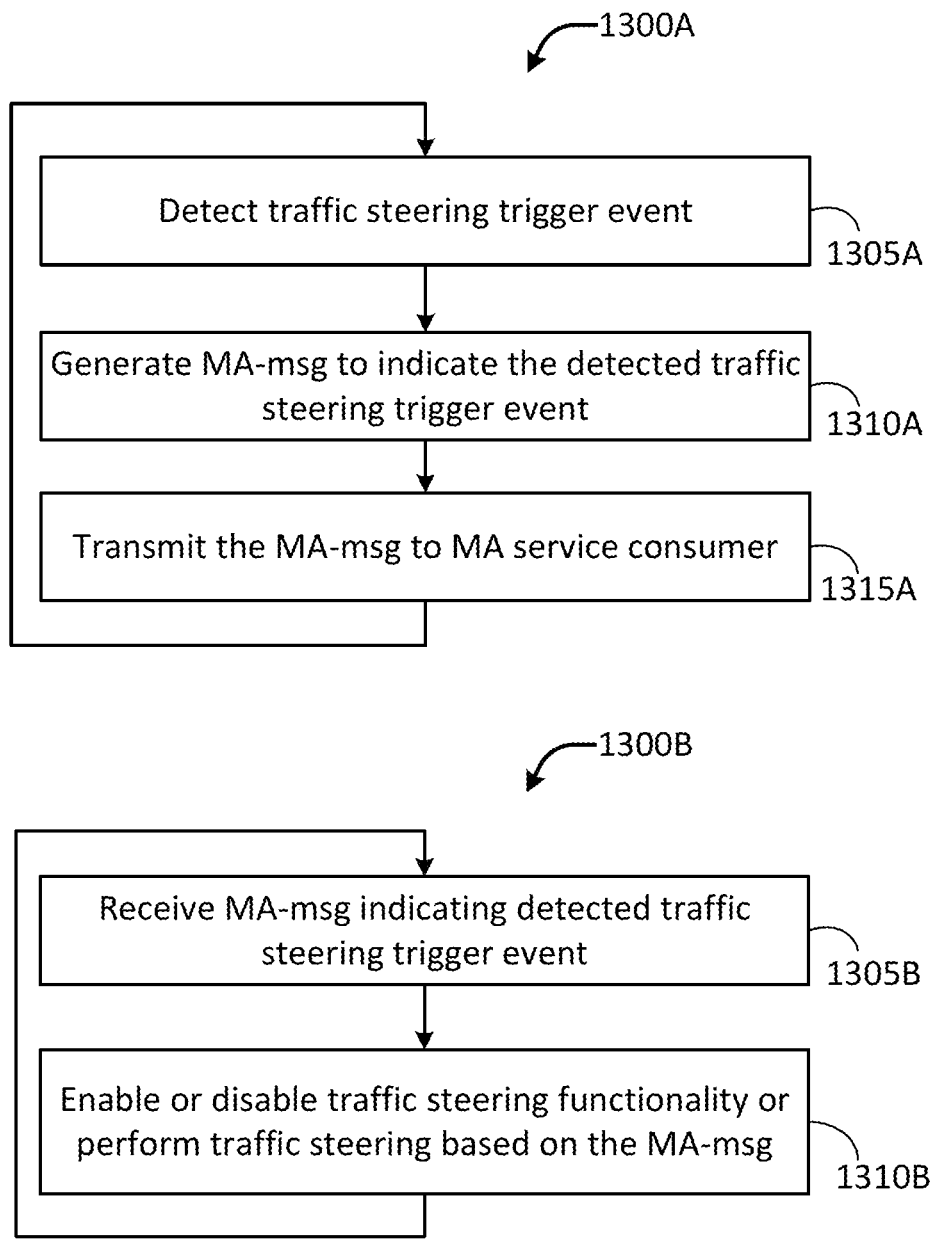
FIG. 13 depicts example MA processes for practicing various embodiments discussed herein.

FIG. 13 illustrates example MA processes 1300A and 1300B according to various embodiments. For illustrative purposes, the various operations of processes 1300A and 1300B are described as being performed by elements of FIGS. 1-9 and 11-12. While particular examples and orders of operations are illustrated in FIG. 13 the depicted orders of operations should not be construed to limit the scope of the embodiments in any way. Rather, the depicted operations may be re-ordered, broken into additional operations, combined, and/or omitted altogether while remaining within the spirit and scope of the present disclosure.

MA process 1300A may be performed by the MA service provider 1210 to provide MA services to the MA service consumer 1201. Process 1300A begins at operation 1305A where the MA service provider 710 detects a traffic steering trigger event. The traffic steering trigger event may be the activation of a specific traffic steering functionality in the 5GS, such as the ATSSS-LL functionality 415 or the MPTCP functionality 414. At operation 1310A, the MA service provider 1210 generates an MA-msg 1205 indicating the detected traffic steering trigger event. At operation 1315A, the MA service provider 1210 transmits the MA-msg 1205 to the MA service consumer 1201. After operation 1315A, the process 1300A may end or repeat as necessary.

MA process 1300B may be performed by the MA service consumer 1201 to consumer MA services from the to the MA service provider 1210. Process 1300B begins at operation 1305B where the MA service consumer 1201 receives an MA-msg 1205 from the MA service provider 1210. At operation 1310B, the MA service consumer 1201 enables/disables traffic steering functionality/mechanisms and/or steers traffic according to the information contained in the MA-msg 1205. Operation 1310B may involve the MA service consumer 1201 may enabling or disabling the traffic steering functionality for one or more application instances, one or more session instances, or one or more QoS flows. Additionally or alternatively, operation 1310B may involve the MA service consumer 1201 steering traffic associated with one or more application instances, one or more session instances, or one or more QoS flows over one or more access network connections according to the information included in the MA-msg 1205. In either embodiment, the one or more session instances may be IP session instances, application session instances, MA PDU session instances, and/or any other like session instances. After operation 1310B, the process 1300B may end or repeat as necessary.

In processes 1300A and 1300B, the MA-msg 1205 may be the same or similar to the traffic steering request message discussed with respect to FIGS. 11-12. Additionally, the communication of the MA-msg 1205 may take place according to the procedures and over the various interfaces discussed with respect to FIGS. 11-12.

II. Example Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer a-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to edge computing configurations provided within Multi-Access Edge Computing (MEC) and 5G network implementations. However, many other standards and network implementations are applicable to the edge and service management concepts discussed herein. For example, the embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

FIG. 14 illustrates a non-roaming 5G system architecture 1400 in a reference point representation, according to various embodiments. In FIG. 14, the UE 1466 is in communication with RAN 1468 as well as one or more other 5GC entities. The 5G system 1400 includes a plurality of network functions (NFs), such as access and mobility management function (AMF) 1462, session management function (SMF) 1460, policy control function (PCF) 1458, application function (AF) 1464, user plane function (UPF) 1470 and 1474, network slice selection function (NSSF) 1442, authentication server function (AUSF) 1444, and unified data management (UDM) 1446. The 5G system 1400 also includes an application server (AS) 1448 and one or more MEC hosts 1436, which may be the same or similar to any of the MEC hosts 140, 240, 340, 440, 740, 840, 841, 940, and/or 941 discussed previously.

The (R)AN 1468 may be a next generation RAN (NG-RAN) that includes a plurality of nodes, such as Next Generation NodeBs (gNBs) and NG Evolved Node-Bs (NG-eNBs). The AMF 1462 and the UPF 1470 can be communicatively coupled to the gNBs and/or the NG-eNBs via respective NG interfaces (not shown). The gNBs include node(s) providing NR/5G user plane and control plane terminations towards the UE 1466, and NG-eNBs include node(s) providing evolved universal terrestrial radio access (E-UTRA) user plane and control plane protocol terminations towards the UE 1466 and is connected via the NG interface to the 5GC. Specifically, the gNBs and/or NG-eNBs can be connected to the AMF 1462 by NG-C interfaces, and to the UPF 1470 by NG-U interfaces. The gNBs and the NG-eNBs can be coupled to each other via respective Xn interfaces. The NG-RAN can also use reference points between various nodes as provided by [R03].

The UPF 1470, 1474 acts as an anchor point for intra-RAT and inter-RAT mobility. an external PDU session point of interconnect to a local data network (DN) 1472 and/or central DN 1476, either of which can include, for example, operator services, Internet access, or third-party services. DNs 1472, 1476 may include, or be similar to, application server(s) 1448 discussed previously. The UPF 1470, 1474 may also perform packet routing and forwarding, perform packet inspection, enforce the user plane part of policy rules, lawfully intercept packets, perform traffic usage reporting, perform QoS handling for the user plane, perform UL traffic verification, transport level packet marking in the UL and DL, and perform DL packet buffering and DL data notification triggering. The UPF 1470 may interact with the SMF 1460 via an N4 reference point between the SMF 1460. The UPF 1470 can connect via an N9 interface to another UPF 1474 connected to a central DN 1476 via an N6 interface. The UPF 1470, 1474 can be deployed in one or more configurations according to the desired service type.

The AUSF 1444 stores data for authentication of UE 1466 and handle authentication-related functionality. The AUSF 1444 may facilitate a common authentication framework for various access types. The AUSF 1444 may communicate with the AMF 1462 via an N12 reference point between the AMF 1462 and the AUSF 1444; and may communicate with the UDM 1446 via an N13 reference point between the UDM 1446 and the AUSF 1444. Additionally, the AUSF 1444 may exhibit an Nausf SBI.

The UDM 1446 handles subscription-related information (e.g., subscriber profiles and data) to support the network entities' handling of communication sessions (similar to an HSS in 4G systems). Subscription data may be communicated between the UDM 1446 and the AMF 1462 via an N8 reference point. The UDM 1446 may interact with the SMF 1460 via an N10 reference point. The UDM 1446 can also be coupled to the AS 1448 over the Sh reference point. The AS 1448 can be or include a telephony application server (TAS) a MEC host (e.g., MEC host 140, 240, 340, 440, 740, 840, 841, 940, and/or 941 discussed previously, or the same or similar to MEC host(s) 1436). The 5G system 1400 can use one or more MEC hosts 1436 to provide an interface and offload processing of wireless communication traffic. For example and as illustrated in FIG. 14, a MEC host 1436 can provide a connection between the RAN 1468 and UPF 1470 in the 5GC. The MEC host 1436 can use one or more NFV instances instantiated on virtualization infrastructure within the MEC host 1436 to process wireless connections to and from the RAN 1468 and UPF 1470.

The AMF 1462 is responsible for registration management (e.g., for registering UE 1466 with the 5G network), connection management, reachability management, mobility management, and access authentication and authorization. The AMF 1462 is responsible for the termination of RAN control plane and NAS procedures, and as such, the AMF 1462 is the termination point for the RAN control plane (CP) interface (N2 reference point), and is also the termination point for Non-Access Stratum (NAS) signaling with the UE 1466 (N1 reference point). The AMF 1462 is also responsible for protecting the integrity of signaling, interfacing with any interception function for access and mobility events, providing authentication and authorization for the access layer, and hosting the Security Anchor Functionality (SEAF). The AMF 1512 provides communication and reachability services for other NFs and it may allow subscriptions to receive notifications regarding mobility events. The AMF 1462 also provisions external parameters (e.g., Expected UE Behaviour parameters or Network Configuration parameters).

The AMF 1462 is also the termination point for the an N11 reference point, which is used for interactions with the SMF 1460, which allows the AMF 1462 to provide transport for session management (SM) messages between the UE 1466 and the SMF 1460. AMF 1462 may also provide transport for SMS messages between UE 1466 and an Short Message Service Function (SMSF) (not shown by FIG. 14). The SMSF is responsible for SMS subscription checking and verification, and relaying SM messages to/from the UE 1466 to/from other SMS entities. The AMF 1462 is also a termination point for an N14 reference point between two AMFs 1462 and an N17 reference point between the AMF 1462 and a 5G-EIR (not shown by FIG. 14). In addition to the functionalities of the AMF described above, the AMF may include other functionalities as described in 3GPP TS 23.501 v16.1.0 (2019 Jun. 11)("[R03]") and 3GPP TS 23.503 v16.0.0 (2019 Mar. 26) ("[R07]").

The SMF 1460 may be responsible for SM functionality (e.g., session establishment, modify and release, including tunnel maintain between UPF 1470 and (R)AN 1468); IP address allocation and management (including optional authorization); dynamic host configuration protocol (DHCP) services; (re)selection and control of UPFs 1470; configuring traffic steering rules at the UPF 1470 to route traffic to proper destination; interception for SM events; termination of interfaces toward policy control functions; controlling part of policy enforcement and QoS; termination of SM parts of NAS messages; DL data notification; initiating (R)AN 1468 specific SM information, sent via the AMF 1462 over N11 and then N2 to (R)AN 1468; and determining SSC mode of a session. SM may refer to management of a PDU session, and a PDU session or "session" may refer to a PDU connectivity service that provides or enables the exchange of PDUs between a UE 1466 and a DN 1472, 1476 identified by a Data Network Name (DNN). As MEC services may be offered in both centralized and distributed edge systems, the SMF 1514 can be configured to select and control the UPF 1470 as well as to configure its rules for traffic steering. The SMF 1514 is also configured to expose service operations to allow MEC as a 5G AF 1464 to manage the PDU sessions, control the policy settings and traffic rules, as well as to subscribe to notifications on session management events.

The PCF 1458 provides policy rules to CP function(s) to enforce them, and also supports unified policy framework to govern network behavior (similar to PCRF in 4G systems). The PCF 1458 may communicate with the AMF 1462 via an N15 reference point. The PCF 1458 may communicate with the AF 1464 via an N5 reference point, and with the SMF 1460 via an N7 reference point.

The AF 1464 provides application influence on traffic routing, provides access to the NEF (e.g., NEF 1518 of FIG. 15) and interacts with the policy framework for policy control. The AF 1464 may send requests to influence SMF 1460 routing decisions for traffic of a PDU Session. The AF 1464 requests may influence UPF 1470, 1474 (re)selection and allow routing user traffic to a local access to a DN 1472, 1476 (identified by a DNAI). For edge computing, operator and 3rd party services are hosted close to the UE's 1466 access point of attachment (e.g., (R)AN 1468) so as to achieve an efficient service delivery through the reduced e2e latency and load on the transport network. The 5GC selects a UPF 1470, 1474 close to the UE and executes the traffic steering from the UPF 1470, 1474 to the local DN 1472 via the N6 interface. This may be based on the UE's subscription data, UE location, information from the AF 1464, policy, and/or other related traffic rules. Some AFs 1464 may not be allowed to directly access NFs, and must use the external exposure framework via the NEF 1518 to interact with relevant NFs.

The NSSF 1442 selects a set of network slice instances serving the UE 1466. The NSSF 1442 may also determine allowed NSSAI and the mapping to the subscribed S-NSSAIs, if needed. The NSSF 1442 may also determine the AMF 1462 set to be used to serve the UE 1466, or a list of candidate AMF(s) 1462 based on a suitable configuration and possibly by querying an NRF (see e.g., NRF 1520 of FIG. 15). The selection of a set of network slice instances for the UE 1466 may be triggered by the AMF 1462 with which the UE 1466 is registered by interacting with the NSSF 1442, which may lead to a change of AMF 1462. The NSSF 1442 may interact with the AMF 1462 via an N22 reference point between AMF 1462 and NSSF 1442; and may communicate with another NSSF 1442 in a visited network via an N31 reference point (not shown). Additionally, the NSSF 1442 may exhibit an Nnssf SBI.

FIG. 14 illustrates a reference point representation of a 5G network. A reference point representation shows that interaction can exist between corresponding NF services. FIG. 14 includes following reference points: N1 (between the UE 1466 and the AMF 1462), N2 (between the RAN 1468 and the AMF 1462), N3 (between the RAN 1468 and the UPF 1470), N4 (between the SMF 1460 and the UPF 1470), N5 (between the PCF 1458 and the AF 1464), N6 (between the UPF 1470 and the DN 1472, 1476), N7 (between the SMF 1460 and the PCF 1458), N8 (between the UDM 1446 and the AMF 1462), N9 (between UPFs 1470 and 1474), N10 (between the UDM 1446 and the SMF 1460), N11 (between the AMF 1462 and the SMF 1460), N12 (between the AUSF 1444 and the AMF 1462), N13 (between the AUSF 1444 and the UDM 1446), N14 (between two AMFs 1462, N15 (between the PCF 1458 and the AMF 1462 in case of a non-roaming scenario, or between the PCF 1458 in a visited network and AMF 1462 in case of a roaming scenario), N16 (between two SMFs 1460, not shown), and N22 (between AMF 1462 and NSSF 1444). There may be many more reference points between the NFs; however, these reference points have been omitted from FIG. 14 for clarity. Additionally, the 5G system 1400 may also include other elements that are not shown by FIG. 14, such as a Data Storage system/architecture, 5G-EIR, SEPP, SMSF, and the like.

FIG. 15 illustrates a non-integrated MEC deployment 15A including a 5G service-based architecture 1500 and a MEC architecture 1590, and an integrated MEC deployment 15B including a MEC system 1591 in a 5G network 1501, where some of the functional entities of the MEC system 1591 interact with the NFs of the 5G network. Referring to deployment 15A, the 5G system architecture 1500 is illustrated in a service-based representation and can be substantially similar to (or the same as) system architecture 1400 of FIG. 14. For example, the 5G system architecture 1500 includes the following entities that also appear in the system architecture 1500: NSSF 1516, PCF 1522, UDM 1524, AF 1526, AUSF 1510, AMF 1512, SMF 1514, UE 1502, RAN 1504, UPF 1506, and DN 1508. In addition to these network entities, the 5G system architecture 2800 also includes a network exposure function (NEF) 1518 and a network repository function (NRF) 1520. The 5G system architectures can be service-based and interaction between NFs can be represented by corresponding point-to-point reference points Ni (as illustrated in FIG. 14) or as SBIs (as illustrated in FIG. 15).

The 5G system 1500 in FIG. 15 is a service-based representation, which is used to represent NFs within the CP that enable other authorized NFs to access their services. The 5G system 1500 includes the following service-based interfaces (SBIs): Namf (an SBI exhibited by the AMF 1512), Nsmf (an SBI exhibited by the SMF 1514), Nnef (an SBI exhibited by the NEF 1418), Npcf (an SBI exhibited by the PCF 1522), Nudm (an SBI exhibited by the UDM 1524), Naf (an SBI exhibited by the AF 1526), Nnrf (an SBI exhibited by the NRF 1520), Nnssf (an SBI exhibited by the NSSF 1516), Nausf (an SBI exhibited by the AUSF 1510). Other SBIs not shown in FIG. 15 can also be used (e.g., Nudr, N5g-eir, and Nudsf).

The NEF 1418 provides means for securely exposing the services and capabilities provided by 3GPP NFs for third party, internal exposure/re-exposure, AFs 1564, edge computing or fog computing systems, etc. The NEF 1418 may authenticate, authorize, and/or throttle the AFs 1564. The NEF 1418 may also translate information exchanged with the AF(s) 1564 and information exchanged with internal NFs. The NEF 1418 may also receive information from other NFs based on exposed capabilities of other NFs. This information may be stored at the NEF 1418 as structured data, or at a data storage NF using standardized interfaces. The stored information can then be re-exposed by the NEF 1418 to other NFs and AFs, and/or used for other purposes such as analytics. In this example, the NEF 1418 provides an interface to a MEC host in a MEC system 1590, 1591, which can be used to process wireless connections with the RAN 1504.

The NRF 1520 supports service discovery functions, receives NF discovery requests from NF instances or the SCP 1528, and provides the information of the discovered (or to be discovered) NF instances to the NF instances or the SCP 1528. The NRF 1520 maintains NF profiles of available NF instances and their supported services (e.g., NF instance ID, NF type, PLMN ID, FQDN or IP address of NF, NF capacity information, NF priority information, etc.). The SCP 1528 (or individual instances of the SCP 1528) supports indirect communication (see e.g., [R03] section 7.1.1) between two or more NFs; delegated discovery (see e.g., [R03] section 7.1.1); message forwarding and routing to destination NF/NF service(s), communication security (e.g., authorization of the NF Service Consumer to access the NF Service Producer API) (see e.g., 3GPP TS 33.501), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., [R03] section 6.3). Load balancing, monitoring, overload control functionality provided by the SCP 1528 may be implementation specific. The SCP 1528 may be deployed in a distributed manner. More than one SCP 1528 can be present in the communication path between various NF Services. The SCP 1528, although not an NF instance, can also be deployed distributed, redundant, and scalable.

The MEC system 1590 can include a MEC orchestrator 1570 (operating at a system level) as well as the following MEC entities operating at a distributed host level: one or more apps 1572, one or more services 1574, virtualization infrastructure 1576, a MEC platform 1578, and a MEC platform manager 1580. Components of the MEC system 1590 are discussed in greater detail infra.

The integrated MEC deployment 15B includes the same MEC and 5GC NFs as in the non-integrated deployment 15A discussed previously. In this implementation, the integrated MEC deployment 15B is located at least partially within the 5G network 1501. The 5G network 1501 is the same or similar to the 5G system 1500, however, not all of the NFs in 5G network 1501 are shown. The integrated MEC deployment 15B can be configured using one or more of the following techniques: (1) Local Routing and Traffic Steering; (2) The ability of an AF 1526 to influence UPF 1506 (re)selection and traffic routing directly via the PCF 1522 or indirectly via the NEF 1518, depending on the operator's policies; (3) The Session and Service Continuity (SSC) modes for UE 1502 and application mobility scenarios; (4) Support of Local Area Data Network (LADN) 1508 by the 5G network 1501 by providing support to connect to the LADN 1508 in a certain area where the apps 1572 are deployed. The access to a LADN 1508 may be available in a specific LADN service area, defined as a set of Tracking Areas in the serving PLMN of the UE. The LADN 1508 can be configured as a service provided by the serving PLMN of the UE. For local routing and traffic steering, the 5G network 1501 can be configured to select traffic to be routed to the apps 1572 in the LADN 1508, which can be part of the MEC system 1591. A PDU session may have multiple N6 interfaces towards the data network 1508. The UPFs 1506 that terminate these interfaces can be configured to support PDU Session Anchor functionality. Traffic steering by the UPF 1506 is supported by UL Classifiers that operate on a set of traffic filters matching the steered traffic, or alternatively, by IPv6 multi-homing, where multiple IPv6 prefixes have been associated with the PDU session in question.

The NFs within the 5G network 1501 and the services they produce are registered in the NRF 1520, while in the MEC system 1591 the services produced by the MEC applications 1572 are registered in the service registry of the MEC platform 1578. Service registration can be part of the application enablement functionality. To use the service, if authorized, an NF can directly interact with the NF that produces the service. The list of available MEC services can be discovered from the NRF 1520. Some of the services may be accessible via the NEF 1518, which is also available to untrusted entities that are external to the domain, to access the service. Put another way, the NEF 1518 can function as a centralized point for service exposure and also has a key role in authorizing all access requests originating from outside of the system. Procedures related to authentication can be served by the AUSF 1510.

The 5G network 1501 can use network slicing which allows the allocation of the required features and resources from the available NFs to different services or to tenants that are using the services. The Network Slice Selection Function (NSSF) 1516 can be configured to assist in the selection of suitable network slice instances for users, and in the allocation of the necessary AMF 1512. A MEC app 1572 (e.g., an application hosted in the distributed cloud of the MEC system 1590) can belong to one or more network slices that have been configured in the 5G network 1501.

The PCF 1522 is also the function whose services an AF 1526, such as a MEC platform 1578, requests in order to impact the traffic steering rules. The PCF 1522 can be accessed either directly, or via the NEF 1518, depending on whether the AF 1526 is considered trusted or not, and in the case of traffic steering, whether the corresponding PDU session is known at the time of the request. The UDM 1524 is responsible for services related to users and subscriptions. For example, the UDM 1524 can be configured to generate 3GPP authentication and key agreement (AKA) authentication credentials, handle user identification related information, manage access authorization (e.g., roaming restrictions), register the user serving NFs (serving AMF 1512, SMF 1514), support service continuity by keeping record of SMF/DNN assignments, support interception procedures in outbound roaming by acting as a contact point, and perform subscription management procedures.

The UPF 1506 can be configured to assist in an integrated MEC deployment in the 5G network 1501. UPFs 1506 can be considered as a distributed and configurable data plane from the MEC system 1591 perspective. The control of that data plane, such as in a traffic rules configuration, may follow the NEF-PCF-SMF communication route. Consequently, the local UPF 1506 may be part of the MEC implementation as illustrated in deployment 15B.

The MEC orchestrator 1570 in deployment 15B is a MEC system level functional entity that, acting as an AF, can interact with the NEF 1518, or in some scenarios directly with the target 5G NFs. At the distributed host level (or "MEC host level"), the MEC platform 1578 can be configured to interact with the 5G NFs, again in the role of an AF 1526. The MEC host (see e.g., MEC host 1602 in FIG. 16) and/or other host level functional entities, may be deployed in a data network (e.g., 1508) in the 5G system. While the NEF 1518 as a 5GC NF is a system level entity deployed centrally together with similar NFs, an instance of NEF 1518 can also be deployed in the edge to allow low latency, high throughput service access from a MEC host.

In deployment 15B, the MEC system 1591 is deployed on the N6 reference point of the UPF 1506, which may be in a data network 1508 external to the 5G system 1501. This functionality can be enabled by flexibility in locating the UPF 1506. The distributed MEC host can accommodate, apart from MEC apps 1572, a message broker as a MEC platform service 1574, and another MEC platform service to steer traffic to local accelerators. The choice to run a service as a MEC app or as a platform service can be implementation-specific and can factor in the level of sharing and authentication needed to access the service. A MEC service such as a message broker could be initially deployed as a MEC app 1572 and then become available as a MEC platform service 1574.

MEC hosts of the MEC system 1591 are deployed in the edge or in a central data network. The UPF 1506 can be configured to manage to steer the user plane traffic towards the targeted MEC apps 1572 in the DN 1508. The locations of the DN(s) 1508 and the UPF(s) 1506 are a choice of the network operator and the network operator may choose to place the physical computing resources based on technical and business parameters such as available site facilities, supported applications and their requirements, measured or estimated user load, etc. The MEC management system, orchestrating the operation of MEC hosts and applications, may decide dynamically where to deploy the MEC apps 1572. In terms of physical deployment of MEC hosts, the following options may be used in different aspects: (1) the MEC host and the local UPF 1506 are co-located with the base station of a base station edge layer; (2) the MEC host co-located with a transmission node which may include a local UPF 1506; (3) the MEC host and the local UPF 1506 co-located with a network aggregation point; and (4) the MEC host is co-located with the 5G core NFs (e.g., in the same data center).

FIG. 16 illustrates a MEC system reference architecture (or MEC architecture) 1600 providing functionalities in accordance with ETSI GS MEC 003 v2.1.1 (2019 January) ("[M03]"). MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP C-V2X based protocols) need to exchange data, provide data to aggregation points and access to data in databases which provide an overview of the local situation derived from a multitude of sensors (by various cars, roadside units, etc.).

The MEC architecture 1600 includes MEC hosts 1602, a virtualization infrastructure manager (VIM) 1608, an MEC platform manager 1606, an MEC orchestrator 1610, an operations support system (OSS) 1612, a user app proxy 1614, a UE app 1618 running on UE 1620, and CFS portal 1616. The MEC host 1602 can include a MEC platform 1632 with filtering rules control component 1640, a DNS handling component 1642, a service registry 1638, and MEC services 1636. The MEC services 1636 can include at least one scheduler, which can be used to select resources for instantiating MEC apps (or NFVs) 1626 upon virtualization infrastructure (VI) 1622. The MEC apps 1626 can be configured to provide services 1630, which can include processing network communications traffic of different types associated with one or more wireless connections (e.g., connections to one or more RANs or core network functions) and/or some other services such as those discussed herein. The other MEC host 1602 may have a same or similar configuration/implementation as the MEC host 1602, and the other MEC app 1626 instantiated within other MEC host 1602 can be similar to the MEC apps 1626 instantiated within MEC host 1602. The VI 1622 includes a data plane 1624 coupled to the MEC platform 1622 via an MP2 interface. Additional interfaces between various network entities of the MEC architecture 1600 are illustrated in FIG. 16.

The MEC system 1600 includes three groups of reference points, including "Mp" reference points regarding the MEC platform functionality; "Mm" reference points, which are management reference points; and "Mx" reference points, which connect MEC entities to external entities. The interfaces/reference points in the MEC system 1600 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The logical connections between various entities of the MEC architecture 1600 may be access-agnostic and not dependent on a particular deployment. MEC enables implementation of MEC apps 1626 as software-only entities that run on top of a VI 1622, which is located in or close to the network edge. A MEC app 1626 is an application that can be instantiated on a MEC host 1602 within the MEC system 1600 and can potentially provide or consume MEC services 1636.

The MEC entities depicted by FIG. 16 can be grouped into a MEC system level, MEC host level, and network level entities (not shown). The network level (not shown) includes various external network level entities, such as a 3GPP network, a local area network (e.g., a LAN, WLAN, PAN, DN, LADN, etc.), and external network(s). The MEC system level includes MEC system level management entities and UE 1620, and is discussed in more detail infra. The MEC host level includes one or more MEC hosts 1602, 1604 and MEC management entities, which provide functionality to run MEC Apps 1626 within an operator network or a subset of an operator network. The MEC management entities include various components that handle the management of the MEC-specific functionality of a particular MEC platform 1632, MEC host 1602, and the MEC Apps 1626 to be run.

The MEC platform manager 1606 is a MEC management entity including MEC platform element management component 1644, MEC app rules and requirements management component 1646, and MEC app lifecycle management component 1648. The various entities within the MEC architecture 1600 can perform functionalities as discussed in [M03]. The remote app 1650 is configured to communicate with the MEC host 1602 (e.g., with the MEC apps 1626) via the MEC orchestrator 1610 and the MEC platform manager 1606.

The MEC host 1602 is an entity that contains an MEC platform 1632 and VI 1622 which provides compute, storage, and network resources for the purpose of running MEC Apps 1626. The VI 1622 includes a data plane (DP) 1624 that executes traffic rules 1640 received by the MEC platform 1632, and routes the traffic among MEC Apps 1626, MEC services 1636, DNS server/proxy (see e.g., via DNS handling entity 1642), 3GPP network, local networks, and external networks. The MEC DP 1624 may be connected with the (R)AN nodes and the 3GPP core network, and/or may be connected with an access point via a wider network, such as the internet, an enterprise network, or the like.

The MEC platform 1632 is a collection of essential functionality required to run MEC Apps 1626 on a particular VI 1622 and enable them to provide and consume MEC services 1636, and that can provide itself a number of MEC services 937a. The MEC platform 1632 can also provide various services and/or functions, such as offering an environment where the MEC Apps 1626 can discover, advertise, consume and offer MEC services 1636 (discussed infra), including MEC services 1636 available via other platforms when supported. The MEC platform 1632 may be able to allow authorized MEC Apps 1626 to communicate with third party servers located in external networks. The MEC platform 1632 may receive traffic rules from the MEC platform manager 1606, applications, or services, and instruct the data plane accordingly (see e.g., Traffic Rules Control 1640). The MEC platform 1632 may send instructions to the DP 1624 within the VI 1622 via the Mp2 reference point. The Mp2 reference point between the MEC platform 1632 and the DP 1624 of the VI 1622 may be used to instruct the DP 1634 on how to route traffic among applications, networks, services, etc. The MEC platform 1632 may translate tokens representing UEs 1620, UE apps, individual sessions, and/or individual flows within a session in the traffic rules into specific IP addresses. The MEC platform 1632 also receives DNS records from the MEC platform manager 1606 and configures a DNS proxy/server accordingly. The MEC platform 1632 hosts MEC services 1636 including the multi-access edge services discussed infra, and provide access to persistent storage and time of day information. Furthermore, the MEC platform 1632 may communicate with other MEC platforms 1632 of other MEC servers 1602 via the Mp3 reference point. Upon receipt of update, activation or deactivation of traffic rules from the MEC platform manager 1606, apps, or services, the MEC platform 1632 instructs the data plane 1624 accordingly. The MEC platform 1632 also receives DNS records from the MEC platform manager 1606 and uses them to configure a DNS proxy/server 1642. The traffic rules control 1640 allows the MEC platform 1632 to perform traffic routing including traffic rules update, activation, and deactivation. In some embodiments, the traffic rules control 1640 allows the MEC platform 1632 to perform traffic steering, for example, by directing data packets over one or more access network connections in a multi-access environment comprising multiple access networks, each of which may have multiple access network connections and/or may implement different access technologies.

The VI 1622 represents the totality of all hardware and software components which build up the environment in which MEC Apps 1626 and/or MEC platform 1632 are deployed, managed and executed. The VI 1622 may span across several locations, and the network providing connectivity between these locations is regarded to be part of the VI 1622. The physical hardware resources of the VI 1622 includes computing, storage and network resources that provide processing, storage and connectivity to MEC Apps 1626 and/or MEC platform 1632 through a virtualization layer (e.g., a hypervisor, VM monitor (VMM), or the like). The virtualization layer may abstract and/or logically partition the physical hardware resources of the MEC server 1602 as a hardware abstraction layer. The virtualization layer may also enable the software that implements the MEC Apps 1626 and/or MEC platform 1632 to use the underlying VI 1622, and may provide virtualized resources to the MEC Apps 1626 and/or MEC platform 1632, so that the MEC Apps 1626 and/or MEC platform 1632 can be executed.

The MEC Apps 1626 are applications that can be instantiated on a MEC host/server 1602 within the MEC system 1600 and can potentially provide or consume MEC services 1636. The term "MEC service" refers to a service provided via a MEC platform 1632 either by the MEC platform 1632 itself or by a MEC App 1626. MEC Apps 1626 may run as VM on top of the VI 1622 provided by the MEC server 1602, and can interact with the MEC platform 1632 to consume and provide the MEC services 1636. The Mp1 reference point between the MEC platform 1632 and the MEC Apps 1626 is used for consuming and providing service specific functionality. Mp1 provides service registration 1638, service discovery, and communication support for various services, such as the MEC services 1636 provided by MEC host 1602. Mp1 may also provide application availability, session state relocation support procedures, traffic rules and DNS rules activation, access to persistent storage and time of day information, and/or the like. Additionally or alternatively, the MEC Apps 1626 may communicate with the MEC platform 1632 using the MEC APIs discussed in ETSI GS MEC 011 V2.1.1 (2019 November).

The MEC Apps 1626 are instantiated on the VI 1622 of the MEC server 1602 based on configuration or requests validated by the MEC management (e.g., MEC platform manager 1606). The MEC Apps 1626 can also interact with the MEC platform 1632 to perform certain support procedures related to the lifecycle of the MEC Apps 1626, such as indicating availability, preparing relocation of user state, etc. The MEC Apps 1626 may have a certain number of rules and requirements associated to them, such as required resources, maximum latency, required or useful services, etc. These requirements may be validated by the MEC management, and can be assigned to default values if missing. MEC services 1636 are services provided and/or consumed either by the MEC platform 1632 and/or MEC Apps 1626. The service consumers (e.g., MEC Apps 1626 and/or MEC platform 1632) may communicate with particular MEC services 1636 over individual APIs (including MEC V2X API and the other MEC APIs discussed herein). When provided by an application, a MEC service 1636 can be registered in a list of services in the service registries 1638 to the MEC platform 1632 over the Mp1 reference point. Additionally, a MEC App 1626 can subscribe to one or more services 1630/1636 for which it is authorized over the Mp1 reference point.

Examples of MEC services 1636 include V2X information services (VIS), RNIS (see e.g., ETSI GS MEC 012 V1.1.1 (2017 July) ("[M12]")), Location Services (see e.g., ETSI GS MEC 013 v1.1.1 (2017 July)), UE identity services (see e.g., ETSI GS MEC 014 V1.1.1 (2018 February)), BWMS (see e.g., ETSI GS MEC 015 V1.1.1 (2017 October)), WLAN Access Information (WAI) services, Fixed Access Information (FAI) services (see e.g., ETSI GS MEC 029 v2.1.1 (2019 July)), and/or other MEC services. The RNIS, when available, provides authorized MEC Apps 1626 with radio network related information, and expose appropriate up-to-date radio network information to the MEC Apps 1626. The RNI may include, inter alia, radio network conditions, measurement and statistics information related to the user plane, information related to UEs 1620 served by the radio node(s) associated with the MEC host 1602 (e.g., UE context and radio access bearers), changes on information related to UEs 1620 served by the radio node(s) associated with the MEC host XE136, and/or the like. The RNI may be provided at the relevant granularity (e.g., per UE 1620, per cell, per period of time).

The service consumers (e.g., MEC Apps 1626, MEC platform 1632, etc.) may communicate with the RNIS over an RNI API to obtain contextual information from a corresponding RAN. RNI may be provided to the service consumers via a NAN (e.g., (R)AN node, RRH, AP, etc.). The RNI API may support both query and subscription (e.g., a pub/sub) based mechanisms that are used over a Representational State Transfer (RESTful) API or over a message broker of the MEC platform 1632 (not shown). A MEC App 1626 may query information on a message broker via a transport information query procedure, wherein the transport information may be pre-provisioned to the MEC App 1626 via a suitable configuration mechanism. The various messages communicated via the RNI API may be in XML, JSON, Protobuf, or some other suitable format.

The VIS provides supports various V2X applications including the journey-aware QoS predictions according to the various embodiments discussed herein. The RNI may be used by MEC Apps 1626 and MEC platform 1632 to optimize the existing services and to provide new types of services that are based on up to date information on radio conditions. As an example, a MEC App 1626 may use RNI to optimize current services such as video throughput guidance. In throughput guidance, a radio analytics MEC App 1626 may use MEC services to provide a backend video server with a near real-time indication on the throughput estimated to be available at the radio DL interface in a next time instant. The throughput guidance radio analytics application computes throughput guidance based on the required radio network information it obtains from a multi-access edge service running on the MEC server 1602. RNI may be also used by the MEC platform 1632 to optimize the mobility procedures required to support service continuity, such as when a certain MEC App 1626 requests a single piece of information using a simple request-response model (e.g., using RESTful mechanisms) while other MEC Apps 1626 subscribe to multiple different notifications regarding information changes (e.g., using a pub/sub mechanism and/or message broker mechanisms).

The LS, when available, may provide authorized MEC Apps 1626 with location-related information, and expose such information to the MEC Apps 1626. With location related information, the MEC platform 1632 or one or more MEC Apps 1626 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 1620 currently served by the radio node(s) associated with the MEC server 1602, information about the location of all UEs 1620 currently served by the radio node(s) associated with the MEC server XE136, information about the location of a certain category of UEs 1620 currently served by the radio node(s) associated with the MEC server XE136, a list of UEs 1620 in a particular location, information about the location of all radio nodes currently associated with the MEC host 1602, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host 1602, or a subset thereof, according to a desired deployment. In this regard, the OMA Zonal Presence API provides means for MEC Apps 1626 to retrieve information about a zone, the access points associated to the zones and the users that are connected to the access points. In addition, the OMA Zonal Presence API, allows authorized application to subscribe to a notification mechanism, reporting about user activities within a zone. A MEC server 1602 may access location information or zonal presence information of individual UEs 1620 using the OMA Zonal Presence API to identify the relative location or positions of the UEs 1620.

The BWMS provides for the allocation of bandwidth to certain traffic routed to and from MEC Apps 1626, and specify static/dynamic up/down bandwidth resources, including bandwidth size and bandwidth priority. MEC Apps 1626 may use the BWMS to update/receive bandwidth information to/from the MEC platform 1632. Different MEC Apps 1626 running in parallel on the same MEC server 1602 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism.

The purpose of the UE Identity feature is to allow UE specific traffic rules in the MEC system 1600. When the MEC system 1600 supports the UE Identity feature, the MEC platform 1632 provides the functionality (e.g., UE Identity API) for a MEC App 1626 to register a tag representing a UE 1620 or a list of tags representing respective UEs 1620. Each tag is mapped into a specific UE 1620 in the MNO's system, and the MEC platform 1632 is provided with the mapping information. The UE Identity tag registration triggers the MEC platform 1632 to activate the corresponding traffic rule(s) 1640 linked to the tag. The MEC platform 1632 also provides the functionality (e.g., UE Identity API) for a MEC App 1626 to invoke a de-registration procedure to disable or otherwise stop using the traffic rule for that user.

The WAIS is a service that provides WLAN access related information to service consumers within the MEC System 1600. The WAIS is available for authorized MEC Apps 1626 and is discovered over the Mp1 reference point as specified in [R03]. The granularity of the WLAN Access Information may be adjusted based on parameters such as information per station, per NAN/AP, or per multiple APs (Multi-AP). The WLAN Access Information may be used by the service consumers to optimize the existing services and to provide new types of services that are based on up-to-date information from WLAN APs, possibly combined with the information such as RNI or Fixed Access Network Information. The WAIS defines protocols, data models, and interfaces in the form of RESTful APIs. Information about the APs and client stations can be requested either by querying or by subscribing to notifications, each of which include attribute-based filtering and attribute selectors.

The FAIS is a service that provides Fixed Access Network Information (or FAI) to service consumers within the MEC System 1600. The FAIS is available for the authorized MEC Apps 1626 and is discovered over the Mp1 reference point. The FAI may be used by MEC Apps 1626 and the MEC platform 1632 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC Apps 1626 and the MEC platform 1632 may consume the FAIS; and both the MEC platform 1632 and the MEC Apps 1626 may be the providers of the FAI. The FAI API supports both queries and subscriptions (pub/sub mechanism) that are used over the RESTful API or over alternative transports such as a message bus. Alternative transports may also be used.

The MEC management comprises MEC system level management and MEC host level management. The MEC management comprises the MEC platform manager 1606 and the VI manager (VIM) 1608, and handles the management of MEC-specific functionality of a particular MEC server 1602 and the applications running on it. In some implementations, some or all of the multi-access edge management components may be implemented by one or more servers located in one or more data centers, and may use virtualization infrastructure that is connected with NFV infrastructure used to virtualize NFs, or using the same hardware as the NFV infrastructure.

The MEC platform manager 1606 is responsible for managing the life cycle of applications including informing the MEC orchestrator (MEC-O) 1610 of relevant application related events. The MEC platform manager 1606 may also provide MEC Platform Element management functions 1644 to the MEC platform 1632, manage MEC App rules and requirements 1646 including service authorizations, traffic rules, DNS configuration and resolving conflicts, and manage MEC App lifecycles mgmt 1648. The MEC platform manager 1606 may also receive virtualized resources, fault reports, and performance measurements from the VIM 1608 for further processing. The Mm5 reference point between the MEC platform manager 1606 and the MEC platform 1632 is used to perform platform configuration, configuration of the MEC Platform element mgmt 1644, MEC App rules and reqts 1646, MEC App lifecycles mgmt 1648, and management of application relocation.

The VIM 1608 may be an entity that allocates, manages and releases virtualized (compute, storage and networking) resources of the VI 1622, and prepares the VI 1622 to run a software image. To do so, the VIM 1608 may communicate with the VI 1622 over the Mm7 reference point between the VIM 1608 and the VI 1622. Preparing the VI 1622 may include configuring the VI 1622, and receiving/storing the software image. When supported, the VIM 1608 may provide rapid provisioning of applications, such as described in "Openstack++ for Cloudlet Deployments", available at http://reports-archive.admr.cs.cmu.edu/anon/2015/CMU-CS-15-123.pdf. The VIM 1608 may also collect and report performance and fault information about the virtualized resources, and perform application relocation when supported. For application relocation from/to external cloud environments, the VIM 1608 may interact with an external cloud manager to perform the application relocation, for example using the mechanism described in "Adaptive VM Handoff Across Cloudlets", and/or possibly through a proxy. Furthermore, the VIM 1608 may communicate with the MEC platform manager 1606 via the Mm6 reference point, which may be used to manage virtualized resources, for example, to realize the application lifecycle management. Moreover, the VIM 1608 may communicate with the MEC-O 1610 via the Mm4 reference point, which may be used to manage virtualized resources of the MEC server 1602, and to manage application images. Managing the virtualized resources may include tracking available resource capacity, etc.

The MEC system level management includes the MEC-O 1610, which has an overview of the complete MEC system 1600. The MEC-O 1610 may maintain an overall view of the MEC system 1600 based on deployed MEC hosts 1602, available resources, available MEC services 1636, and topology. The Mm3 reference point between the MEC-O 1610 and the MEC platform manager 1606 may be used for the management of the application lifecycle, application rules and requirements and keeping track of available MEC services 1636. The MEC-O 1610 may communicate with the user application lifecycle management proxy (UALMP) 1614 via the Mm9 reference point in order to manage MEC Apps 1626 requested by UE app 1618.

The MEC-O 1610 may also be responsible for on-boarding of application packages, including checking the integrity and authenticity of the packages, validating application rules and requirements and if necessary adjusting them to comply with operator policies, keeping a record of on-boarded packages, and preparing the VIM(s) 1608 to handle the applications. The MEC-O 1610 may select appropriate MEC host(s) 901 for application instantiation based on constraints, such as latency, available resources, and available services. The MEC-O 1610 may also trigger application instantiation and termination, as well as trigger application relocation as needed and when supported.

The Operations Support System (OSS) 1612 is the OSS of an operator that receives requests via the Customer Facing Service (CFS) portal 1616 over the Mx1 reference point and from UE apps 1618 for instantiation or termination of MEC Apps 1626. The OSS 1612 decides on the granting of these requests. The CFS portal 1616 (and the Mx1 interface) may be used by third-parties to request the MEC system 1600 to run apps 1618 in the MEC system 1600. Granted requests may be forwarded to the MEC-O 1610 for further processing. When supported, the OSS 1612 also receives requests from UE apps 1618 for relocating applications between external clouds and the MEC system 1600. The Mm2 reference point between the OSS 1612 and the MEC platform manager 1606 is used for the MEC platform manager 1606 configuration, fault and performance management. The Mm1 reference point between the MEC-O 1610 and the OSS 1612 is used for triggering the instantiation and the termination of MEC Apps 1626 in the MEC system 1600.

The UE app(s) 1618 (also referred to as "device applications" or the like) is one or more apps running in a device 1620 that has the capability to interact with the MEC system 1600 via the user application lifecycle management proxy 1614. The UE app(s) 1618 may be, include, or interact with one or more client applications, which in the context of MEC, is application software running on the device 1618 that utilizes functionality provided by one or more specific MEC Apps 1626. The user app LCM proxy 1614 may authorize requests from UE apps 1618 in the UE 1620 and interacts with the OSS 1612 and the MEC-O 1610 for further processing of these requests. The term "lifecycle management," in the context of MEC, refers to a set of functions required to manage the instantiation, maintenance and termination of a MEC App 1626 instance. The user app LCM proxy 1614 may interact with the OSS 1612 via the Mm8 reference point, and is used to handle UE 1618 requests for running applications in the MEC system 1600. A user app may be an MEC App 1626 that is instantiated in the MEC system 1600 in response to a request of a user via an application running in the UE 1620 (e.g., UE App 1618). The user app LCM proxy 1614 allows UE apps 1618 to request on-boarding, instantiation, termination of user applications and when supported, relocation of user applications in and out of the MEC system 1600. It also allows informing the user apps about the state of the user apps. The user app LCM proxy 1614 is only accessible from within the mobile network, and may only be available when supported by the MEC system 1600. A UE app 1618 may use the Mx2 reference point between the user app LCM proxy 1614 and the UE app 1618 to request the MEC system 1600 to run an application in the MEC system 1600, or to move an application in or out of the MEC system 1600. The Mx2 reference point may only be accessible within the mobile network and may only be available when supported by the MEC system 1600.

In order to run an MEC App 1626 in the MEC system 1600, the MEC-O 1610 receives requests triggered by the OSS 1612, a third-party, or a UE app 1618. In response to receipt of such requests, the MEC-O 1610 selects a MEC server/host 1602 to host the MEC App 1626 for computational offloading, etc. These requests may include information about the application to be run, and possibly other information, such as the location where the application needs to be active, other application rules and requirements, as well as the location of the application image if it is not yet on-boarded in the MEC system 1600.

The MEC-O 1610 may select one or more MEC servers 1602 for computational intensive tasks. The selected one or more MEC servers XE136 may offload computational tasks of a UE app 1618 based on various operational parameters, such as network capabilities and conditions, computational capabilities and conditions, application requirements, and/or other like operational parameters. The application requirements may be rules and requirements associated to/with one or more MEC Apps 1626, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 1626 to be able to run; multi-access edge services that the MEC Apps 1626 can take advantage of, if available; connectivity or mobility support/requirements (e.g., application state relocation, application instance relocation); required multi-access edge features, such as VM relocation support or UE identity; required network connectivity (e.g., connectivity to applications within the MEC system 1600, connectivity to local networks, or to the Internet); information on the operator's MEC system 1600 deployment or mobile network deployment (e.g., topology, cost); requirements on access to user traffic; requirements on persistent storage; traffic rules 1640; DNS rules 1642; etc.

The MEC-O 1610 considers the requirements and information listed above and information on the resources currently available in the MEC system 1600 to select one or several MEC servers 1602 to host MEC Apps 1626 and/or for computational offloading. After one or more MEC servers XE136 are selected, the MEC-O 1610 requests the selected MEC host(s) 1602 to instantiate the application(s) or application tasks. The actual algorithm used to select the MEC servers 1602 depends on the implementation, configuration, and/or operator deployment. The selection algorithm(s) may be based on the task offloading criteria/parameters, for example, by taking into account network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 1610 may decide to select one or more new MEC hosts 1602 to act as a master node, and initiates the transfer of an application instance or application-related state information from the one or more source MEC hosts 1602 to the one or more target MEC hosts 1602.

In a first implementation, the UPF 1474 of the 5G system 1400 is mapped into the MEC architecture 1600 as the MEC data plane 1624. In these implementations, the UPF 1474 handles the user plane path of PDU sessions. Additionally, UPF 1474 provides the interface to a data network (e.g., DNs 1472, 1476) and supports the functionality of a PDU session anchor.

In a second implementation, the AF 1464 of the 5G system 1400 is mapped into the MEC architecture 1600 as the MEC platform 1632. In these implementations, the AF 1464 is configurable or operable to perform application influence on traffic routing, access network capability exposure, and interact with the policy framework for policy control. The second implementation may be combined with the first implementation, or may be a standalone implementation. In the first and/or second implementations, since user traffic is routed to the local DN 1472, MEC apps 1626, 1627, and/or 1628 can be mapped in or to the DN 1472 and/or 1476 of the 5G system 1400.

In a third implementation, the RAN 1468 of 5G system 1400 can be a virtual RAN based on a VNF, and the UPF 1474 is configurable or operable to function as the MEC data plane 1624 within an NF virtualization infrastructure (NFVI) (e.g., VI 1622). In these implementations, the AF 1464 can be configured as MEC platform VNF (see e.g., discussion of FIG. 17, with MEC APIs, MEC application enablement functionality (see e.g., [R06]), and API principles functionality (see e.g., [R06]). Additionally, the local DN 1472 can include MEC apps 1626, 1627, and/or 1628 instantiated as VNFs. This implementation can be configured to provide functionalities in accordance with the [M03] and/or ETSI GR MEC 017 V1.1.1 (2018 February) ("[M17]"). The third implementation may be combined with the first implementation and/or the second implementation, or may be a standalone implementation.

Additionally or alternatively, the access level edge (e.g., the NANs 2228, 2230, and 2232 of FIG. 22 and/or the other NANs discussed previously) can use one or more APIs to communicate with local/regional level edge networks. The local/regional level edge networks can include network nodes using corresponding applications to communicate with a national level edge network. The national level edge can include various NANs that use applications for accessing one or more remote clouds within the global level edge. The NANs are also configurable or operable for vertical segment management and SLA compliance. Additionally or alternatively, MEC deployment can be based on the definition of "edge" to provide degrees of freedom to MNOs, especially when deploying MEC in an NFV environment (e.g., MEC entities can be instantiated as Virtualized NFs (VNFs), thus with high flexibility in terms of deployment for the operator).

In some embodiments, MEC system 1600 can be flexibly deployed depending on the use case/vertical segment/information to be processed. Some components of the MEC system 1600 can be co-located with other elements of the system. As an example, in certain use cases (e.g., enterprise), a MEC app 1626 may need to consume a MEC service locally, and it may be efficient to deploy a MEC host locally equipped with the needed set of APIs. In another example, deploying a MEC server 1602 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. In some other aspects, a bandwidth management API may be present both at the access level edge and also in more remote edge locations, in order to set up transport networks (e.g., for CDN-based services).

Figure 17:
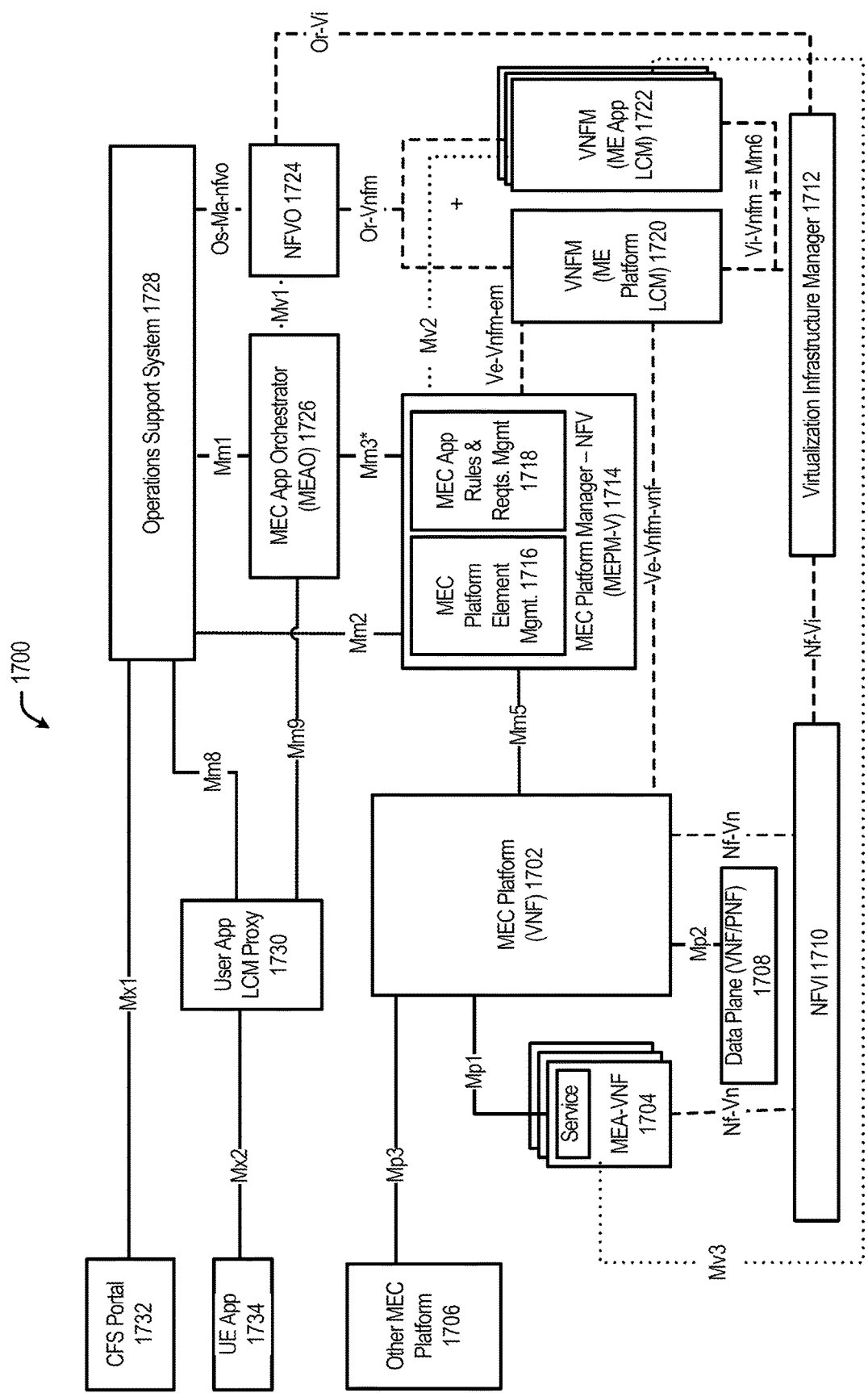
FIG. 17 illustrates a MEC reference architecture in a Network Function Virtualization (NFV) environment, deployable from an example edge computing system.

FIG. 17 illustrates a MEC reference architecture 1700 in a NFV environment. The MEC architecture 1700 can be configured to provide functionalities in accordance with [M03]. The MEC architecture 1700 includes a MEC platform 1702, a MEC platform manager—NFV (MEPM-V) 1714, a data plane 1708, a NFV infrastructure (NFVI) 1710, VNF managers (VNFMs) 1720 and 1722, NFV orchestrator (NFVO) 1724, a MEC app orchestrator (MEAO) 1726, an OSS 1728, a user app LCM proxy 1730, a UE app 1734, and a CFS portal 1732. The MEC platform manager 1714 can include a MEC platform element management 1716 and MEC app rules and requirements management 1718. The MEC platform 1702 can be coupled to another MEC platform 1706 via an MP3 interface.

In this embodiments, the MEC platform 1702 is deployed as a VNF. The MEC applications 1704 can appear like VNFs towards the ETSI NFV Management and Orchestration (MANO) components. This allows re-use of ETSI NFV MANO functionality. The full set of MANO functionality may be unused and certain additional functionality may be needed. Such a specific MEC app is denoted by the name "MEC app VNF" or "MEA-VNF". The virtualization infrastructure is deployed as an NFVI 1710 and its virtualized resources are managed by the virtualized infrastructure manager (VIM) 1712. For that purpose, one or more of the procedures defined by ETSI NFV Infrastructure specifications can be used (see e.g., ETSI GS NFV-INF 003 V2.4.1 (2018 February), ETSI GS NFV-INF 004 V2.4.1 (2018 February), ETSI GS NFV-INF 005 V3.2.1 (2019 April), and ETSI GS NFV-IFA 009 V1.1.1 (2016 July) (collectively "[R31]")). The MEA-VNF 1704 are managed like individual VNFs, allowing that a MEC-in-NFV deployment can delegate certain orchestration and LCM tasks to the NFVO 1724 and VNFMs 1720 and 1722, as defined by ETSI NFV MANO.

When a MEC platform is implemented as a VNF (e.g., MEC platform VNF 1702), the MEPM-V 1714 may be configured to function as an Element Manager (EM). The MEAO 1726 uses the NFVO 1724 for resource orchestration, and for orchestration of the set of MEA-VNFs 1704 as one or more NFV Network Services (NSs). The MEPM-V 1714 delegates the LCM part to one or more VNFMs 1720 and 1722. A specific or generic VNFM 1720, 1722 is/are used to perform LCM. The MEPM-V 1714 and the VNFM (ME platform LCM) 1720 can be deployed as a single package as per the ensemble concept in 3GPP TR 32.842 v13.1.0 (2015 Dec. 21) ("[R32]"), or that the VNFM is a Generic VNFM as per [R31] and the MEC Platform VNF 1702 and the MEPM-V 1714 are provided by a single vendor.

The Mp1 reference point between a MEC app 1704 and the MEC platform 1714 can be optional for the MEC app 1704, unless it is an application that provides and/or consumes a MEC service. The Mm3* reference point between MEAO 1726 and the MEPM-V 1714 is based on the Mm3 reference point (see e.g., [M03]. Changes may be configured to this reference point to cater for the split between MEPM-V 1714 and VNFM (ME applications LCM) 1722. The following new reference points (Mv1, Mv2, and Mv3) are introduced between elements of the ETSI MEC architecture and the ETSI NFV architecture to support the management of ME app VNFs 1704.

The following reference points are related to existing NFV reference points, but only a subset of the functionality may be used for ETSI MEC, and extensions may be necessary. Mv1 is a reference point connecting the MEAO 1726 and the NFVO 1724, and is related to the Os-Ma-nfvo reference point as defined in ETSI NFV). Mv2 is a reference point connecting the VNFM 1722 that performs the LCM of the MEC app VNFs 1704 with the MEPM-V 1714 to allow LCM related notifications to be exchanged between these entities. Mv2 is related to the Ve-Vnfm-em reference point as defined in ETSI NFV, but may possibly include additions, and might not use all functionality offered by the Ve-Vnfm-em. Mv3 is a reference point connecting the VNFM 1722 with the ME app VNF 1704 instance to allow the exchange of messages (e.g., related to MEC app LCM or initial deployment-specific configuration). Mv3 is related to the Ve-Vnfm-vnf reference point, as defined in ETSI NFV, but may include additions, and might not use all functionality offered by Ve-Vnfm-vnf.

The following reference points are used as they are defined by ETSI NFV: Nf-Vn reference point connects each ME app VNF 1704 with the NFVI 1710. The Nf-Vi reference point connects the NFVI 1710 and the VIM 1712. The Os-Ma-nfvo reference point connects the OSS 1728 and the NFVO 1724 and is primarily used to manage NSs (e.g., a number of VNFs connected and orchestrated to deliver a service). The Or-Vnfm reference point connects the NFVO 1724 and the VNFM (MEC Platform LCM) 1720 and is primarily used for the NFVO 1724 to invoke VNF LCM operations. Vi-Vnfm reference point connects the VIM 1712 and the VNFM (MEC Platform LCM) 1720 and is primarily used by the VNFM 1720 to invoke resource management operations to manage cloud resources that are needed by the VNF (it is assumed in an NFV-based MEC deployment that this reference point corresponds 1:1 to Mm6). The Or-Vi reference point connects the NFVO 1724 and the VIM 1712 and is primarily used by the NFVO 1724 to manage cloud resources capacity. The Ve-Vnfm-em reference point connects the VNFM (MEC Platform LCM) 1720 with the MEPM-V 1714. The Ve-Vnfm-vnf reference point connects the VNFM (MEC Platform LCM) 1720 with the MEC Platform VNF 1702.

III. Hardware Components

Figure 18A:
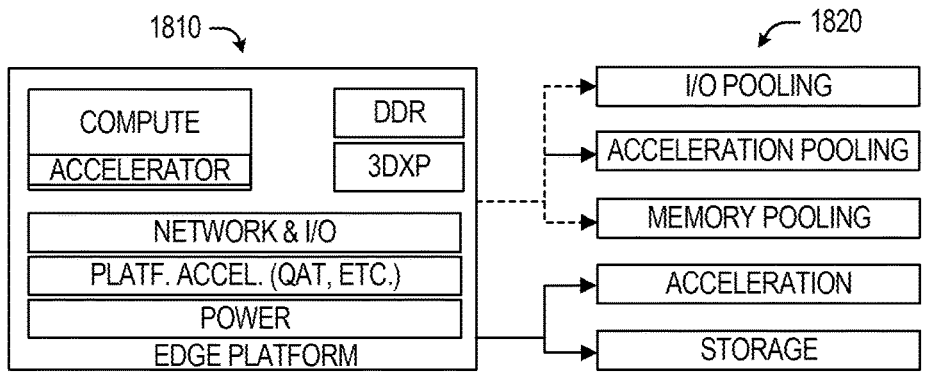
FIGS. 18A, 18B, and 18C depict examples of edge computing hardware configurations.

FIG. 18A illustrates a first edge computing hardware configuration, which maps various architectural aspects of an edge platform 1810 (e.g., compute hardware, network features, power management features, etc.) to specific edge platform capabilities 1820 (e.g., I/O pooling, acceleration pooling, memory pooling, acceleration technologies, storage capabilities). To offer the edge configuration as an overall solution for services, then the workloads or basic hardware components for services and service requirements/constraints (e.g., network and I/O, platform acceleration, power) are considered in light of available architectural aspects (e.g., pooling, storage, etc.).

Within the edge platform capabilities 1820, specific acceleration types may be configured or identified in order to ensure service density is satisfied across the edge cloud. Specifically, four primary acceleration types may be deployed in an edge cloud configuration: (1) General Acceleration (e.g., FPGAs) to implement basic blocks such as a Fast Fourier transform (FFT), k-nearest neighbors algorithm (KNN) and machine learning workloads; (2) Image, Video and transcoding accelerators; (3) Inferencing accelerators; (4) Crypto and compression related workloads (implemented such as in Intel® QuickAssist™ technology). Thus, the particular design or configuration of the edge platform capabilities 1820 can consider which is the right type of acceleration and platform product models that needs to be selected in order to accommodate the service and throughput density as well as available power.

Figure 18B:
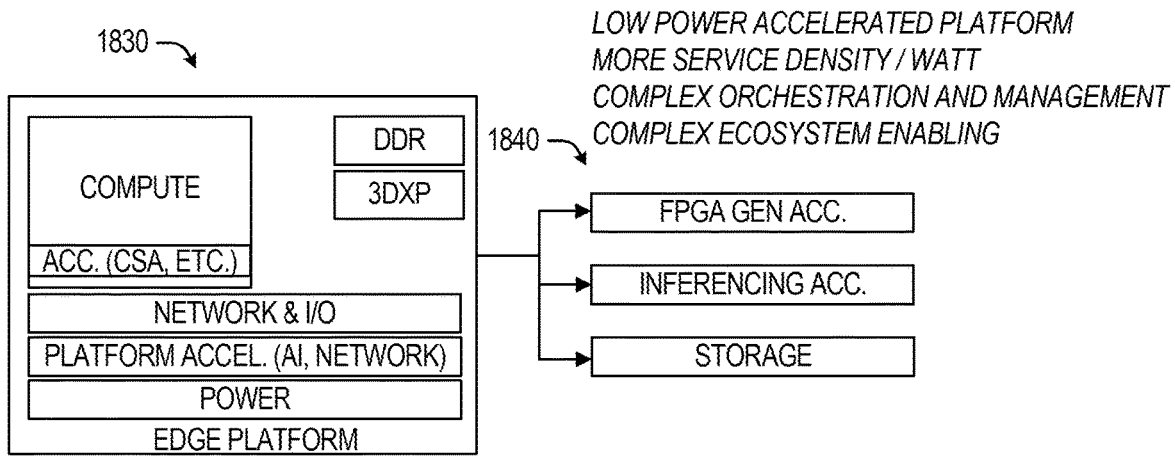

FIG. 18B illustrates a second edge computing hardware configuration, offering a second edge platform 1830 with a second set of edge platform capabilities 1840. This configuration may be deployable as a low power but more service-dense solution. This approach is targeted to define a lower power solution which uses acceleration schemes in order to achieve better service density or service throughout per watt. This main design trade-off leads to a platform that uses sacrifices general compute in favor specialized hardware (e.g., FPGAs, inferencing accelerators) that can perform the same work at better performance-per-watt ratio. In this example, a "service dense" solution enables more service actions per platform and per watt or being able to drive more throughput at a service level per watt.

The platform capabilities 1840 may be designed to be favorable in terms of power envelope as well in terms of physical space. As a result, the configuration of FIG. 18B may provide a suitable target for base station deployments. However, the platform capabilities 1840 may have tradeoffs including: (1) requirements in terms of orchestration, maintenance and system management (which can be translated to OPEX/TCO costs); (2) requiring an operator ecosystem to enable all a system stack to work with different accelerators that are exposed. However, these disadvantages may be mitigated with a developed software abstraction layer.

Figure 18C:
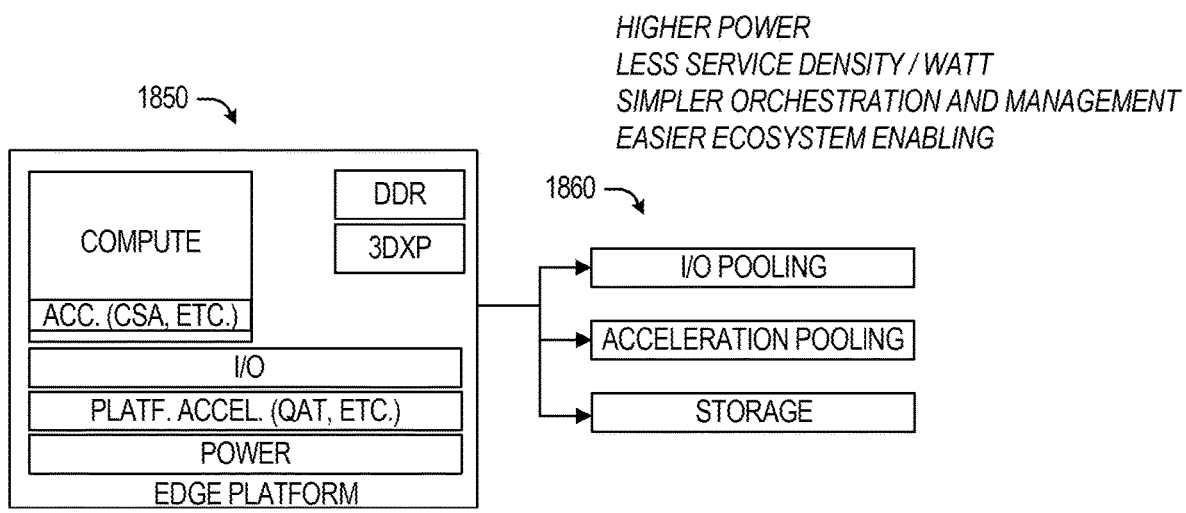

FIG. 18C illustrates a third edge computing hardware configuration, offering a third edge platform 1850 with a second set of edge platform capabilities 1860. This configuration offers a high power yet homogenous and generic architecture. FIG. 18C provides an approach that is opposite as compared FIG. 18B, to provide a platform architecture with reduced heterogeneity in the different types of resources that an operator or edge owner has to deal with respect to management, maintenance and orchestration. However, removing accelerators in favor of homogeneity comes at a cost of having less service density and service throughput per watt at platform level. In further examples, the edge platform capabilities 1860 may implement general purpose acceleration (such as in the form of FPGAs).

Other derivative functions of the edge platforms depicted in FIGS. 18A-C may also be adapted. For example, the platform can be sized and designed in order to incorporate new ingredients that make it more service and throughput dense but keeping it more homogenous by for example including accelerators inside the platform or on die in order to make them seamlessly manageable to the operators.

Figure 19:
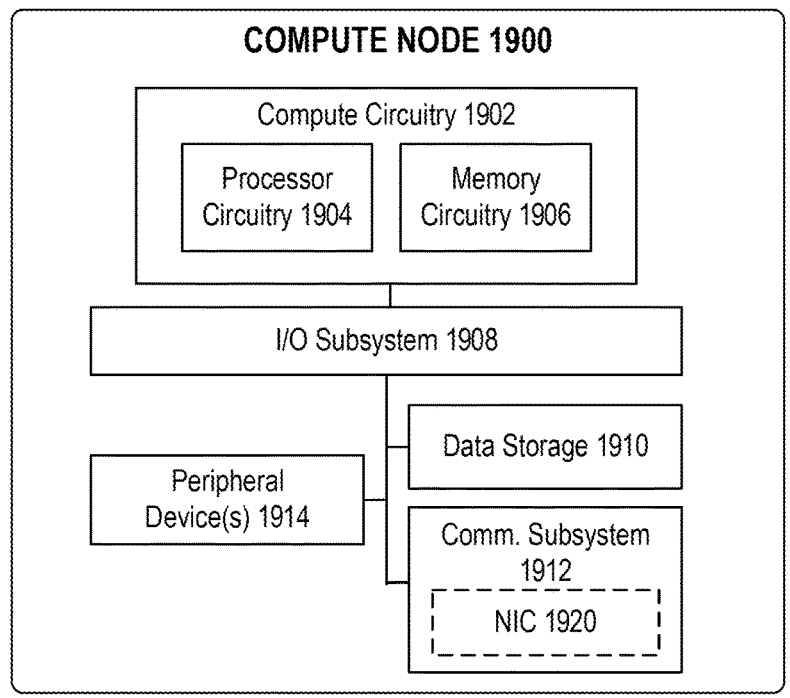
FIGS. 19 and 20 depict example components of various compute nodes in edge computing system(s).
Figure 20:
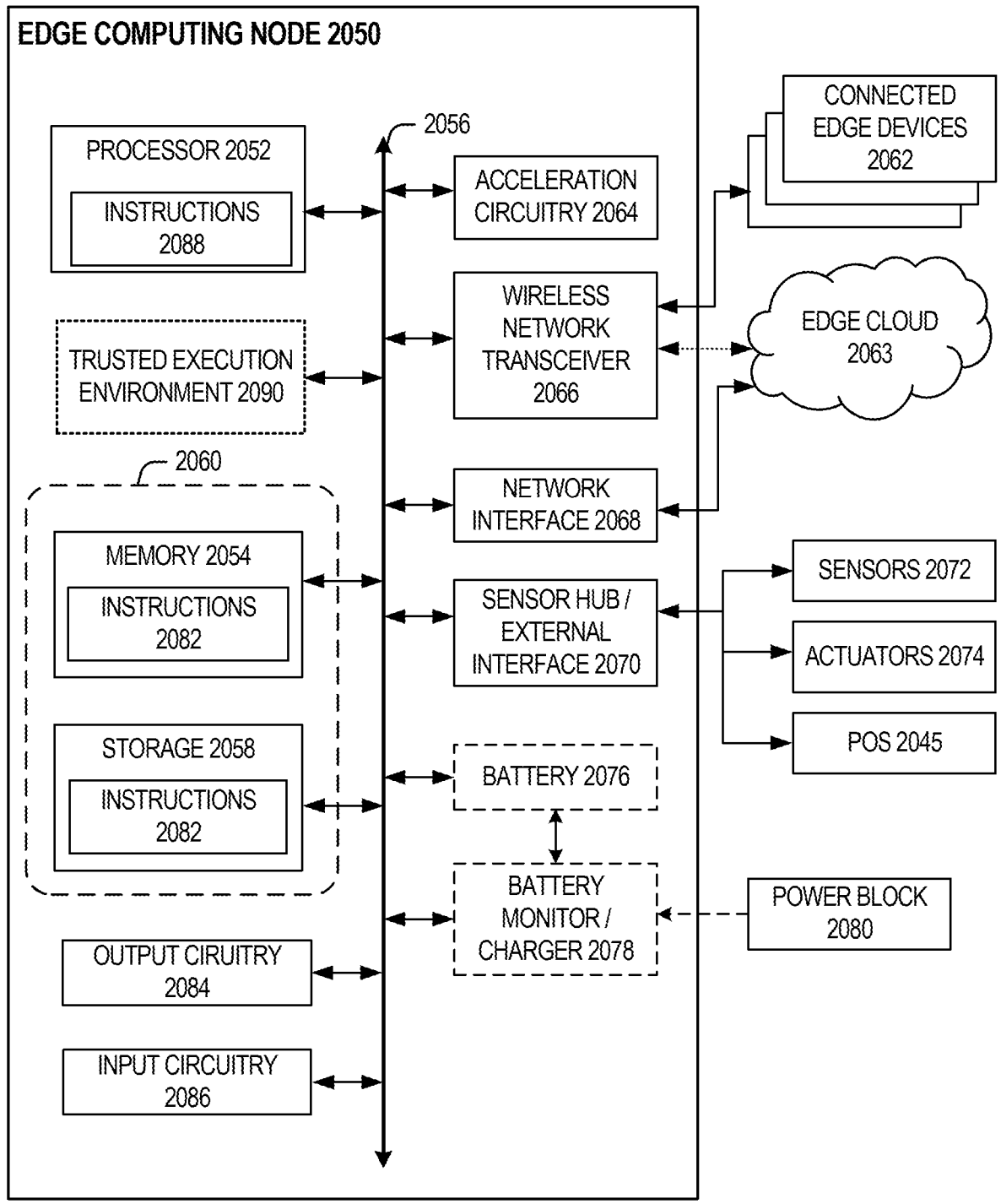

FIGS. 19 and 20 depict further examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

In FIG. 19, an edge compute node 1900 includes a compute engine (also referred to herein as "compute circuitry") 1902, an input/output (I/O) subsystem 1908, data storage 1910, a communication circuitry subsystem 1912, and, optionally, one or more peripheral devices 1914. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1900 may be embodied as any type of engine, device, or collection of devices capable of performing various compute functions. In some examples, the compute node 1900 may be embodied as a single device such as an integrated circuit, an embedded system, an FPGA, a System-on-Chip (SoC), or other integrated system or device. The compute node 1900 includes or is embodied as a processor 1904 and a memory 1906. The processor 1904 may be embodied as any type of processor capable of performing the functions described herein (e.g., executing an application). For example, the processor 1904 may be embodied as a multi-core processor(s), a microcontroller, or other processor or processing/controlling circuit. In some examples, the processor 1904 may be embodied as, include, or be coupled to an FPGA, an application specific integrated circuit (ASIC), reconfigurable hardware or hardware circuitry, or other specialized hardware to facilitate performance of the functions described herein.

The main memory 1906 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 1906 may be integrated into the processor 1904. The main memory 1906 may store various software and data used during operation such as one or more applications, data operated on by the application(s), libraries, and drivers.

The compute circuitry 1902 is communicatively coupled to other components of the compute node 1900 via the I/O subsystem 1908, which may be embodied as circuitry and/or components to facilitate input/output operations with the compute circuitry 1902 (e.g., with the processor 1904 and/or the main memory 1906) and other components of the compute circuitry 1902. For example, the I/O subsystem 1908 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1908 may form a portion of a system-on-a-chip (SoC) and be incorporated, along with one or more of the processor 1904, the main memory 1906, and other components of the compute circuitry 1902, into the compute circuitry 1902.

The one or more illustrative data storage devices 1910 may be embodied as any type of devices configured for short-term or long-term storage of data such as, for example, memory devices and circuits, memory cards, hard disk drives, solid-state drives, or other data storage devices. Individual data storage devices 1910 may include a system partition that stores data and firmware code for the data storage device 1910. Individual data storage devices 1910 may also include one or more operating system partitions that store data files and executables for operating systems depending on, for example, the type of compute node 1900.

The communication circuitry 1912 may be embodied as any communication circuit, device, or collection thereof, capable of enabling communications over a network between the compute circuitry 1902 and another compute device (e.g., an edge gateway node or the like). The communication circuitry 1912 may be configured to use any one or more communication technology (e.g., wired or wireless communications) and associated protocols (e.g., a cellular networking protocol such a 3GPP 4G or 5G standard, a wireless local area network protocol such as IEEE 802.11/WiFi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1912 includes a network interface controller (NIC) 1920, which may also be referred to as a host fabric interface (HFI). The NIC 1920 may be embodied as one or more add-in-boards, daughter cards, network interface cards, controller chips, chipsets, or other devices that may be used by the compute node 1900 to connect with another compute device. In some examples, the NIC 1920 may be embodied as part of a system-on-a-chip (SoC) that includes one or more processors, or included on a multichip package that also contains one or more processors. In some examples, the NIC 1920 may include a local processor (not shown) and/or a local memory (not shown) that are both local to the NIC 1920. In such examples, the local processor of the NIC 1920 may be capable of performing one or more of the functions of the compute circuitry 1902 described herein. Additionally, or alternatively, in such examples, the local memory of the NIC 1920 may be integrated into one or more components of the client compute node at the board level, socket level, chip level, and/or other levels.

Additionally, in some examples, a respective compute node 1900 may include one or more peripheral devices 1914. Such peripheral devices 1914 may include any type of peripheral device found in a compute device or server such as audio input devices, a display, other input/output devices, interface devices, and/or other peripheral devices, depending on the particular type of the compute node 1900. In further examples, the compute node 1900 may be embodied by a respective edge compute node in an edge computing system (e.g., client compute node, edge gateway node, edge aggregation node, UEs discussed previous, etc.) or like forms of appliances, computers, subsystems, circuitry, or other components.

FIG. 20 illustrates an example of components that may be present in an edge computing node 2050 for implementing the techniques (e.g., operations, processes, methods, and methodologies) described herein. This edge computing node 2050 provides a closer view of the respective components of node 2000 when implemented as or as part of a computing device (e.g., as a mobile device, a base station, server, gateway, etc.). The edge computing node 2050 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 2050, or as components otherwise incorporated within a chassis of a larger system.

The edge computing node 2050 includes processing circuitry in the form of one or more processors 1952. The processor circuitry 2052 includes circuitry such as, but not limited to one or more processor cores and one or more of cache memory, low drop-out voltage regulators (LDOs), interrupt controllers, serial interfaces such as SPI, I$^2$C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 2052 may include one or more hardware accelerators (e.g., same or similar to acceleration circuitry 2064), which may be microprocessors, programmable processing devices (e.g., FPGA, ASIC, etc.), or the like. The one or more accelerators may include, for example, computer vision and/or deep learning accelerators. In some implementations, the processor circuitry 2052 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 2052 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 2052 may be coupled with or may include memory/storage and may be configured to execute instructions stored in the memory/storage to enable various applications or operating systems to run on the platform 2050. The processors (or cores) 2052 is configured to operate application software to provide a specific service to a user of the platform 2050. In some embodiments, the processor(s) 2052 may be a special-purpose processor(s)/controller(s) configured (or configurable) to operate according to the various embodiments herein.

As examples, the processor(s) 2052 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 2052 may be a part of a system on a chip (SoC), System-in-Package (SiP), a multi-chip package (MCP), and/or the like, in which the processor(s) 2052 and other components are formed into a single integrated circuit, or a single package, such as the Edison™ or Galileo™ SoC boards from Intel® Corporation. Other examples of the processor(s) 2052 are mentioned elsewhere in the present disclosure.

The processor(s) 2052 may communicate with system memory 2054 over an interconnect (IX) 2056. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2058 may also couple to the processor 2052 via the IX 2056. In an example, the storage 2058 may be implemented via a solid-state disk drive (SSDD) and/or high-speed electrically erasable memory (commonly referred to as "flash memory"). Other devices that may be used for the storage 2058 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 2054 and/or storage circuitry 2058 may also incorporate three-dimensional (3D) cross-point (XPOINT) memories from Intel® and Micron®.

In low power implementations, the storage 2058 may be on-die memory or registers associated with the processor 2052. However, in some examples, the storage 1958 may be implemented using a micro hard disk drive (HDD). Further, any number of new technologies may be used for the storage 2058 in addition to, or instead of, the technologies described, such resistance change memories, phase change memories, holographic memories, or chemical memories, among others.

The components of edge computing device 2050 may communicate over the IX 2056. The IX 2056 may include any number of technologies, including ISA, extended ISA, I²C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 2056 may be a proprietary bus, for example, used in a SoC based system.

The IX 2056 couples the processor 2052 to communication circuitry 2066 for communications with other devices, such as a remote server (not shown) and/or the connected edge devices 2062. The communication circuitry 2066 is a hardware element, or collection of hardware elements, used to communicate over one or more networks (e.g., cloud 2063) and/or with other devices (e.g., edge devices 2062).

The transceiver 2066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2062. For example, a wireless local area network (WLAN) unit may be used to implement WiFi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 2066 (or multiple transceivers) may communicate using multiple standards or radios for communications at a different range. For example, the edge computing node 2050 may communicate with close devices, e.g., within about 10 meters, using a local transceiver based on BLE, or another low power radio, to save power. More distant connected edge devices 2062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 2066 (e.g., a radio transceiver) may be included to communicate with devices or services in the edge cloud 2063 via local or wide area network protocols. The wireless network transceiver 2066 may be an LPWA transceiver that follows the IEEE 802.15.4, or IEEE 802.15.4g standards, among others. The edge computing node 2063 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 2066, as described herein. For example, the transceiver 2066 may include a cellular transceiver that uses spread spectrum (SPA/SAS) communications for implementing high-speed communications. Further, any number of other protocols may be used, such as WiFi® networks for medium speed communications and provision of network communications. The transceiver 2066 may include radios that are compatible with any number of 3GPP specifications, such as LTE and 5G/NR communication systems, discussed in further detail at the end of the present disclosure. A network interface controller (NIC) 2068 may be included to provide a wired communication to nodes of the edge cloud 2063 or to other devices, such as the connected edge devices 2062 (e.g., operating in a mesh). The wired communication may provide an Ethernet connection or may be based on other types of networks, such as Controller Area Network (CAN), Local Interconnect Network (LIN), DeviceNet, ControlNet, Data Highway Plus (DH+), PROFIBUS, or PROFINET, among many others. An additional NIC 2068 may be included to enable connecting to a second network, for example, a first NIC 2068 providing communications to the cloud over Ethernet, and a second NIC 2068 providing communications to other devices over another type of network.

Given the variety of types of applicable communications from the device to another component or network, applicable communications circuitry used by the device may include or be embodied by any one or more of components 2064, 2066, 201968, or 2070. Accordingly, in various examples, applicable means for communicating (e.g., receiving, transmitting, etc.) may be embodied by such communications circuitry.

The edge computing node 2050 may include or be coupled to acceleration circuitry 2064, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 2064 may comprise logic blocks or logic fabric and other interconnected resources that may be programmed (configured) to perform various functions, such as the procedures, methods, functions, etc. of the various embodiments discussed herein. In such implementations, the acceleration circuitry 2064 may also include memory cells (e.g., EPROM, EEPROM, flash memory, static memory (e.g., SRAM, anti-fuses, etc.) used to store logic blocks, logic fabric, data, etc. in LUTs and the like.

The IX 2056 also couples the processor 2052 to a sensor hub or external interface 2070 that is used to connect additional devices or subsystems. The additional/external devices may include sensors 2072, actuators 2074, and positioning circuitry 2045.

The sensor circuitry 2072 includes devices, modules, or subsystems whose purpose is to detect events or changes in its environment and send the information (sensor data) about the detected events to some other a device, module, subsystem, etc. Examples of such sensors 2072 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 2074, allow platform 2050 to change its state, position, and/or orientation, or move or control a mechanism or system. The actuators 2074 comprise electrical and/or mechanical devices for moving or controlling a mechanism or system, and converts energy (e.g., electric current or moving air and/or liquid) into some kind of motion. The actuators 2074 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 2074 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 2050 may be configured to operate one or more actuators 2074 based on one or more captured events and/or instructions or control signals received from a service provider and/or various client systems The positioning circuitry 2045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2045 may include a Micro-Technology for Positioning, Navigation, and Timing (Micro-PNT) IC that uses a master timing clock to perform position tracking/estimation without GNSS assistance. The positioning circuitry 2045 may also be part of, or interact with, the communication circuitry 2066 to communicate with the nodes and components of the positioning network. The positioning circuitry 2045 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 2045 is, or includes an INS, which is a system or device that uses sensor circuitry 2072 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 2050 without the need for external references.

In some optional examples, various input/output (I/O) devices may be present within or connected to, the edge computing node 2050, which are referred to as input circuitry 2086 and output circuitry 2084 in FIG. 20. The input circuitry 201986 and output circuitry 2084 include one or more user interfaces designed to enable user interaction with the platform 2050 and/or peripheral component interfaces designed to enable peripheral component interaction with the platform 2050. Input circuitry 2086 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 2084 may be included to show information or otherwise convey information, such as sensor readings, actuator position(s), or other like information. Data and/or graphics may be displayed on one or more user interface components of the output circuitry 2084. Output circuitry 2084 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 2050. The output circuitry 2084 may also include speakers or other audio emitting devices, printer(s), and/or the like. In some embodiments, the sensor circuitry 201972 may be used as the input circuitry 2084 (e.g., an image capture device, motion capture device, or the like) and one or more actuators 2074 may be used as the output device circuitry 2084 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 2076 may power the edge computing node 2050, although, in examples in which the edge computing node 2050 is mounted in a fixed location, it may have a power supply coupled to an electrical grid, or the battery may be used as a backup or for temporary capabilities. The battery 2076 may be a lithium ion battery, or a metal-air battery, such as a zinc-air battery, an aluminum-air battery, a lithium-air battery, and the like.

A battery monitor/charger 2078 may be included in the edge computing node 2050 to track the state of charge (SoCh) of the battery 2076, if included. The battery monitor/charger 2078 may be used to monitor other parameters of the battery 2076 to provide failure predictions, such as the state of health (SoH) and the state of function (SoF) of the battery 2076. The battery monitor/charger 2078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 2078 may communicate the information on the battery 2076 to the processor 2052 over the IX 2056. The battery monitor/charger 2078 may also include an analog-to-digital (ADC) converter that enables the processor 2052 to directly monitor the voltage of the battery 2076 or the current flow from the battery 2076. The battery parameters may be used to determine actions that the edge computing node 2050 may perform, such as transmission frequency, mesh network operation, sensing frequency, and the like.

A power block 2080, or other power supply coupled to a grid, may be coupled with the battery monitor/charger 2078 to charge the battery 2076. In some examples, the power block 2080 may be replaced with a wireless power receiver to obtain the power wirelessly, for example, through a loop antenna in the edge computing node 2050. A wireless battery charging circuit, such as an LTC4020 chip from Linear Technologies of Milpitas, California, among others, may be included in the battery monitor/charger 2078. The specific charging circuits may be selected based on the size of the battery 2076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2058 may include instructions 2082 in the form of software, firmware, or hardware commands to implement the techniques described herein. Although such instructions 2082 are shown as code blocks included in the memory 2054 and the storage 2058, it may be understood that any of the code blocks may be replaced with hardwired circuits, for example, built into an application specific integrated circuit (ASIC).

In an example, the instructions 1982 provided via the memory 2054, the storage 2058, or the processor 2052 may be embodied as a non-transitory, machine-readable medium 2060 including code to direct the processor 2052 to perform electronic operations in the edge computing node 2050. The processor 2052 may access the non-transitory, machine-readable medium 2060 over the IX 2056. For instance, the non-transitory, machine-readable medium 2060 may be embodied by devices described for the storage 2058 or may include specific storage units such as optical disks, flash drives, or any number of other hardware devices. The non-transitory, machine-readable medium 2060 may include instructions to direct the processor 2052 to perform a specific sequence or flow of actions, for example, as described with respect to the flowchart(s) and block diagram (s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 21:
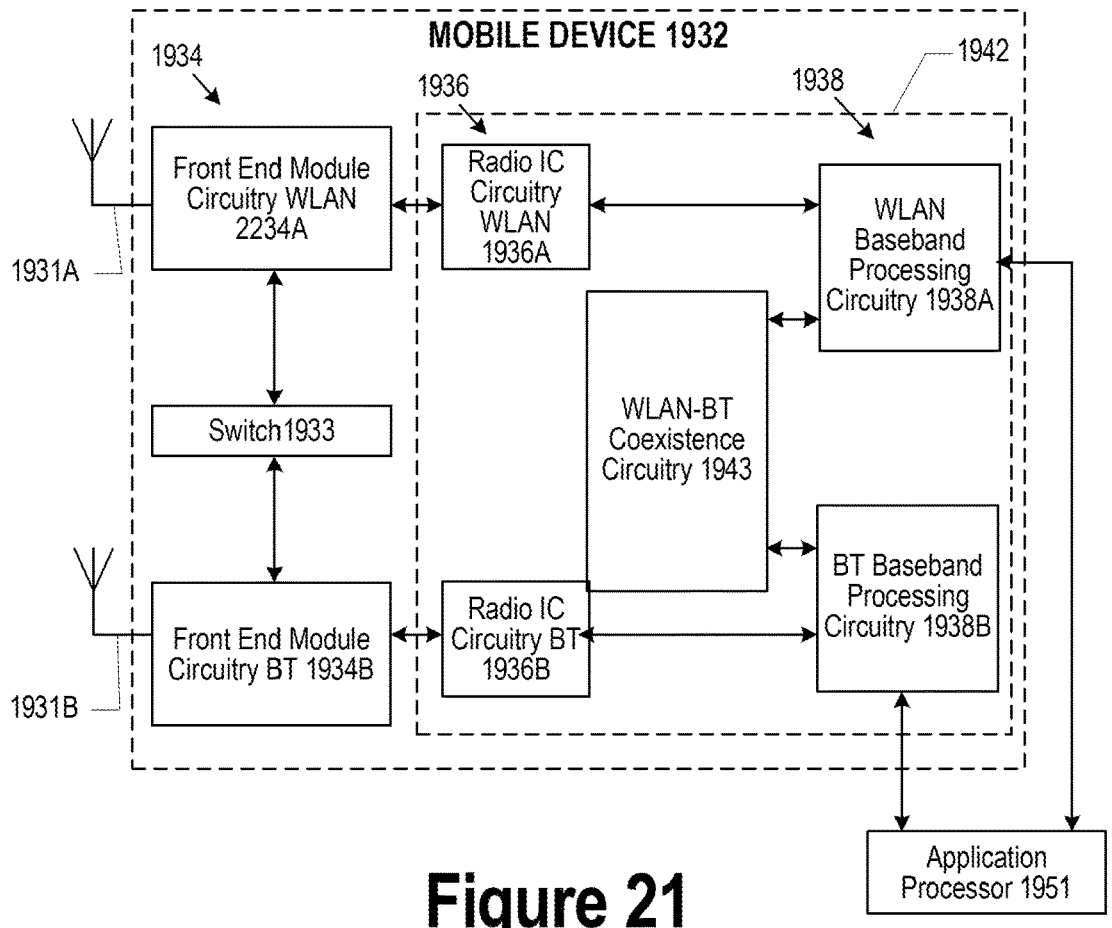
FIG. 21 depicts an example mobile computing device in an edge computing system.

FIG. 21 depicts communication components within an example mobile device 1932. This mobile device 1932 provides a closer view of the communication processing components of node 1900 or device 1950 when implemented as a user equipment or a component of a user equipment. The mobile device 1932 may include radio front-end module (FEM) circuitry 1934, radio IC circuitry 1936 and baseband processing circuitry 1938. The mobile device 1932 as shown includes both Wireless Local Area Network (WLAN) functionality and Bluetooth (BT) functionality although aspects of the device are not so limited, and other radio technologies discussed herein may be implemented by similar circuitry. FEM circuitry 1934 may include, for example, a WLAN or WiFi FEM circuitry 1934A and a Bluetooth (BT) FEM circuitry 1934B. The WLAN FEM circuitry 1934A may include a receive signal path comprising circuitry configured to operate on WLAN RF signals received from one or more antennas 1931A, to amplify the received signals and to provide the amplified versions of the received signals to the WLAN radio IC circuitry 1936A for further processing. The BT FEM circuitry 1934B may include a receive signal path which may include circuitry configured to operate on BT RF signals received from one or more antennas 1931B, to amplify the received signals and to provide the amplified versions of the received signals to the BT radio IC circuitry 1936B for further processing. FEM circuitry 1934A may also include a transmit signal path which may include circuitry configured to amplify WLAN signals provided by the radio IC circuitry 1936A for wireless transmission by one or more of the antennas 1931A. In addition, FEM circuitry 1934B may also include a transmit signal path which may include circuitry configured to amplify BT signals provided by the radio IC circuitry 1936B for wireless transmission by the one or more antennas 1931B. In the example of FIG. 21, although FEM 1934A and FEM 1934B are shown as being distinct from one another, aspects of the present disclosure are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1936 as shown may include WLAN radio IC circuitry 1936A and BT radio IC circuitry 1936B. The WLAN radio IC circuitry 1936A may include a receive signal path which may include circuitry to down-convert WLAN RF signals received from the FEM circuitry 1934A and provide baseband signals to WLAN baseband processing circuitry 1938A. BT radio IC circuitry 1936B may in turn include a receive signal path which may include circuitry to down-convert BT RF signals received from the FEM circuitry 1934B and provide baseband signals to BT baseband processing circuitry 1938B. WLAN radio IC circuitry 1936A may also include a transmit signal path which may include circuitry to up-convert WLAN baseband signals provided by the WLAN baseband processing circuitry 1938A and provide WLAN RF output signals to the FEM circuitry 1934A for subsequent wireless transmission by the one or more antennas 1931A. BT radio IC circuitry 1936B may also include a transmit signal path which may include circuitry to up-convert BT baseband signals provided by the BT baseband processing circuitry 1938B and provide BT RF output signals to the FEM circuitry 1934B for subsequent wireless transmission by the one or more antennas 1931B. In the example of FIG. 21, although radio IC circuitries 1936A and 1936B are shown as being distinct from one another, aspects of the present disclosure are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1938 may include a WLAN baseband processing circuitry 1938A and a BT baseband processing circuitry 1938B. The WLAN baseband processing circuitry 1938A may include a memory, such as, for example, a set of RAM arrays in a Fast Fourier Transform or Inverse Fast Fourier Transform block (not shown) of the WLAN baseband processing circuitry 1938A. Each of the WLAN baseband circuitry 1938A and the BT baseband circuitry 1938B may further include one or more processors and control logic to process the signals received from the corresponding WLAN or BT receive signal path of the radio IC circuitry 1936, and to also generate corresponding WLAN or BT baseband signals for the transmit signal path of the radio IC circuitry 1936. Each of the baseband processing circuitries 1938A and 1938B may further include physical layer (PHY) and medium access control layer (MAC) circuitry, and may further interface with application processor 1951 (or, in other examples, processor circuitry 1950) for generation and processing of the baseband signals and for controlling operations of the radio IC circuitry 1936.

Referring still to FIG. 21, according to the illustrated aspects, WLAN-BT coexistence circuitry 1943 may include logic providing an interface between the WLAN baseband circuitry 1938A and the BT baseband circuitry 1938B to enable use cases requiring WLAN and BT coexistence. In addition, a switch 1933 may be provided between the WLAN FEM circuitry 1934A and the BT FEM circuitry 1934B to allow switching between the WLAN and BT radios according to application needs. In addition, although the antennas 1931A, 1931B are depicted as being respectively connected to the WLAN FEM circuitry 1934A and the BT FEM circuitry 1934B, aspects of the present disclosure include within their scope the sharing of one or more antennas as between the WLAN and BT FEMs, or the provision of more than one antenna connected to each of FEM 1934A or 1934B.

In some aspects of the present disclosure, the front-end module circuitry 1934, the radio IC circuitry 1936, and baseband processing circuitry 1938 may be provided on a single radio card. In other aspects, the one or more antennas 1931A, 1931B, the FEM circuitry 1934 and the radio IC circuitry 1936 may be provided on a single radio card. In some other aspects of the present disclosure, the radio IC circuitry 1936 and the baseband processing circuitry 1938 may be provided on a single chip or integrated circuit (IC).

Figure 22:
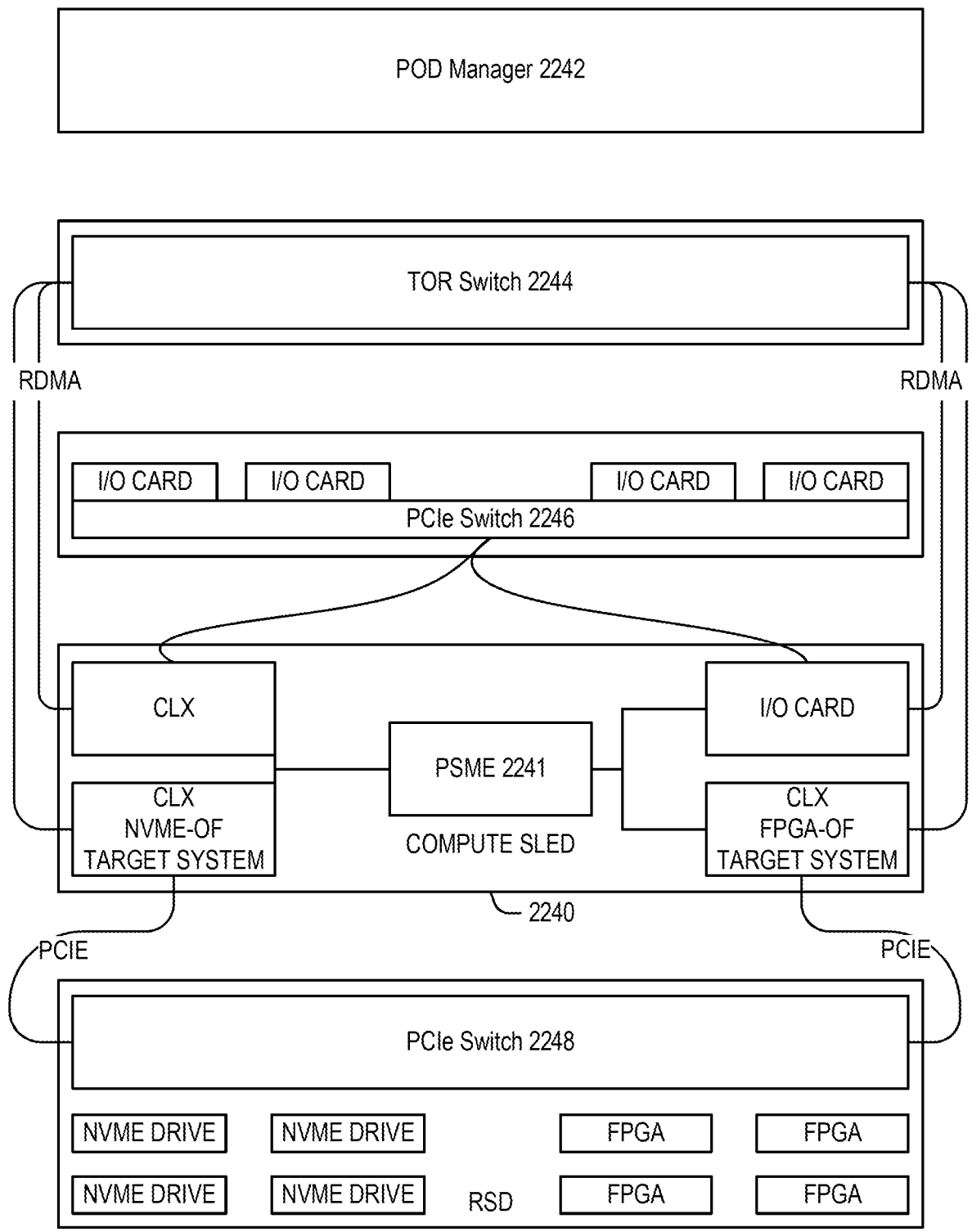
FIG. 22 depicts an example of a configurable server rack in an edge computing system.

FIG. 22 illustrates Rack Scale Design (RSD) components that may be included a part of a server or other discrete compute node in an edge platform architecture. This arrangement provides a closer view of the configurable processing components of node 1900 or device 2050 when implemented as a server (e.g., in a server rack, blade, etc.). This configurable architecture differs from some others by disaggregating field programmable gate array (FPGA), non-volatile memory express (NVMe), and input-output (I/O) pooling resources. The FPGA and NVMe resources provide elements that may be used for any type of edge services, such as video or speech analytics. I/O pooling may be used to provide flexible NFs. This architecture enables scaling network interfaces according to the expected data rate or network load for a particular VNF. This architecture also enables flexibility to map different network cards to compute nodes depending on the type of network processing happening at a given node.

The illustrated RSD architecture includes a point of delivery (POD) Manager 2242. The POD Manager 2242 is responsible of managing the resources-including compute and disaggregated resources-within a POD (e.g., one or more racks). The POD Manager 2242 exposes interfaces to an orchestrator in order to create, manage, or destroy composed nodes. Managing a composed node includes the feature of scaling up or down the amount of pooled resources 2248 connected to a particular compute sled 2240. The POD Manager 2242 typically runs on a node controller. The POD Manager 2242 is responsible for discovery of resources in the POD, configuring and managing the resources, and composing a logical server. In an example, the POD Manager 2242 is an optional separate component and will not be required in-rack. However, in an example, to be "RSD conformant" a Rack is manageable by a certified POD Manager.

The following are some example attributes of a POD Manager 2242. For example, a rack may include a set of compute sleds 2240 used to execute edge services and other related system software stacks (e.g., such as orchestration or other system services). One type of compute sled 2240 may be a Pooled Resources Sled. This compute sled 2240 may manage a set of disaggregated resources. Here, a compute sled 1940 may include a pooled System Management Engine software (PSME) 2241. The PSME 2241 provides a management interface to manage the modules or blades at a drawer level. In an example, a rack contains one or more logical PSME(s). For example, each drawer may have a PSME or server drawers may share a PSME, or a PSME may run on a top-of-rack (TOR) 2244 switch or on a separate host. In an example, the PSME 2241 supports the RSD APIs.

In an example, the compute sled 2240 may include processors (e.g., CLX) to run an RSD software stack implementing NVM-oF or FPGA-oF acting as a target system and managing a set of disaggregated resources. In an example, the processors are connected using PCIe x16 bifurcation port to a PCIe switch 2246 providing access to the target resources (FPGA or NVME in the RSD 2248).

Various RSD edge-composed node flavors may be used in the compute sled 2240 to run edge services. Services running on those nodes may use client software libraries or drivers to provide transparent access to the disaggregated FPGAS and NVME in the RSD 2248. In a further example, the rack includes one or more PCIe switches connecting the compute sleds 2240 to a set of disaggregated resources (e.g., RSD 2248).

The illustrations of FIGS. 19, 20, 21, and 22 are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 19, 20, 21, and 22 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions-even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

IV. Example Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 includes a method of operating a Multi-access Traffic Steering (MTS) service producer to provide MTS services in a network including multiple access networks, the method comprising: receiving a traffic steering request message from an MTS service consumer, the traffic steering request message including a session identifier (sessionId) representing an individual session of an application instance hosted by the MTS service consumer or the MTS service producer and a traffic steering mode (mtsMode) indicating how to steer traffic of the individual session; and steering, in response to receipt of the traffic steering request message, traffic corresponding to the sessionId over one or more access network connections of the multiple access networks according to the mtsMode.

Example 2 includes the method of example 1 and/or some other example(s) herein, wherein the traffic steering request message further comprises an application instance identifier (appInsId) indicating an application instance to which the individual session belongs.

Example 3 includes the method of examples 1-2 and/or some other example(s) herein, wherein the traffic steering request message further comprises a flow filter (flowFilter) including traffic flow filtering criteria for steering the traffic of the individual session.

Example 4 includes the method of example 3 and/or some other example(s) herein, wherein the flowFilter includes a source address identity of the individual session, a source port identity of the individual session, a destination address identity of the individual session, a destination port identity of the individual session, and a protocol type of the individual session.

Example 5 includes the method of examples 1-4 and/or some other example(s) herein, wherein the mtsMode is a "low latency mode" and the steering comprises steering the traffic over an access network connection having a lowest latency among the one or more access network connections.

Example 6 includes the method of examples 1-5 and/or some other example(s) herein, wherein the mtsMode is a "high throughput mode" and the steering comprises steering the traffic over an access network connection with a highest throughput among the one or more access network connections or steer the traffic over multiple access network connection of the one or more access network connections simultaneously.

Example 7 includes the method of examples 1-6 and/or some other example(s) herein, wherein the mtsMode is a redundancy mode and the steering comprises steering the traffic over multiple access network connections of the one or more access network connections when the traffic includes duplicated packets for an application having high-reliability and low-latency requirements.

Example 8 includes the method of examples 1-7 and/or some other example(s) herein, wherein the mtsMode is a "quality of service (QoS) mode" and the steering comprises steering the traffic over one or more of the one or more access network connections according to QoS requirements of the traffic.

Example 9 includes the method of example 8 and/or some other example(s) herein, wherein, when the mtsMode is the QoS mode, the traffic steering request message further comprises a QoS description (qosD) including one or more of a throughput threshold for the individual session, a latency limit for the individual session, a packet loss rate limit for the individual session, a jitter limit for the individual session, and a priority for the individual session.

Example 10 includes the method of examples 1-9 and/or some other example(s) herein, wherein the request message further comprises a traffic direction indicating whether the traffic steering in a downlink (DL) direction, an uplink (UL) direction, or both the DL and UL directions.

Example 11 includes the method of examples 1-10 and/or some other example(s) herein, further comprising: receiving a request message for MTS service information (MtsInfo) from an MTS service consumer; generating, in response to receipt of the request message, a response message including MtsInfo for the one or more access network connections, the MtsInfo including an access network connection identifier (accessId) for each access network connection of the one or more access network connections and an access type (accessType) of each access network connection; and transmitting a response message including the MtsInfo to the MTS service consumer.

Example 12 includes the method of examples 1-11 and/or some other example(s) herein, wherein the request is communicated over an MTS application programming interface (API) by a Multi-access Edge Computing (MEC) application instantiated by a MEC host, and the apparatus is to be employed as a MEC platform within the MEC host to provide the MTS service.

Example 13 includes the method of example 12 and/or some other example(s) herein, wherein the MEC platform operates a Multiple Access Management Services (MAMS) server instance.

Example 14 includes a method for providing Multi-access Traffic Steering (MTS) services by a Multi-access Edge Computing (MEC) host in a network including multiple access networks, the method comprising: receiving a request message for MTS service information (MtsInfo) from an MTS service consumer; generating, in response to receipt of the request message, a response message including MtsInfo for one or more access network connections of the multiple access networks, the MtsInfo including an access network connection identifier (accessId) for each access network connection of the one or more access network connections and an access type (accessType) of each access network connection; and transmitting the response message to the MTS service consumer.

Example 15 includes the method of example 14 and/or some other example(s) herein, wherein the MtsInfo further comprises a traffic steering mode (mtsMode) data element of each access network connection, the mtsMode data element for each access network connection being one of a low cost mode, a high throughput mode, a redundancy mode, or a quality of service (QoS) mode.

Example 16 includes the method of example 15 and/or some other example(s) herein, wherein: the low cost mode indicates that traffic is to be steered over an access network connection having a lower latency among the one or more access network connections; the high throughput mode indicates that traffic is to be steered over an access network connection with a higher throughput among the one or more access network connections or steer the traffic over multiple access network connection of the one or more access network connections simultaneously; the redundancy mode indicates that traffic is to be steered over multiple access network connections of the one or more access network connections when the traffic includes duplicated packets for an application having high-reliability and low-latency requirements; and the QoS mode indicates that traffic is to be steered over one or more of the one or more access network connections according to QoS requirements of the traffic.

Example 17 includes the method of examples 14-16 and/or some other example(s) herein, wherein the MtsInfo further comprises a metered data element for each access network connection, the metered data element for each access network connection including a value indicating that the access network connection is not metered, a value indicating that the access network connection is metered, or a value indicating that metering of the access network connection is unknown.

Example 18 includes the one or more CRM of any one of claims 14-17 and/or some other example(s) herein, wherein the MtsInfo further comprises an accessType data element for each access network connection to indicate the accessType of each access network connection, and the accessType data element for each access network connection includes one of: a value indicating that the access network connection is unknown; a value indicating that the access network connection is any Institute of Electrical and Electronics Engineers (IEEE) 802.11-based Wireless Local Area Network (WLAN) technology; a value indicating that the access network connection is any Third Generation Partnership Project (3GPP)-based cellular technology connection; a value indicating that the access network connection is any Fixed Access network connection; a value indicating that the access network connection is an IEEE 802.11 a/b/g WLAN connection; a value indicating that the access network connection is an IEEE 802.11 a/b/g/n WLAN connection; a value indicating that the access network connection is an IEEE 802.11 a/b/g/n/ac WLAN connection; a value indicating that the access network connection is an IEEE 802.11 a/b/g/n/ac/ax WLAN (Wi-Fi 6) connection; a value indicating that the access network connection is an IEEE 802.11 b/g/n WLAN connection; a value indicating that the access network connection is an 3GPP Global System for Mobile Communications (GSM) or Universal Mobile Telecommunications System Terrestrial Radio Access (UTRA) connection; a value indicating that the access network connection is an 3GPP Enhanced (E-UTRA) or Long Term Evolution (LTE) connection; or a value indicating that the access network connection is an 3GPP Fifth Generation (5G) or New Radio (NR) connection.

Example 19 includes the method of example 18 and/or some other example(s) herein, further comprising: receiving a traffic steering request message from the MTS service consumer, the traffic steering request message including a session identifier (sessionId) representing an individual session and a traffic steering mode (mtsMode) indicating how to steer traffic of the individual session; and steering, in response to receipt of the traffic steering request message, traffic corresponding to the sessionId over one or more access network connections according to the mtsMode.

Example 20 includes a method for obtaining Multi-access Traffic Steering (MTS) services from an MTS service provider, the method comprising: generating a traffic steering request message to include a session identifier (sessionId) representing an individual session or a group of sessions and a traffic steering mode (mtsMode) indicating how to steer traffic of the individual session or the group of sessions; transmitting the traffic steering request message to the MTS service provider over an MTS application programming interface (API); and receiving a traffic steering response message from the MTS service provider over the MTS API, the traffic steering response message indicating that traffic associated with the sessionId will be steered over one or more access network connections according to the mtsMode when the traffic steering request message was processed successfully.

Example 21 includes the method of example 20 and/or some other example(s) herein, wherein the traffic steering request message further comprises a flow filter (flowFilter) data element including traffic flow filtering criteria for steering the traffic of the individual session, and a traffic steering mode (mtsMode) data element of each access network connection, the mtsMode data element for each access network connection being one of a low cost mode, a high throughput mode, a redundancy mode, or a quality of service (QoS) mode Example 22 includes the method of examples 20-21 and/or some other example(s) herein, further comprising: generating an MTS service information (MtsInfo) request message; transmitting the MtsInfo request message to the MTS service producer; and receiving an MtsInfo response message from the MTS service producer, the MtsInfo response message including MtsInfo, for each of the one or more access network connections, an access network connection identifier (accessId) data element containing a value to uniquely identify the access network connection and an access type (accessType) data element containing a numeric value corresponding to a specific type of access network of the access network connection.

Example 23 includes the method of examples 20-22 and/or some other example(s) herein, wherein the computing device is a Multi-access Edge Computing (MEC) host implementing a MEC application, and the MTS service provider is operated by a MEC platform in the MEC host or in another MEC host, and the MEC platform operates a Multiple Access Management Services (MAMS) server instance.

Example 24 includes a method of operating a Multi-access Edge Computing (MEC) host comprising a MEC platform arranged to instantiate a MEC application (app) and instantiate a Multi-access Traffic Steering (MTS) service, the method comprises: operating, by the MEC platform, the MEC app to send an MTS service information (MtsInfo) request message for the MTS service over an MTS application programming interface (API); and operating, by the MEC platform, the MTS service to transmit, in response to receipt of the MtsInfo request message, an MtsInfo response message to the MEC app over the MTS API, the MtsInfo request message including MtsInfo for one or more access network connections, the MtsInfo including an access network connection identifier (accessId) for each access network connection of the one or more access network connections and an access type (accessType) of each access network connection.

Example 25 includes the method of example 24 and/or some other examples, further comprising: operating, by the MEC platform, the MEC app to send a traffic steering request message to the MTS service over an MTS application programming interface (API), the traffic steering request message including a session identifier (sessionId) representing an individual session or a group of sessions of the MEC app and a traffic steering mode (mtsMode) indicating how to steer traffic of the individual session or the group of sessions; and operating, by the MEC platform, the MTS service to steer, in response to receipt of the traffic steering request message, traffic corresponding to the sessionId over one or more access network connections according to the mtsMode.

An example implementation is an edge computing system, including respective edge processing devices and nodes to invoke or perform the operations of examples 1-25, or other subject matter described herein. Another example implementation is a client endpoint node, operable to invoke or perform the operations of examples 1-25, or other subject matter described herein. Another example implementation is an aggregation node, network hub node, gateway node, or core data processing node, within or coupled to an edge computing system, operable to invoke or perform the operations of examples 1-25, or other subject matter described herein. Another example implementation is an access point, base station, road-side unit, street-side unit, or on-premise unit, within or coupled to an edge computing system, operable to invoke or perform the operations of examples 1-25, or other subject matter described herein. Another example implementation is an edge provisioning node, service orchestration node, application orchestration node, or multi-tenant management node, within or coupled to an edge computing system, operable to invoke or perform the operations of examples 1-25, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of examples 1-25, or other subject matter described herein. Another example implementation is an edge computing system operable as an edge mesh, as an edge mesh with side car loading, or with mesh-to-mesh communications, operable to invoke or perform the operations of examples 1-25, or other subject matter described herein. Another example implementation is an edge computing system including aspects of network functions, acceleration functions, acceleration hardware, storage hardware, or computation hardware resources, operable to invoke or perform the use cases discussed herein, with use of examples 1-25, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of examples 1-25, or other subject matter described herein. Another example implementation is an edge computing system adapted for mobile wireless communications, including configurations according to an 3GPP 4G/LTE or 5G network capabilities, operable to invoke or perform the use cases discussed herein, with use of examples 1-25, or other subject matter described herein.

Example Z01 includes an apparatus comprising means to perform one or more elements of a method described in or related to any of examples 1-25, or any other method or process described herein. Example Z02 includes one or more non-transitory computer-readable media comprising instructions, wherein execution of the instructions by an electronic device is operable to cause the electronic device to perform one or more elements of a method described in or related to any of examples 1-25, and/or any other method or process described herein. Example Z03 includes a computer program comprising instructions, wherein execution of the program by a processing element is operable to cause the processing element to carry out the method, techniques, or process as described in or related to any of examples 1-25, and/or portions thereof. Example Z04 includes an apparatus comprising logic, modules, or circuitry to perform one or more elements of a method described in or related to any of examples 1-25, and/or any other method or process described herein. Example Z05 includes an apparatus configured to perform one or more elements of a method described in or related to any of examples 1-25, and/or any other method or process described herein. Example Z06 includes a method, technique, or process as described in or related to any of examples 1-25, and/or portions or parts thereof. Example Z07 includes an apparatus comprising: processor circuitry and computer-readable media comprising instructions, wherein the one or more processors are configurable to perform the method, techniques, or process as described in or related to any of examples 1-25, and/or portions thereof. Example Z08 includes a signal as described in or related to any of examples 1-25, and/or portions or parts thereof. Example Z09 includes a datagram, packet, frame, segment, protocol data unit (PDU), or message as described in or related to any of examples 1-25, or portions or parts thereof, and/or otherwise described in the present disclosure. Example Z10 includes a signal encoded with a datagram, packet, frame, segment, PDU, or message as described in or related to any of examples 1-25, or portions or parts thereof, or otherwise described in the present disclosure. Example Z11 includes a signal encoded with data as described in or related to any of examples 1-25, or portions or parts thereof, or otherwise described in the present disclosure. Example Z12 includes an electromagnetic signal carrying computer-readable instructions, wherein execution of the computer-readable instructions by one or more processors is operable or configurable to cause the one or more processors to perform a method, technique, or process as described in or related to any of examples 1-25, or portions thereof. Example Z13 includes an API or specification defining functions, methods, variables, data structures, protocols, etc., defining or involving use of any of examples 1-25 or portions thereof, or otherwise related to any of examples 1-25 or portions thereof. Example Z14, includes a Multi-access Edge Computing (MEC) host executing a service as part of one or more MEC applications instantiated on a virtualization infrastructure, the service being related to any of examples 1-25 or portions thereof, and wherein the MEC host is configured to operate according to a standard from one or more ETSI MEC standards families. Example Z15 includes a signal in a wireless network as shown and described herein. Example Z16 includes a method of communicating in a wireless network as shown and described herein. Example Z17 includes a system for providing wireless communication as shown and described herein. Example Z18 includes a device for providing wireless communication as shown and described herein.

V. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "session" refers to a temporary and interactive information interchange between two or more communicating devices, two or more application instances, between a computer and user, or between any two or more entities or elements.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.).

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus to be employed as a Multi-access Traffic Steering (MTS) service provider to provide MTS services in a network including multiple access networks, the apparatus comprising:
   interface circuitry arranged to:
      receive a request message for MTS service information (MtsInfo) from an application instance, wherein the request message includes an identifier of the application instance;
      based on the request message, transmit traffic information for the application instance, including a multi-access traffic steering capability message comprising an indication of the multiple access networks and supported multi-access traffic steering modes in the multiple access networks;
      receive a multi-access traffic steering request message from the application instance, the multi-access traffic steering request message including a session identifier (sessionId) representing an individual session of the application instance and a traffic steering mode (mtsMode) indicating one or more preferences of the application instance on how to steer traffic of the individual session among the multiple access networks and the supported multi-access traffic steering modes; and
      transmit a multi-access traffic steering response to the application instance in response to the multi-access traffic steering request message, wherein the multi-access traffic steering response includes the request identifier and an indication of whether the one or more preferences are accepted or rejected; and
   processor circuitry communicatively coupled with the interface circuitry, the processor circuitry arranged to steer, in response to receipt of the multi-access traffic steering request message, when the one or more preferences are accepted, traffic corresponding to the sessionId over one or more access network connections of the multiple access networks according to the mtsMode.

2. The apparatus of claim 1, wherein the multi-access traffic steering request message further comprises a flow filter (flowFilter) including traffic flow filtering criteria for steering the traffic of the individual session.

3. The apparatus of claim 2, wherein the flowFilter includes a source address identity of the individual session, a source port identity of the individual session, a destination address identity of the individual session, a destination port identity of the individual session, and a protocol type of the individual session.

4. The apparatus of claim 1, wherein the mtsMode is a low latency mode and the processor circuitry is arranged to steer the traffic over at least one of:
   an access network connection having a lowest latency among the one or more access network connections;
   an access network connection with a highest throughput among the one or more access network connections;
   multiple access network connection of the one or more access network connections simultaneously;

multiple access network connections of the one or more access network connections when the traffic includes duplicated packets for an application having high-reliability and low-latency requirements; or one or more of the one or more access network connections according to quality of service (QOS) requirements of the traffic.

5. The apparatus of claim 4, wherein, when the mtsMode is a QoS mode, the multi-access traffic steering request message further comprises a QoS description (qosD) including one or more of a throughput threshold for the individual session, a latency limit for the individual session, a packet loss rate limit for the individual session, a jitter limit for the individual session, and a priority for the individual session.

6. The apparatus of claim 1, wherein the multi-access traffic steering request message further comprises a traffic direction indicating whether the traffic steering is in a downlink (DL) direction, an uplink (UL) direction, or both the DL and UL directions.

7. The apparatus of claim 1, wherein:
the interface circuitry is further arranged to, in response to the request message for MtsInfo from the application, transmit a response message including the MtsInfo to the application; and
the processor circuitry is arranged to generate, in response to receipt of the request message for the MtsInfo, the response message including MtsInfo for the one or more access network connections, the MtsInfo including an access network connection identifier (accessId) for each access network connection of the one or more access network connections and an access type (accessType) of each access network connection.

8. The apparatus of claim 1, wherein the multi-access traffic steering request message is communicated over an MTS application programming interface (API) by a Multi-access Edge Computing (MEC) application instantiated by a MEC host, and the apparatus is to be employed as a MEC platform within the MEC host to provide the MTS service, and the MEC platform operates a Multiple Access Management Services (MAMS) server instance.

9. The apparatus of claim 1, wherein the multi-access traffic steering capability message includes, for the multiple networks, an access network identifier to uniquely identify the access network, an access network type and an access network cost.

10. The apparatus of claim 1, wherein the supported multi-access traffic steering modes include Multipath Transmission Control Protocol (MPTCP), Multipath Quick User Datagram Protocol Internet Connections (MPQUIC) and Multiple Access Management Services (MAMS).

11. The apparatus of claim 1, wherein the multi-access traffic steering capability message includes an indication of supported multi-access traffic steering modes in uplink and downlink directions of the multiple access networks.

12. The apparatus of claim 1, wherein:
the one or more preferences include a preference for dynamic traffic steering and a preference for static traffic steering;
the preference for dynamic traffic steering is to steer traffic across multiple access networks dynamically according to a lowest cost, a lowest latency, a maximum throughput or a quality of service (QOS) requirement; and
the preference for static traffic steering is to steer traffic across multiple access networks according to a steering mode in which only one access network at a time is used, a splitting/aggregation mode in which multiple access networks are used simultaneously, or a duplication mode in which a same packet is sent over multiple access networks.

13. The apparatus of claim 12, wherein:
for the quality of service (QOS) requirement, the preference for dynamic traffic steering includes indications of a desired maximum end-to-end latency, a minimum throughput/bandwidth, and a tolerable packet loss rate;
for the steering mode, the multi-access traffic steering request message includes an indication of an access network identifier to identify an access network to use to deliver traffic; and
for the splitting/aggregation mode, the multi-access traffic steering request message includes an indication of access networks to use to deliver traffic and a traffic load ratio to identify a relative traffic load in the access networks to use to deliver traffic.

14. The apparatus of claim 1, wherein the interface circuitry is arranged to transmit a multi-access measurement report to the application, wherein the multi-access measurement report includes an indication of access networks available to the application and at least one of an end-to-end packet loss rate, an available bandwidth, an end-to-end round trip time or a one way delay.

15. The apparatus of claim 1, wherein the traffic information is tailored to the application instance.

16. The apparatus of claim 1, wherein the application instance is instantiated at a User Equipment (UE).

17. One or more non-transitory computer-readable media (NTCRM) comprising instructions for providing Multi-access Traffic Steering (MTS) services in a network including multiple access networks, wherein execution of the instructions is to cause a processor of a Multi-access Edge Computing (MEC) host to:
receive a request message for MTS service information (MtsInfo) from an application, wherein the request message includes an identifier of the application;
based on the request message, transmit traffic information for the application, including a multi-access traffic steering capability message comprising an indication of the multiple access networks and supported multi-access traffic steering modes in the multiple access networks;
receive a request message for MTS service information (MtsInfo) from the application, wherein the request message for MtsInfo comprises a session identifier (sessionId) representing an individual session of the application and a traffic steering mode (mtsMode) indicating one or more preferences of the application on how to steer traffic of the individual session among the multiple access networks and the supported multi-access traffic steering modes;
generate, in response to receipt of the request message for MtsInfo, when the one or more preferences are accepted, a response message including MtsInfo for one or more access network connections of the multiple access networks, the MtsInfo including an access network connection identifier (accessId) for each access network connection of the one or more access network connections, an access type (accessType) of each access network connection; and
transmit the response message to the application.

18. The one or more NTCRM of claim 17, wherein the MtsInfo further comprises a traffic steering mode (mtsMode) data element of each access network connection, the mtsMode data element for each access network connection being one of a low cost mode, a high throughput mode, a redundancy mode, or a quality of service (QOS) mode.

19. The one or more NTCRM of claim 18, wherein:
the low cost mode indicates that traffic is to be steered over an access network connection having a lower latency among the one or more access network connections;
the high throughput mode indicates that traffic is to be steered over an access network connection with a higher throughput among the one or more access network connections or steer the traffic over multiple access network connection of the one or more access network connections simultaneously;
the redundancy mode indicates that traffic is to be steered over multiple access network connections of the one or more access network connections when the traffic includes duplicated packets for an application having high-reliability and low-latency requirements; and
the QoS mode indicates that traffic is to be steered over one or more of the one or more access network connections according to QoS requirements of the traffic.

20. The one or more NTCRM of claim 17, wherein the MtsInfo further comprises a metered data element for each access network connection, the metered data element for each access network connection including a value indicating that the access network connection is not metered, a value indicating that the access network connection is metered, or a value indicating that metering of the access network connection is unknown.

21. The one or more NTCRM of claim 17, wherein execution of the instructions is to cause the MEC host to:
steer, in response to receipt of the request message for MtsInfo, traffic corresponding to the sessionId over one or more access network connections according to the mtsMode.

22. One or more non-transitory computer-readable media (NTCRM) comprising instructions for obtaining Multi-access Traffic Steering (MTS) services from an MTS service provider, wherein execution of the instructions by one or more processors of a computing device is operable to cause the computing device to:
generate an MTS service information (MtsInfo) request message;
transmit the request message from an application instance of the computing device to the MTS service provider, wherein the request message includes an identifier of the application instance;
in response to the request message, receive, at the application instance, from the MTS service provider, a multi-access traffic steering capability message comprising an indication of multiple access networks and supported multi-access traffic steering modes in the multiple access networks;
generate a traffic steering request message to include a session identifier (sessionId) representing an individual session or a group of sessions and a traffic steering mode (mtsMode) indicating one or more preferences on how to steer traffic of the individual session or the group of sessions among the multiple access networks and the supported multi-access traffic steering modes;
transmit the traffic steering request message to the MTS service provider over an MTS application programming interface (API); and
when the one or more preferences are accepted, receive a traffic steering response message from the MTS service provider over the MTS API, the traffic steering response message indicating that traffic associated with the sessionId will be steered over one or more access network connections according to the mtsMode when the traffic steering request message was processed successfully.

23. The one or more NTCRM of claim 22, wherein execution of the instructions is to cause the computing device to:
receive an MtsInfo response message from the MTS service provider, the MtsInfo response message including MtsInfo, for each of the one or more access network connections, an access network connection identifier (accessId) data element containing a value to uniquely identify the access network connection and an access type (accessType) data element containing a numeric value corresponding to a specific type of access network of the access network connection.

24. A Multi-access Edge Computing (MEC) host comprising:
a MEC platform arranged to instantiate a MEC application (app) and instantiate a Multi-access Traffic Steering (MTS) service, the MEC platform to:
operate the MTS service to transmit a multi-access traffic steering capability message to an MTS service consumer, wherein the multi-access traffic steering capability message includes an indication of multiple access networks and supported multi-access traffic steering modes in the multiple access networks;
operate the MTS service to receive a multi-access traffic steering request message from the MEC application, the multi-access traffic steering request message including a session identifier (sessionId) representing an individual session of the MEC application and a traffic steering mode (mtsMode) indicating one or more preferences of the MEC application on how to steer traffic of the individual session among the multiple access networks and the supported multi-access traffic steering modes;
operate the MEC application to send an MTS service information (MtsInfo) request message for the MTS service over an MTS application programming interface (API); and
operate the MTS service to transmit, in response to receipt of the MtsInfo request message, an MtsInfo response message to the MEC application over the MTS API, the MtsInfo request message including MtsInfo for one or more access network connections, the MtsInfo including an access network connection identifier (accessId) for each access network connection of the one or more access network connections and an access type (accessType) of each access network connection.

25. The MEC host of claim 24, wherein the MEC platform is further arranged to:
operate the MEC application to send a traffic steering request message to the MTS service over an MTS application programming interface (API), the traffic steering request message including a session identifier (sessionId) representing an individual session or a group of sessions of the MEC application and a traffic steering mode (mtsMode) indicating one or more preferences on how to steer traffic of the individual session or the group of sessions; and operate the MTS service to steer, in response to receipt of the traffic steering request message, and when the one or more preferences are accepted, traffic corresponding to the sessionId over one or more access network connections according to the mtsMode.

* * * * *